United States Patent
Kim et al.

(10) Patent No.: US 12,273,769 B2
(45) Date of Patent: *Apr. 8, 2025

(54) METHOD AND DEVICE FOR IDENTIFYING SECURITY KEY BASED ON PDCP LAYER DEVICE IN NEXT-GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,878

(22) Filed: Dec. 22, 2023

(65) Prior Publication Data
US 2024/0129795 A1    Apr. 18, 2024

Related U.S. Application Data

(63) Continuation of application No. 17/294,045, filed as application No. PCT/KR2019/018103 on Dec. 19, 2019, now Pat. No. 11,856,452.

(30) Foreign Application Priority Data

Dec. 19, 2018   (KR) .................. 10-2018-0165242
Apr. 10, 2019   (KR) .................. 10-2019-0041817
(Continued)

(51) Int. Cl.
H04W 28/06    (2009.01)
H04L 9/06     (2006.01)
(Continued)

(52) U.S. Cl.
CPC ............. *H04W 28/06* (2013.01); *H04L 69/04* (2013.01); *H04L 69/22* (2013.01);
(Continued)

(58) Field of Classification Search
CPC .... H04L 45/74; H04W 28/902; H04W 28/06; H04W 36/0069; H04W 68/00;
(Continued)

(56) References Cited

U.S. PATENT DOCUMENTS

2006/0039358 A1    2/2006  Kim
2010/0322141 A1   12/2010  Liu et al.
(Continued)

FOREIGN PATENT DOCUMENTS

CN        108809584 A      11/2018
KR    10-2019-0036251 A     4/2019
(Continued)

OTHER PUBLICATIONS

CATT, 'Introduction of DEFLATE based UDC Solution', R2-1801913, 3GPP TSG RAN WG2 #101, Feb. 16, 2018, Athens, Greece.
(Continued)

*Primary Examiner* — Iqbal Zaidi
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. An embodiment of the present invention relates to
(Continued)

a method and a device for processing a ciphered UDC header in a next-generation mobile communication system.

14 Claims, 40 Drawing Sheets

(30) Foreign Application Priority Data

| Apr. 23, 2019 | (KR) | .................. 10-2019-0047065 |
| Jul. 22, 2019 | (KR) | .................. 10-2019-0088346 |
| Aug. 5, 2019 | (KR) | .................. 10-2019-0095151 |
| Aug. 7, 2019 | (KR) | .................. 10-2019-0096318 |

(51) Int. Cl.
*H04L 69/04* (2022.01)
*H04L 69/22* (2022.01)
*H04W 12/037* (2021.01)

(52) U.S. Cl.
CPC ......... *H04W 12/037* (2021.01); *H04L 9/0618* (2013.01); *H04L 2209/80* (2013.01)

(58) Field of Classification Search
CPC ............... H04W 76/28; H04W 68/005; H04W 74/0866; H04W 72/0446
See application file for complete search history.

(56) References Cited

U.S. PATENT DOCUMENTS

| 2018/0146467 A1 | 5/2018 | Kim et al. |
| 2018/0227793 A1 | 8/2018 | Kim et al. |
| 2019/0124572 A1 | 4/2019 | Park et al. |
| 2020/0067843 A1 | 2/2020 | Li et al. |
| 2020/0100141 A1 | 3/2020 | Wu |
| 2020/0260496 A1 | 8/2020 | Jin et al. |
| 2020/0404553 A1* | 12/2020 | Lovlekar ............. H04W 12/037 |

FOREIGN PATENT DOCUMENTS

| WO | 2018/144233 A1 | 8/2018 |
| WO | 2018/171328 A1 | 9/2018 |

OTHER PUBLICATIONS

'3GPP; Tsgran; NR; Packet Data Convergence Protocol (PDCP) specification (Release 15)', 3GPP TS 38.323 V15.3.0; Sep. 27, 2018.
Mediatek Inc., 'Ethernet Header Compression', R2-1816689, 3GPP TSG RAN WG2 #104, Nov. 1, 2018, Spokane, USA.
Samsung, 'Clarification on the ciphering of UDC header', R2-1816875, 3GPP TSG RAN WG2 #104, Nov. 1, 2018, Spokane, USA.
Huawei, 'Discussion on UDC functionality in PDCP layer', R2-1712722, 3GPP TSG RAN WG2 #100, Nov. 17, 2017, Reno, USA.
Mediatek Inc et al, NR and NG-RAN UDC Support, 3GPP TSG RAN Meeting #79, RP-180349, XP051509498, Mar. 12, 2018, Chennai, India.
European Search Report dated Dec. 7, 2021, issued in European Application No. 19898577.2.
Chinese Office Action dated Dec. 5, 2022, issued in Chinese Application No. 201980084626.6.
RAN2 Chairman (Intel), 3GPP tsg_ran\WG2_RL2, R2-1710000, 3GPP TSG-RAN WG2 Meeting #99bis, Prague, Czech Republic, Sep. 26, 2017.
European Office Action dated Apr. 6, 2023, issued in European Patent Application No. 19898577.2.
Chinese Office Action dated Apr. 19, 2023, issued in Chinese Patent Application No. 201980084626.6.
Korean Office Action dated Apr. 1, 2024, issued in Korean Patent Application No. 10-2019-0096318.

* cited by examiner

SDAP control PDU (End maker Control PDU)

FIG. 2I
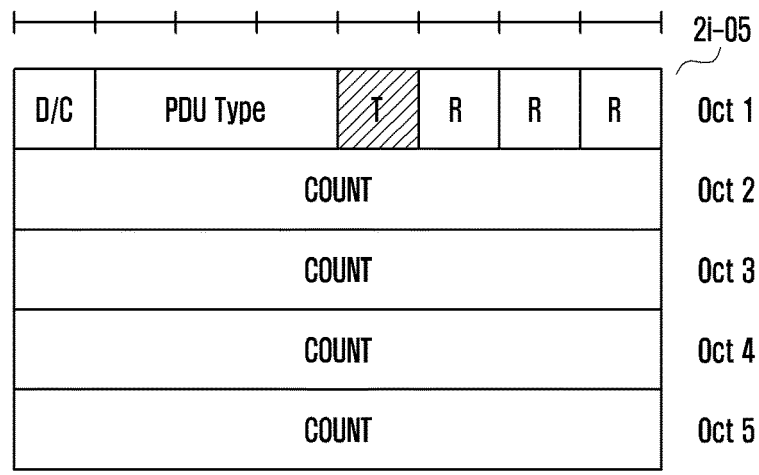
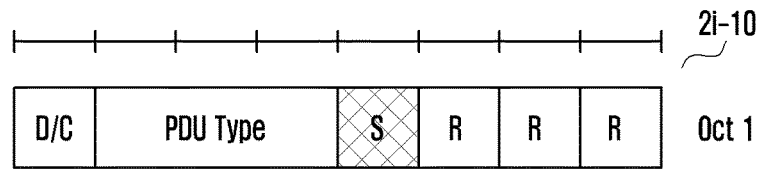
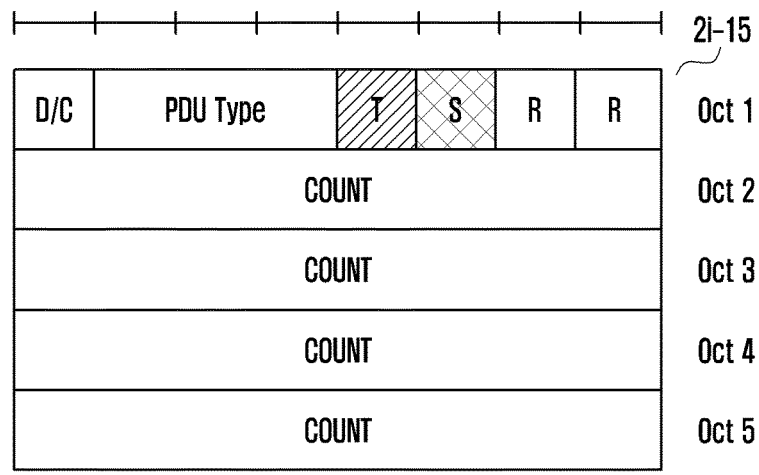
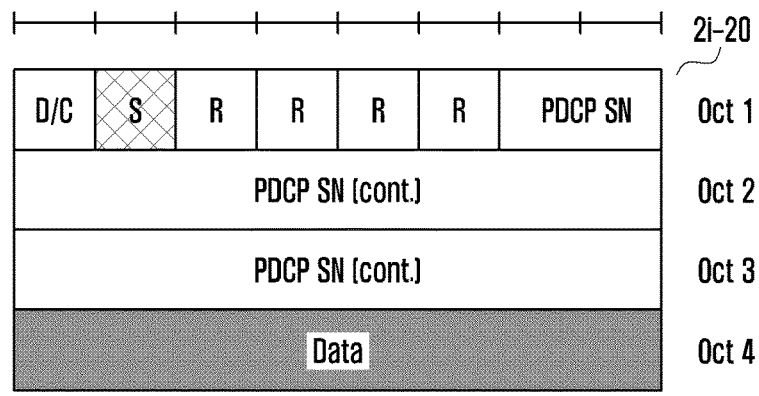

FIG. 2JA
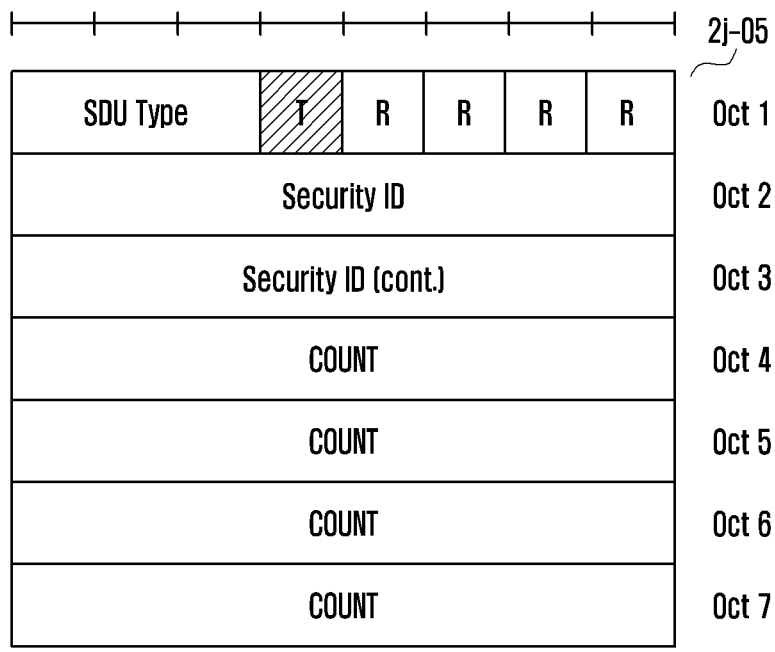
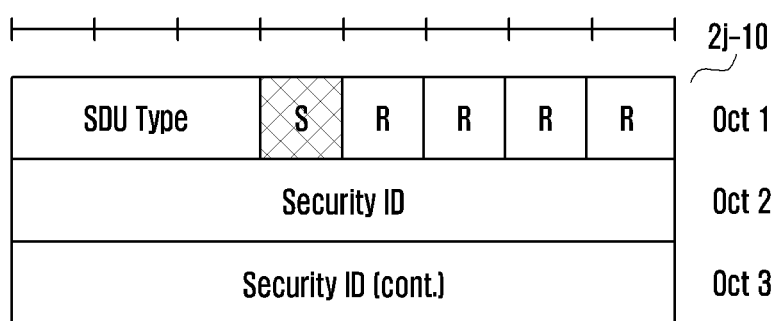

FIG. 2JB
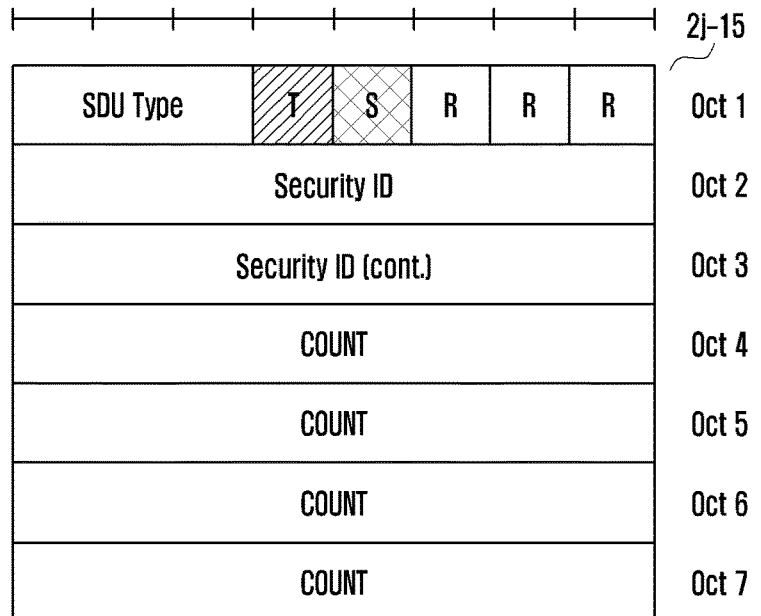
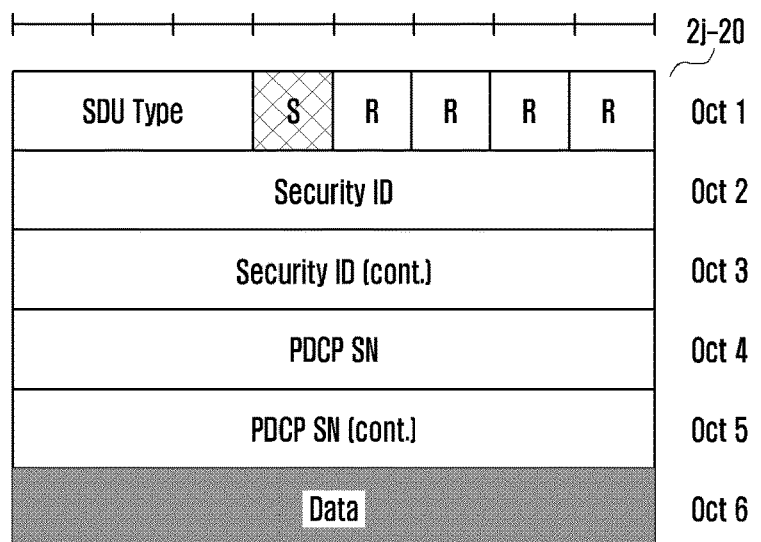
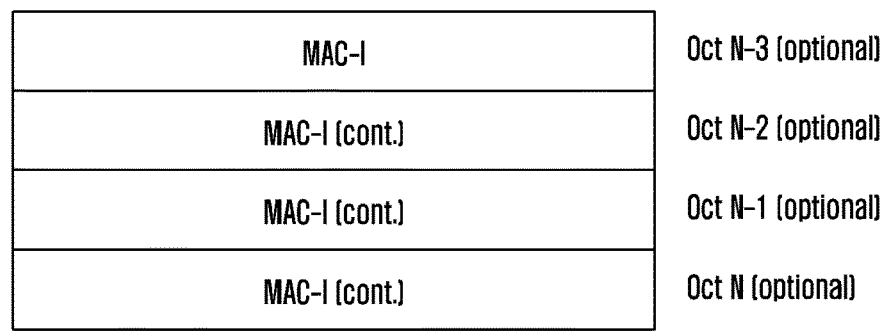

FIG. 2KA
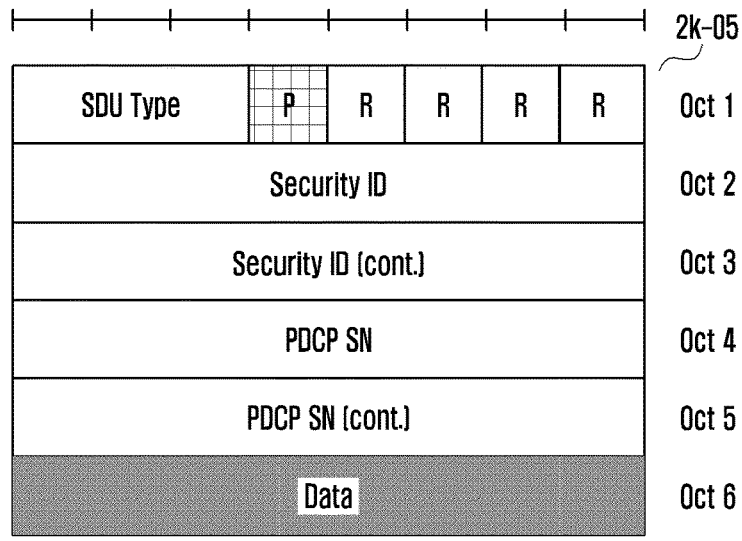
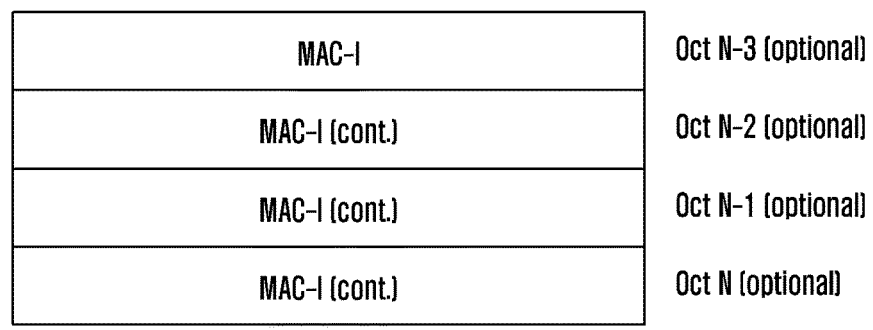
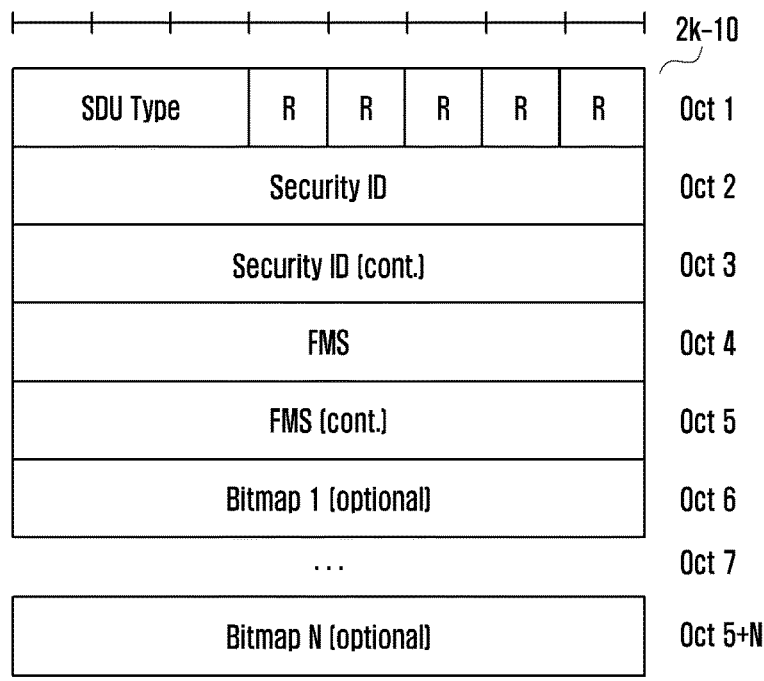

METHOD AND DEVICE FOR IDENTIFYING SECURITY KEY BASED ON PDCP LAYER DEVICE IN NEXT-GENERATION MOBILE COMMUNICATION SYSTEM

CROSS-REFERENCE TO RELATED APPLICATION(S)

This application is a continuation application of prior application Ser. No. 17/294,045 filed on May 14, 2021, which issued as U.S. Pat. No. 11,856,452 on Dec. 26, 2023; which is a U.S. National Stage application under 35 U.S.C. § 371 of an International application number PCT/KR2019/018103 filed on Dec. 19, 2019; and which is based on and claims priority of a Korean patent application number 10-2018-0165242 filed on Dec. 19, 2018 in the Korean Intellectual Property Office, of a Korean patent application number 10-2019-0041817 filed on Apr. 10, 2019 in the Korean Intellectual Property Office, of a Korean patent application number 10-2019-0047065 filed on Apr. 23, 2019 in the Korean Intellectual Property Office, of a Korean patent application number 10-2019-0088346 filed on Jul. 22, 2019 in the Korean Intellectual Property Office, of a Korean patent application number 10-2019-0095151 filed on Aug. 5, 2019 in the Korean Intellectual Property Office, and of a Korean patent application number 10-2019-0096318 filed on Aug. 7, 2019 in the Korean Intellectual Property Office, the disclosure of each of which is incorporated by reference herein in its entirety.

TECHNICAL FIELD

The disclosure relates to a method and device for identifying a security key based on a PDCP layer device in one-to-one communication between wireless devices in a next-generation mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

In a wireless communication system, a downlink may secure more transmission resources by using a high frequency band and a wide bandwidth. Further, because a base station may physically install and use more antennas, a beamforming gain and high signal strength may be obtained; thus, more data may be loaded on the same frequency/time resource to be transmitted to the UE through the downlink. However, in the case of an uplink, the UE physically has a small size, and it is difficult to use a high frequency band and a wide bandwidth for an uplink frequency; thus, uplink transmission resources may become a bottleneck compared to downlink transmission resources. Further, because the maximum transmission power of the UE is much smaller than that of the base station, there is also a problem that the coverage decreases when transmitting uplink data. Therefore, it is necessary to efficiently use transmission resources by compressing uplink data.

Uplink data compression (UDC) is a method of successively performing data compression by finding a data stream that overlaps with next data based on previous data and expressing data in a position and length. The UDC may be set for each bearer, and multiple IP flows may be mapped to one bearer. Accordingly, uplink data compression may or may not be performed on packets for each IP flow. A case that uplink data compression is not performed may be a case that a data compression rate is low because an upper layer device above a PDCP layer device has already performed data compression.

After compressing uplink data, the PDCP layer device may generate a UDC header and indicate in the UDC header that a compression procedure has been performed on upper layer data, and when the compression procedure is not performed on the upper layer data, the PDCP layer device may indicate in the UDC header that the compression procedure has not been performed on upper layer data.

In the case of performing a ciphering procedure in the UDC header generated by the PDCP layer device as described above, a data processing procedure may be complicated when considering a service data adaptation protocol (SDAP) layer device applied to a next-generation mobile communication system. A method of solving this problem has been devised.

Further, a next-generation mobile communication system may be installed for controlling many wireless devices in a factory, and be used for communication between vehicles. In order for wireless devices to operate without errors in communication between wireless devices for factory automation or communication between vehicles, high reliability should be supported in data transmission between wireless devices (Industrial IoT), and in order to prepare for unexpected attacks, security should be strengthened. A method of solving this problem has been devised.

Solution to Problem

According to various embodiments of the disclosure, a method of controlling a transmitter includes receiving a packet data convergence protocol (PDCP) service data unit (SDU) including a data and service data adaptation protocol (SDAP) header from an upper layer; generating a UDC block and a UDC header for the UDC block by performing uplink data compression (UDC) on the data of the PDCP SDU; performing ciphering on the UDC header and the UDC block; generating a PDCP header; and transmitting a PDCP control protocol data unit (PDU) including the PDCP header, the SDAP header, and the ciphered UDC header and UDC block to a lower layer, wherein the SDAP header is positioned after the PDCP header, and the ciphered UDC header and UDC block are positioned after the SDAP header.

According to various embodiments of the disclosure, a transmitter includes a transceiver; and a controller configured to control the transceiver to receive a packet data convergence protocol (PDCP) service data unit (SDU) including a data and service data adaptation protocol (SDAP) header from an upper layer, to perform uplink data compression (UDC) on the data of the PDCP SDU to generate a UDC block and a UDC header for the UDC block, to cipher the UDC header and the UDC block, to generate a PDCP header, and to control the transceiver to transmit a PDCP control protocol data unit (PDU) including the PDCP header, the SDAP header, and the ciphered UDC header and UDC block to a lower layer, wherein the SDAP header is positioned after the PDCP header, and the ciphered UDC header and UDC block are positioned after the SDAP header.

Advantageous Effects of Invention

The disclosure provides methods of setting a reliable one-to-one wireless link and enhancing security in data transmission between wireless devices in a next-generation mobile communication system supporting vehicle-to-vehicle communication or a factory automation facility supporting a wired time sensitive network (TSN) that guarantees low transmission delay and high reliability through various embodiments thereof.

BRIEF DESCRIPTION OF DRAWINGS

FIG. 1O is a block diagram illustrating TRP in a wireless communication system to which an embodiment of the disclosure may be applied.

FIG. 2I is a diagram illustrating a specific first embodiment in which a data radio bearer (DRB) performs the security check procedure proposed in FIG. 2H.

FIGS. 2JA and 2JB are diagrams illustrating a specific second embodiment in which a sidelink radio bearer (SLRB) performs the security check procedure proposed in FIG. 2H.

FIG. 2O is a block diagram illustrating TRP or a wireless node in a wireless communication system to which an embodiment of the disclosure may be applied.

MODE FOR THE INVENTION

Hereinafter, an operation principle of the disclosure will be described in detail with reference to the accompanying drawings. Detailed descriptions of well-known functions and structures incorporated in the disclosure may be omitted to avoid obscuring the subject matter of the disclosure. The terms to be described later are defined considering functions of the disclosure and may vary depending on a user's or an operator's intension and usage. Therefore, the terms used herein should be understood based on the descriptions of the disclosure.

Detailed descriptions of well-known functions and structures incorporated in the disclosure may be omitted to avoid obscuring the subject matter of the disclosure. Hereinafter, embodiments of the disclosure will be described in detail with reference to the accompanying drawings.

A term for identifying an access node, a term for indicating network entities, a term for indicating messages, a term for indicating an interface between network entities, and a term for indicating various identification information used in the following description are illustrated for convenience of description. Accordingly, the disclosure is not limited to terms to be described later, and other terms for indicating objects having an equivalent technical meaning may be used.

Hereinafter, for convenience of description, the disclosure uses terms and names defined in the 3rd generation partnership project long term evolution (3GPP LTE) standard. However, the disclosure is not limited by the terms and names, and may be applied equally to systems conforming to other standards. In the disclosure, an eNB may be used interchangeably with a base station for convenience of description. That is, a base station described as an eNB may represent a gNB. Further, the term 'terminal' may represent mobile phones, NB-IoT devices, sensors as well as other wireless communication devices.

Figure 1A:
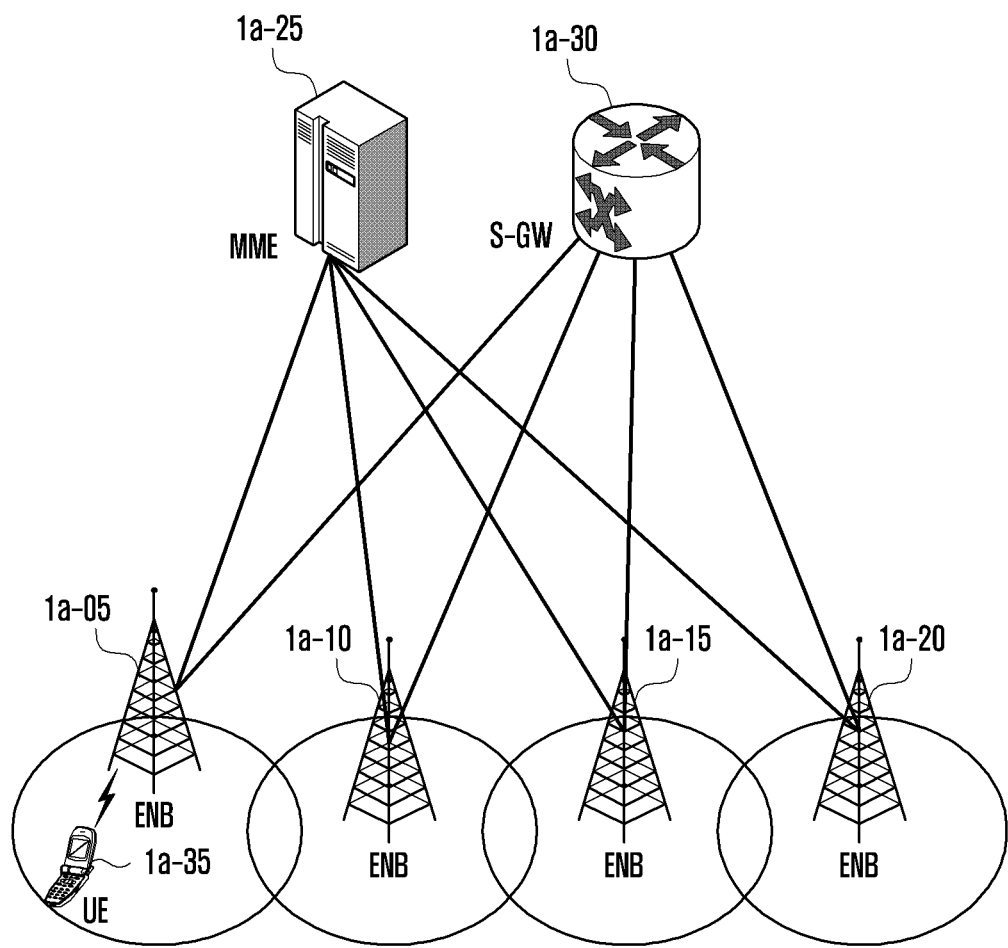
FIG. 1A is a diagram illustrating a structure of an LTE system to which the disclosure may be applied.

FIG. 1A is a diagram illustrating a structure of an LTE system to which the disclosure may be applied.

With reference to FIG. 1A, as illustrated, a radio access network of the LTE system is configured with evolved nodes B (hereinafter, ENB, node B, or base station) 1a-05, 1a-10, 1a-15, and 1a-20, a mobility management entity (MME) 1a-25, and a serving-gateway (S-GW) 1a-30. A user equipment (hereinafter, UE or terminal) 1a-35 accesses an external network through the ENBs 1a-05 to 1a-20 and the S-GW 1a-30.

In FIG. 1A, the ENBs 1a-05 to 1a-20 correspond to an existing node B of an UMTS system. The ENB is connected to the UE 1a-35 through a radio channel and performs a more complex role than that of an existing node B. In the LTE system, because all user traffic including real-time services such as a voice over IP (VoIP) through an Internet protocol are serviced through a shared channel, a device that collects and schedules status information such as a buffer status, available transmission power status, and channel status of UEs is required, and the ENBs 1a-05 to 1a-20 are in charge of this. One ENB generally controls multiple cells. For example, in order to implement a transmission rate of 100 Mbps, the LTE system uses, for example, an orthogonal frequency division multiplexing (hereinafter, referred to as OFDM) as radio access technology in a 20 MHz bandwidth. Further, an adaptive modulation and coding (hereinafter, referred to as AMC) method that determines a modulation scheme and a channel coding rate is applied according to a channel status of the UE. The S-GW 1a-30 is a device that provides a data bearer and generates or removes a data bearer according to the control of the MME 1a-25. The MME is a device in charge of various control functions as well as a mobility management function of the UE and is connected to a number of base stations.

Figure 1B:
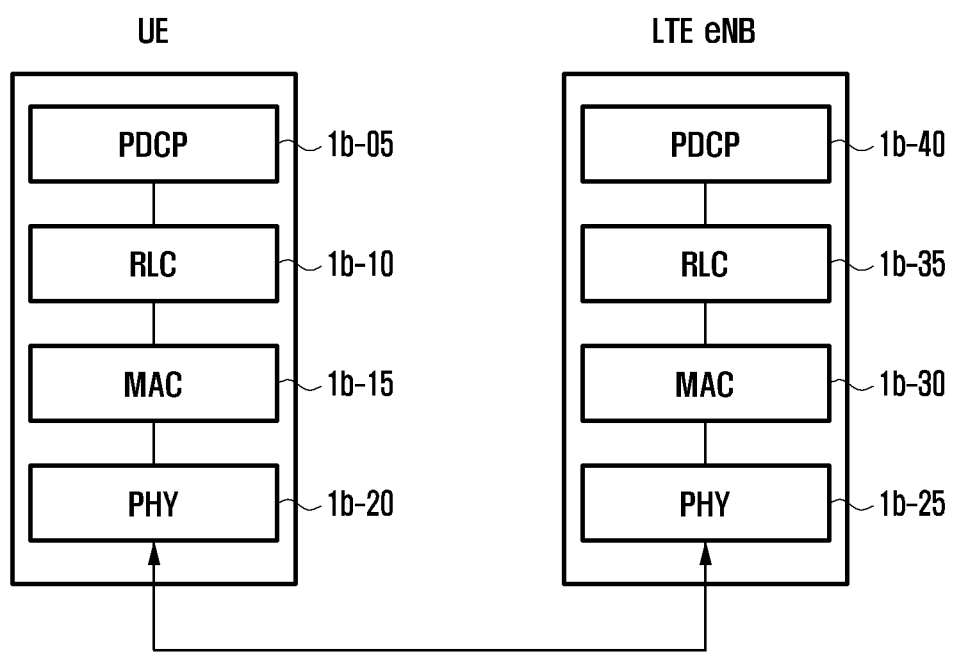
FIG. 1B is a diagram illustrating a radio protocol structure in an LTE system to which the disclosure may be applied.

FIG. 1B is a diagram illustrating a radio protocol structure in an LTE system to which the disclosure may be applied.

With reference to FIG. 1B, a radio protocol of the LTE system is configured with packet data convergence protocols (PDCPs) 1b-05 and 1b-40, radio link controls (RLCs) 1b-10 and 1b-35, and medium access controls (MACs) 1b-15 and 1b-30 at the UE and the ENB, respectively. The PDCPs 1b-05 and 1b-40 are in charge of operations such as IP header compression/restoration. Main functions of the PDCP are summarized as follows.

Header compression and decompression (ROHC only)
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

Radio Link Control (hereinafter, referred to as RLC) 1b-10 and 1b-35 reconfigure a PDCP protocol data unit (PDU) in an appropriate size to perform an ARQ operation. Main functions of the RLC are summarized as follows.

Transfer of upper layer PDUs
Error correction through ARQ (only for AM data transfer)
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MACs 1b-15 and 1b-30 are connected to several RLC layer devices configured in one UE, and perform an operation of multiplexing RLC PDUs to MAC PDUs and demultiplexing the RLC PDUs from the MAC PDUs. Main functions of MAC are summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding Physical layers 1b-20 and 1b-25 perform an operation of channel-coding and modulating upper layer data, converting the upper layer data into OFDM symbols, and transmitting the OFDM symbols to the radio channel, or demodulating and channel-decoding the OFDM symbol received through the radio channel and transmitting the OFDM symbol to the upper layer.

Figure 1C:
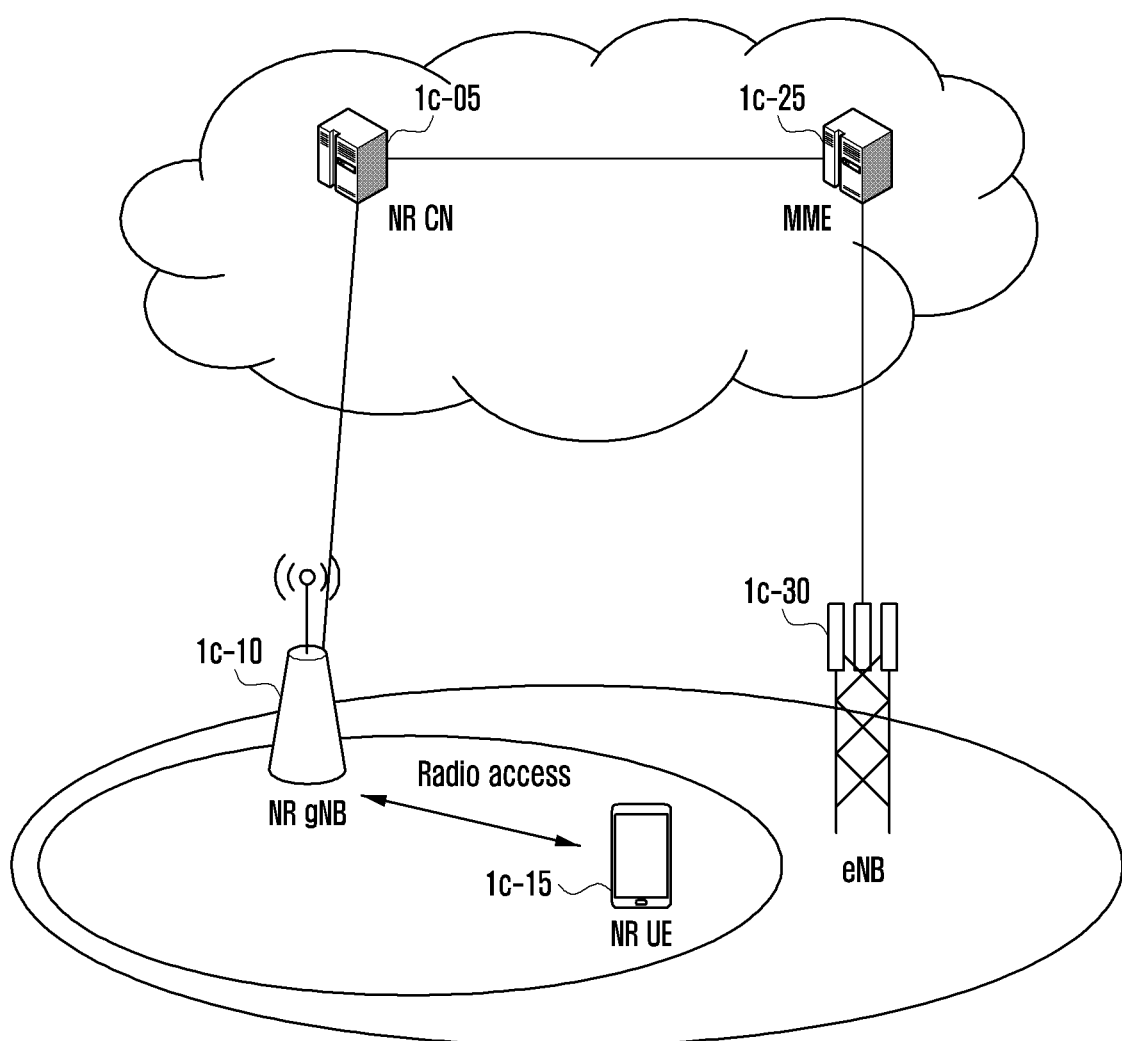
FIG. 1C is a diagram illustrating a structure of a next-generation mobile communication system to which the disclosure may be applied.

FIG. 1C is a diagram illustrating a structure of a next-generation mobile communication system to which the disclosure may be applied.

With reference to FIG. 1C, as illustrated, a radio access network of a next-generation mobile communication system (hereinafter, NR or 5G) is configured with a new radio node B (hereinafter, NR gNB or NR base station) 1c-10 and a new radio core network (NR CN) 1c-05. A new radio user equipment (hereinafter, NR UE or terminal) 1c-15 accesses an external network through the NR base station 1c-10 and the NR CN 1c-05.

In FIG. 1C, the NR gNB 1c-10 corresponds to an evolved node B (eNB) of an existing LTE system. The NR gNB is connected to the NR UE 1c-15 through a radio channel and may provide a service superior to that of the existing node B. In the next-generation mobile communication system, because all user traffic is serviced through a shared channel, a device that collects and schedules status information such as a buffer status, available transmission power status, and channel status of UEs is required, and the NR gNB 1c-10 is in charge of this. One NR gNB generally controls multiple cells. In order to implement ultra-high speed data transmission compared to current LTE, it may have an existing maximum bandwidth or more, and an orthogonal frequency division multiplexing (hereinafter, referred to as OFDM) may be used as radio access technology, and additional beamforming technology may be applied. Further, an adaptive modulation and coding (hereinafter, referred to as AMC) method of determining a modulation scheme and a channel coding rate according to the channel status of the UE is applied. The NR CN 1c-05 performs functions such as mobility support, bearer setup, and QoS setup. The NR CN is a device in charge of various control functions as well as a mobility management function of the UE and is connected to a plurality of base stations. Further, the next-generation mobile communication system may be interworked with the existing LTE system, and the NR CN is connected to an MME 1c-25 through a network interface. The MME is connected to an eNB 1c-30, which is an existing base station.

Figure 1D:
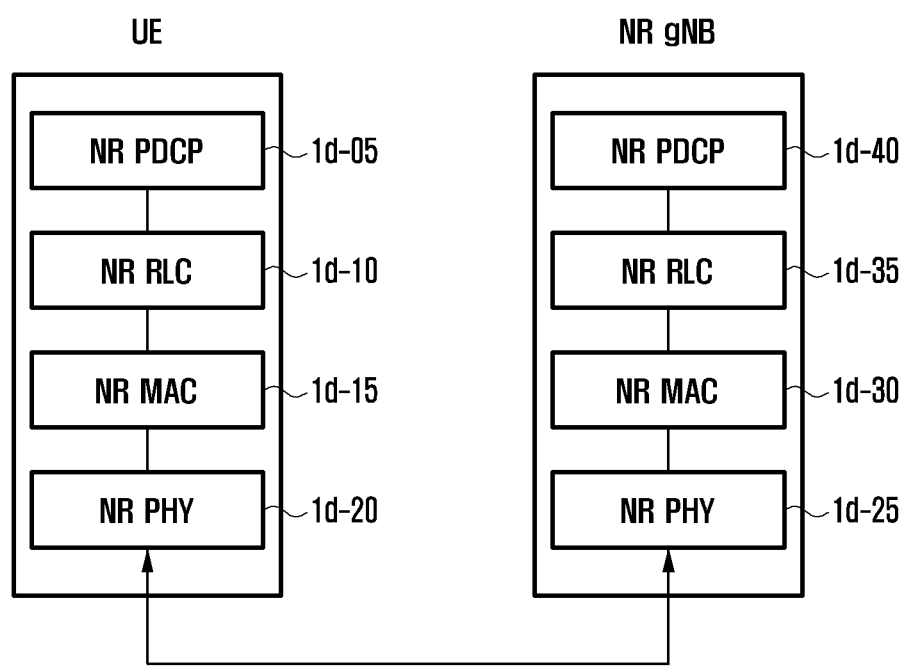
FIG. 1D is a diagram illustrating a radio protocol structure of a next-generation mobile communication system to which the disclosure may be applied.

FIG. 1D is a diagram illustrating a radio protocol structure of a next-generation mobile communication system to which the disclosure may be applied.

With reference to FIG. 1D, the radio protocol of the next-generation mobile communication system is configured with NR PDCPs 1d-05 and 1d-40, NR RLCs 1d-10 and 1d-35, and NR MACs 1d-15 and 1d-30 in the UE and the NR base station, respectively. Main functions of the NR PDCPs 1d-05 and 1d-40 may include some of the following functions.

Header compression and decompression (ROHC only)
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs Ciphering and deciphering Timer-based SDU discard in uplink In the above description, a reordering function of the NR PDCP device refers to a function of reordering PDCP PDUs received from a lower layer based on the PDCP sequence number (SN), and may include a function of delivering data to an upper layer in the reordered order or may include a function of immediately delivering without considering the order, a function of recording lost PDCP PDUs by reordering the order, a function of reporting a status of lost PDCP PDUs at the transmission side, and a function of requesting retransmission of lost PDCP PDUs.

Main functions of the NR RLCs 1d-10 and 1d-35 may include some of the following functions.

Transfer of upper layer PDUs

In-sequence delivery of upper layer PDUs

Out-of-sequence delivery of upper layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above description, in-sequence delivery of the NR RLC device refers to a function of delivering in order RLC SDUs received from the lower layer to the upper layer, and when one RLC SDU is originally divided into several RLC SDUs and received, the in-sequence delivery may include a function of reassembling and delivering several RLC SDUs, a function of rearranging the received RLC PDUs based on the RLC sequence number (SN) or the PDCP SN, a function of recording lost RLC PDUs by reordering the order, a function of reporting a status of lost RLC PDUs to the transmitting side, and a function of requesting retransmission of lost RLC PDUs, and when there is a lost RLC SDU, the in-sequence delivery may include a function of delivering in order only RLC SDUs before the lost RLC SDU to the upper layer, or even if there is a lost RLC SDU, when a predetermined timer expires, the in-sequence delivery may include a function of delivering in order all RLC SDUs received before the start of the timer to the upper layer, or even if there is a lost RLC SDU, when a predetermined timer expires, the in-sequence delivery may include a function of delivering in order all RLC SDUs received so far to the upper layer. Further, the NR RLC device may process RLC PDUs in order of reception (sequence number, regardless of the order of sequence number, in order of arrival), deliver the RLC PDUs to the PDCP device out-of sequence delivery, and in the case of segments, the NR RLC device may receive segments stored in a buffer or to be received later, reconfigure and process the segments into one complete RLC PDU, and deliver the one complete RLC PDU to the PDCP device. The NR RLC layer may not include a concatenation function, and the function may be performed in an NR MAC layer or may be replaced with a multiplexing function of the NR MAC layer.

Out-of-sequence delivery of the NR RLC device refers to a function of directly delivering RLC SDUs received from the lower layer to the upper layer regardless of the order, and when one RLC SDU is originally divided and received into several RLC SDUs, the out-of-sequence delivery may include a function of reassembling and delivering several RLC SDUs, and a function of storing the RLC SN or PDCP SN of the received RLC PDUs, sorting the order, and recording the lost RLC PDUs.

The NR MACs 1d-15 and 1d-30 may be connected to several NR RLC layer devices configured in one UE, and main functions of the NR MAC may include some of the following functions.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

The NR PHY layers 1d-20 and 1d-25 may perform an operation of channel-coding and modulating upper layer data, converting the upper layer data into OFDM symbols, and transmitting the OFDM symbols to the radio channel, or demodulating and channel-decoding OFDM symbols received through the radio channel and delivering the OFDM symbols to the upper layer.

The disclosure proposes a procedure for compressing data when a UE transmits data through an uplink in a wireless communication system and decompressing data at a base station, and compressing and transmitting data at a transmitter, such as a solution when a specific header format and decompression fails and proposes a support method of a data transmission and reception procedure of decompressing data at a receiver. Further, the method proposed in the disclosure may be applied to a procedure in which the base station compresses and transmits data when transmitting downlink data to the UE and in which the UE receives and decompresses the compressed downlink data. As described above, the disclosure obtains effects of enhancing coverage while transmitting more data by compressing and transmitting data at the transmitter.

Figure 1E:
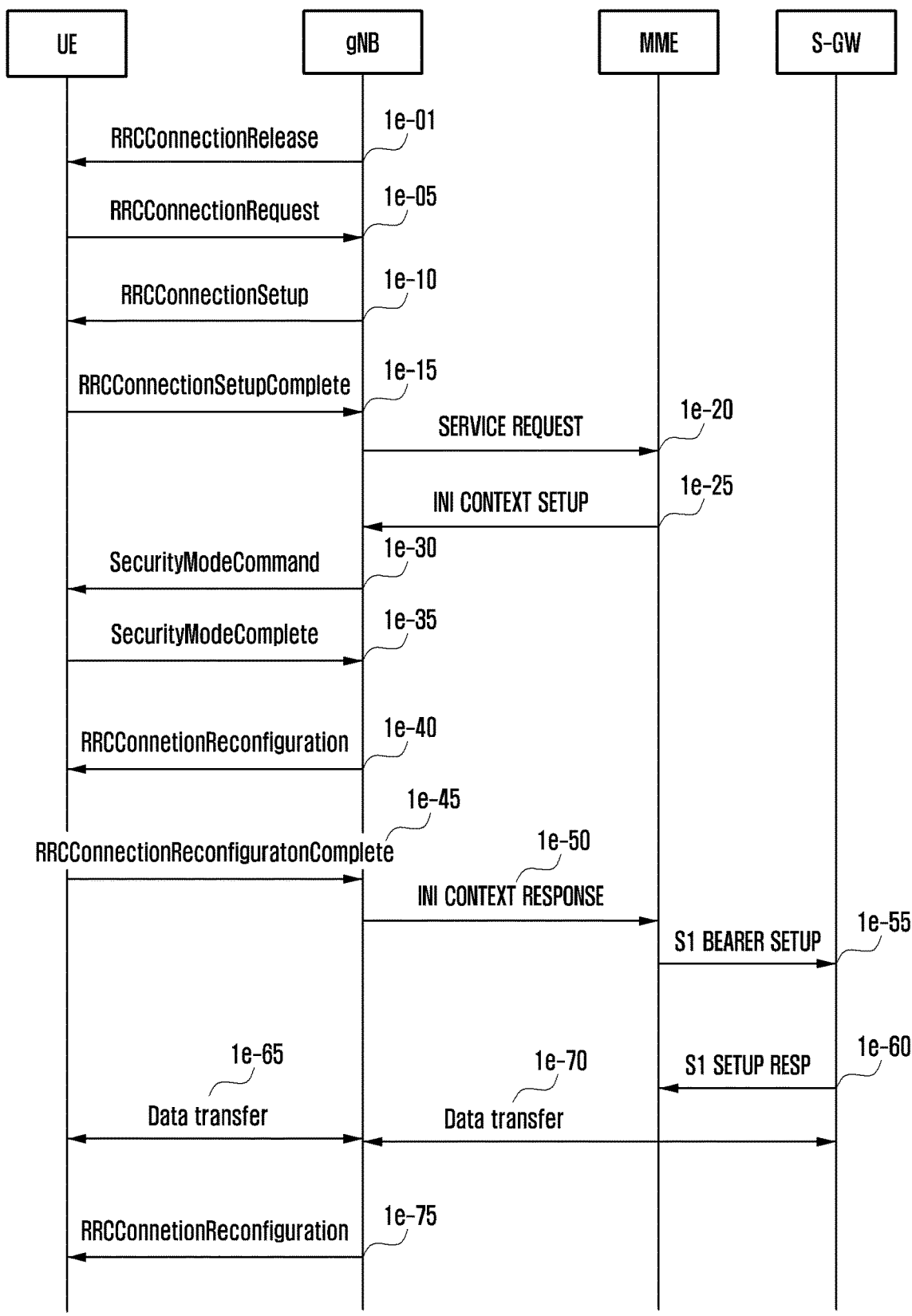
FIG. 1E is a diagram illustrating a procedure for setting whether a base station performs uplink data compression when a UE sets connection with a network according to various embodiments of the disclosure.

FIG. 1E is a diagram illustrating a procedure for setting whether a base station is to perform uplink data compression when a UE sets connection with a network according to various embodiments of the disclosure.

FIG. 1E illustrates a procedure in which UE sets connection with a network by switching from RRC idle mode or RRC inactive mode (or lightly-connected mode) to RRC connected mode in the disclosure and illustrates a procedure of setting whether to perform uplink data compression (UDC).

In FIG. 1E, when the UE transmitting and receiving data in RRC connected mode does not transmit or receive data for a predetermined reason or for a predetermined time, the base station may send RRCConnectionRelease message to the UE to switch the UE to the RRC idle mode (1e-01). In the future, when data to transmit occurs, the UE (hereinafter, idle mode UE) in which the connection is not currently set performs RRC connection establishment process with the base station. The UE establishes backward transmission synchronization with the base station through a random access process and transmits RRCConnectionRequest message to the base station (1e-05). In the message, an identifier of the UE and the reason for establishing connection (establishmentCause) are included. The base station transmits RRCConnectionSetup message so that the UE sets an RRC connection (1e-10). The message may include information indicating whether to use an uplink data compression method (UDC) for each logical channel (logicalchannelconfig), for each bearer, or for each PDCP device (PDCP-config). Further, in more detail, each logical channel or bearer or each PDCP device (or SDAP device) may indicate whether to use UDC only for which IP flow or QoS flow (By setting information on IP flows or QoS flows that uses or does not use an UDC to the SDAP device, the SDAP device may instruct the PDCP device to use or not use the UDC for each QoS flow, or the PDCP device may self-identify each QoS flow and determine whether to apply the uplink compression method). Further, when instructing to use the UDC, an identifier for a predefined library or dictionary to be used in the UDC or a buffer size to be used in the UDC may be indicated. Further, the message may include a command to setup or release to perform uplink decompression. Further, when setting to use the UDC, it may always be set to RLC AM bearer (a lossless mode with an ARQ function and a retransmission function), and may not be set together with a header compression protocol (ROHC). Further, RRC connection configuration information and the like are included in the message. RRC connection is also referred to as signaling radio bearer (SRB) and is used for transmitting and receiving an RRC message, which is a control message between the UE and the base station. The UE that has set the RRC connection transmits an RRCConnetionSetupComplete message to the base station (1e-15). When the base station does not know a UE capability of the currently connected UE or wants to determine a UE capability, the base station may send a message asking for the UE capability. The UE may send a message reporting a capability thereof. The message may represent whether the UE may use UDC, and include and send an indicator indicating this. The RRCConnetionSetupComplete message includes a control message called service request for requesting the MME to set up a bearer for a predetermined service by the UE. The base station transmits a service request message received in the RRCConnetionSetupComplete message to the MME (1e-20), and the MME determines whether to provide a service requested by the UE. When the MME determines to provide a service requested by the UE, the MME transmits an initial context setup request message to the base station (1e-25). The message includes information such as quality of service (QoS) information to be applied when setting up a data radio bearer (DRB), and security related information (e.g., security key, security algorithm) to be applied to the DRB. In order to set security with the UE, the base station exchanges a SecurityModeCommand message (1e-30) and SecurityModeComplete message (1e-35). When security setup is completed, the base station transmits RRCConnectionReconfiguration message to the UE (1e-40). The message may include information indicating whether to use the UDC for each logical channel (logicalchannelconfig), for each bearer, or for each PDCP device (PDCP-config). Further, in more detail, each logical channel or bearer or each PDCP device (or SDAP device) may instruct whether to use an UDC only for which IP flow or QoS flow (By setting information on IP flows or QoS flows that uses or does not use an UDC to the SDAP device, the SDAP device may instruct the PDCP device to use or not use the UDC for each QoS flow, or the PDCP device may self-identify each QoS flow and determine whether to apply the uplink compression method). Further, when instructing to use the UDC, the SDAP device may indicate an identifier for a predefined library or dictionary to be used in the UDC or a buffer size to be used in the UDC. Further, the message may include a command to setup or release to perform uplink decompression. Further, when setting to use the UDC, the RLC AM bearer (a lossless mode with the ARQ function and retransmission function) may be always set, and may not be set together with the header compression protocol (ROHC). The message includes setup information of a DRB in which user data is to be processed, and the UE applies the information to set the DRB and transmits an RRCConnectionReconfigurationComplete message to the base station (1e-45). The base station that has completed DRB setup with the UE transmits an initial context setup complete message to the MME (1e-50), and the MME that has received the message exchanges an S1 bearer setup message and an S1 bearer setup response message in order to set up S1 bearer with the S-GW (1e-055, 1e-60). The S1 bearer is a data transmission connection set between the S-GW and the base station and corresponds to the DRB on a one-to-one basis. When all of the above processes are completed, the UE transmits and receives data to and from the base station through the S-GW (1e-65, 1e-70). In this way, a general data transmission process is largely configured with three steps of RRC connection setup, security setup, and DRB setup. Further, in order to newly establish, add, or change setup to the UE for a predetermined reason, the base station may transmit an RRCConnectionReconfiguration message to the UE (1e-75). The message may include information indicating whether to use the UDC for each logical channel (logicalchannelconfig), for each bearer, or for each PDCP device (PDCP-config). Further, in more detail, the SDAP device may instruct to use UDC only for which IP flow or QoS flow in each logical channel or bearer or each PDCP device (or SDAP device) (By setting information on IP flows or QoS flows that uses or does not use an UDC to the SDAP device, the SDAP device may instruct the PDCP device to use or not use the UDC for each QoS flow, or the PDCP device may self-identify each QoS flow and determine whether to apply the uplink compression method). Further, when instructing to use the UDC, the SDAP device may indicate an identifier for a predefined library or dictionary to be used in the UDC or a buffer size to be used in the UDC. Further, the message may include a command to setup or release to perform uplink decompression. Further, when setting to use the UDC, it may always be set to an RLC AM bearer (a lossless mode with an ARQ function and a retransmission function), and may not be set together with a header compression protocol (ROHC).

Figure 1F:
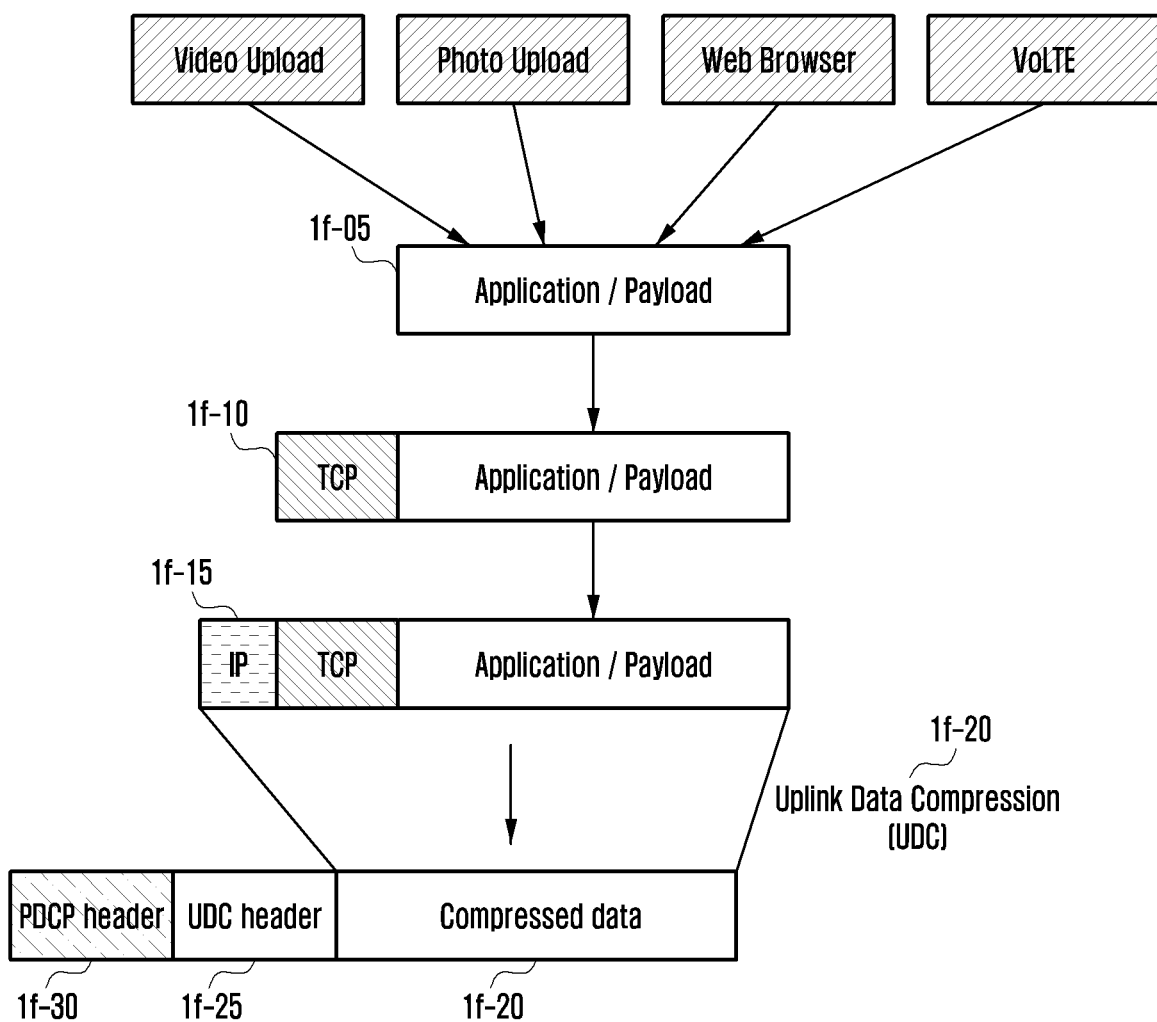
FIG. 1F is a diagram illustrating a data configuration and a procedure for performing uplink data compression according to various embodiments of the disclosure.

FIG. 1F is a diagram illustrating a data configuration and a procedure for performing uplink data compression according to various embodiments of the disclosure.

In FIG. 1F, uplink data 1f-05 may be generated as data corresponding to services such as video transmission, photo transmission, web search, and VoLTE. Data generated in an application layer device may be processed through TCP/IP or UDP corresponding to a network data transport layer, configure each header 1f-10 and 1f-15, and delivered to the PDCP layer. When the PDCP layer receives data (PDCP SDU) from an upper layer, the PDCP layer may perform the following procedure.

When it is set to use the UDC in the PDCP layer by the RRC message such as 1e-10, 1e-40, or 1e-75 in FIG. 1E, the PDCP layer (or PDCP layer, PDCP entity) may perform an UDC for the PDCP SDU to compress uplink data as in 1f-20, configure a corresponding UDC header (header for compressed uplink data) 1f-25, perform ciphering on the compressed data except for the UDC header, perform integrity protection when integrity protection is set, and configure the PDCP header 1f-30 to configure PDCP PDU. The PDCP layer device includes UDC compression/decompression device, determines whether to perform UDC procedure for each data as set in the RRC message, and uses the UDC compression/decompression device. The transmitter performs data compression using the UDC compression device in the transmitting PDCP layer device, and the receiver performs data decompression using the UDC decompression device in the receiving PDCP layer device.

The above-described procedure of FIG. 1F may be applied not only when the UE compresses uplink data but also compresses downlink data. Further, the description of the uplink data may be equally applied to downlink data.

Figure 1G:
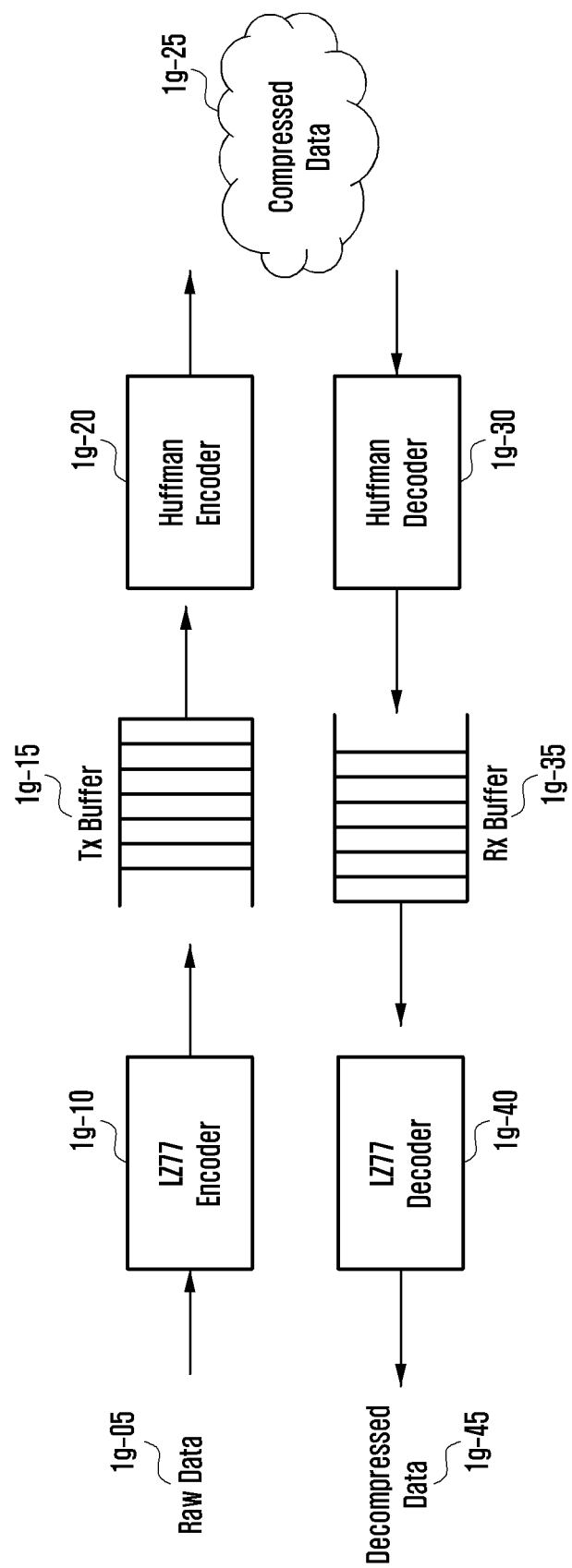
FIG. 1G is a diagram illustrating an embodiment of a method of compressing uplink data according to various embodiments of the disclosure.

FIG. 1G is a diagram illustrating an embodiment of a method of compressing uplink data that may be applied according to various embodiments of the disclosure.

FIG. 1G is a diagram illustrating a description of a DEFLATE-based uplink data compression algorithm, and the DEFLATE-based uplink data compression algorithm is a lossless compression algorithm. The DEFLATE-based uplink data compression algorithm basically combines an LZ77 algorithm and Huffman coding to compress uplink data. The LZ77 algorithm performs an operation of finding a duplicated array of data, and when a duplicated array is found, the LZ77 algorithm finds the duplicated array in a sliding window through the sliding window, and when there is a duplicated array, by expressing the degree of duplication and a position having the duplicated array within the sliding window in a length, the LZ77 algorithm performs data compression. The sliding window is also called a buffer in a UDC, and may be set to 8 kilobytes or 32 kilobytes. For example, the sliding window or buffer may record 8192 or 32768 characters, find an overlapping array, and express the overlapping array in terms of position and length to perform compression. Therefore, because the LZ algorithm is a sliding window method, for example, the LZ algorithm updates previously coded data in a buffer, and codes immediate next data; thus, the LZ algorithm has a correlation between consecutive data. Therefore, when firstly coded data is normally decoded, next data may be normally decoded. Codes (expression of positions, lengths, and the like) that are expressed in position and length by the LZ77 algorithm and that are compressed are compressed once more through Huffman coding. The Huffman coding uses a short notation for a code with a large degree of overlap while finding overlapping codes again and uses a long notation for a code with a small degree of overlap, and performs compression once again. The Huffman coding is a prefix code, and is an optimal coding scheme in which all codes are uniquely decodable.

As described above, the transmitter may apply an LZ77 algorithm to original data 1g-05 to perform encoding (1g-10), update the buffer (1g-15), generate checksum bits on contents (or data) of the buffer, and configure the checksum bits in the UDC header. The checksum bits are used when the receiver determines whether the buffer status is valid. The transmitter may compress once more codes encoded by the LZ77 algorithm by Huffman coding and transmit the codes to uplink data (1g-25). The receiver performs a decompression procedure of the received compressed data in a manner opposite to that of the transmitter. For example, the receiver performs Huffman decoding (1g-30), updates the buffer (1g-35), and identifies whether the validity of the updated buffer with the checksum bits of the UDC header. When it is determined that the checksum bits are not in error, the receiver performs decoding using the LZ77 algorithm (1g-40) to decompress the data and restore the original data to transfer the data to the upper layer (1g-45).

As described above, because the LZ algorithm is a sliding window method, for example, the LZ algorithm updates the previously coded data in the buffer and codes immediate next data, and thus has a correlation between successive data. Therefore, when firstly coded data is normally decoded, next data may be normally decoded. Therefore, the receiving PDCP layer device identifies the PDCP sequence number of the PDCP header, identifies the UDC header (identifies an indicator indicating whether data compression has been performed or not), and performs a data decompression procedure in ascending order of the PDCP sequence number for data to which the data compression procedure has been applied.

A procedure for a base station to set UDC to a UE and a procedure for the UE to perform UDC proposed in the disclosure are as follows.

The base station may set or release to perform uplink data compression on a bearer or logical channel that sets an RLC AM mode to the UE based on an RRC message such as 1e-10, 1e-40, or 1e-75 in FIG. 1E. Further, the UDC device (or protocol) of the PDCP layer device of the UE may be reset using the RRC message. In the above description, resetting the UDC device (or protocol) means resetting a UDC buffer for compressing uplink data of the UE, and is to synchronize the UDC buffer of the UE and the UDC buffer for decompressing uplink data of the base station. In the above description, an operation of resetting the buffer of the UDC device may be used when defining by modifying the existing PDCP control PDU or defining a new PDCP control PDU to use when the transmitter (base station) resets the UDC buffer of the receiver (UE) with the PDCP control PDU instead of the RRC message and synchronizes for user data compression and decompression between the transmitting and receivers. Further, it is possible to perform uplink data compression for each bearer, for each logical channel, or for each PDCP layer device by using the RRC message, and more specifically, it is possible to set whether to perform uplink data decompression for each IP flow (or QoS flow) within a single bearer or logical channel or PDCP layer device.

Further, the base station may set a PDCP discard timer value to the UE based on the RRC message. The PDCP discard timer value may separately set a PDCP discard timer value for data that does not perform uplink data compression and a PDCP discard timer value for data to which uplink data compression is applied.

When it is set to perform uplink data compression for a predetermined bearer, logical channel, or PDCP layer device (or for which QoS flows of a predetermined bearer, logical channel, or PDCP layer device) based on the RRC message, the UE resets the buffer in the UDC device of the PDCP layer device according to the setup and prepares a uplink data compression procedure. When the UE receives data from a higher layer (PDCP SDU), if the PDCP layer device is set to perform uplink data compression, the UE performs uplink data compression on the received data. When it is set to perform uplink data compression only for specific QoS flows of the PDCP layer device, the UE identifies the indication of the upper SDAP layer or a QoS flow identifier to determine whether to perform uplink data compression, and performs uplink data compression. When the UE performs UDC and updates the buffer according to the data compression, the UE configures a UDC buffer. When UDC is performed, the UE may compress the PDCP SDU received from the upper layer into UDC compressed data (UDC block) having a smaller size. The UDC header for the compressed UDC compressed data is configured. The UDC header may include an indicator indicating whether uplink data compression has been performed or not (e.g., in the UDC header, when a 1-bit indicator is 0, UDC is applied, and when a 1-bit indicator is 1, UDC is not applied). A case in which uplink data compression is not applied may include a case where data compression cannot be performed using the UDC compression method (DEFLATE algorithm) described above because a PDCP SDU data structure received from the upper layer does not have a repetitive data structure. In the above description, when UDC is performed on data (PDCP SDU) received from the upper layer and the UDC buffer is updated, in order to identify the validity of the updated UDC buffer, the receiver PDCP layer device may calculate checksum bits and include the checksum bits in the UDC buffer (the checksum bits may have a predetermined length and be configured with, for example, 4 bits).

The UE performs ciphering on data to which the uplink data decompression is applied or not, and when integrity protection is set, the UE performs integrity protection and delivers the data to a lower layer.

In the following description of the disclosure, there is proposed a method of effectively performing uplink data compression (UDC) proposed in the disclosure when the SDAP layer device is set or the SDAP header is set.

In the disclosure, a first embodiment of efficiently performing a user data compression method when an SDAP layer device is set or SDAP header is set based on the RRC message is proposed as follows. In the first embodiment, it is characterized that the SDAP header is compressed using uplink data compression and that the UDC header is ciphered, and due to the above characteristics, because the same procedure may be performed with respect to upper layer data regardless of the presence or absence of SDAP header, convenience of implementation can be improved, and security can be enhanced by ciphering the UDC header.

Figure 1H:
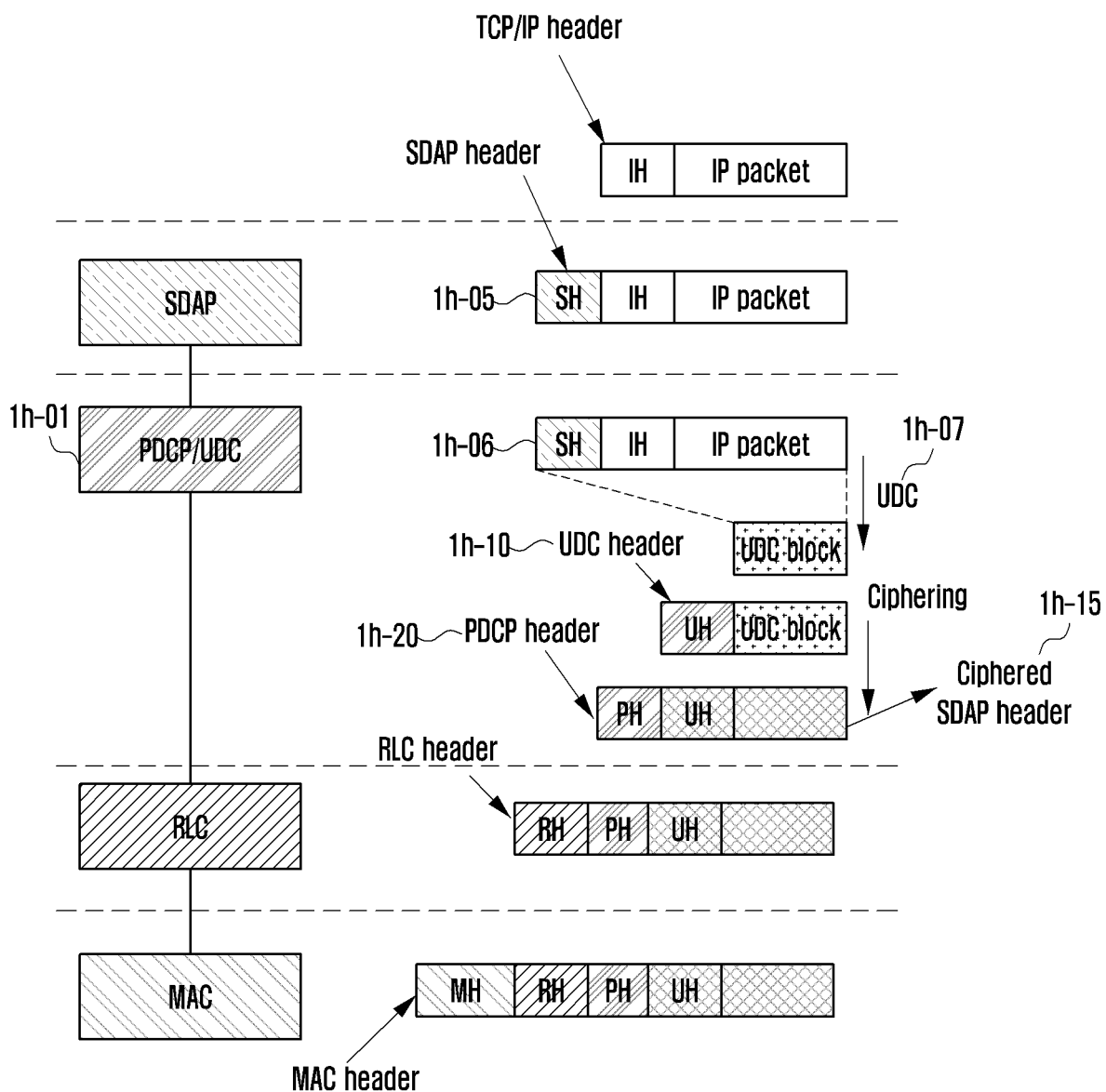
FIG. 1H is a diagram illustrating the first embodiment of efficiently performing a user data compression method when SDAP layer device is set or SDAP header is set based on the RRC message in the disclosure.

FIG. 1H is a diagram illustrating a first embodiment of efficiently performing a user data compression method when SDAP layer device is set or an SDAP header is set based on the RRC message in the disclosure.

In FIG. 1H, when it is set to use the SDAP layer device or when it is set to use the SDAP header and when UDC is set by an RRC message such as 1e-10, 1e-40, or 1e-75 in FIG. 1E, if the SDAP layer device receives data from an upper layer, the SDAP layer device may generate and configure an SDAP header as in 1h-05, and deliver the SDAP header to the PDCP layer device. The data may include a TCP/IP header and an IP packet. The PDCP layer device may perform user data compression on a PDCP SDU (SDAP header and IP packet) 1h-06 received from an upper SDAP layer device (1h-07). The PDCP layer device may calculate a checksum field and identify whether UDC is applied, and generate and attach a UDC header (1h-10). The PDCP layer device may perform ciphering on the UDC header and the compressed UDC block, generate, configure, and concatenate PDCP header 1h-20, and deliver data to a lower layer to perform data processing in the RLC layer device and the MAC layer device.

The procedure described in FIG. 1H is characterized in that the SDAP header is compressed using uplink data compression and that the UDC header is ciphered. Due to the above characteristics, because the same procedure may be performed with respect to upper layer data regardless of the presence or absence of an SDAP header, convenience of implementation can be improved, and security can be enhanced by ciphering the UDC header.

In the disclosure, a second embodiment of efficiently performing a user data compression method when an SDAP layer device is set or an SDAP header is set based on an RRC message is proposed as follows. In the second embodiment, it is characterized that the user data compression method is not applied to the SDAP header and that the SDAP header is not ciphered and that the UDC header is ciphered, and due to the above characteristics, there is the advantage that the transmitter or the receiver may use QoS information of the SDAP header without the need for a decoding procedure of SDAP header information. For example, the base station may use the QoS information for scheduling, and in UE implementation, perform a UDC procedure and perform ciphering with a hardware accelerator without the need for generating SDAP header whenever a higher layer data is received, and because the SDAP header may be attached later; thus, it is easy to implement the UE. Further, the UDC header may be ciphered to enhance security.

Figure 1I:
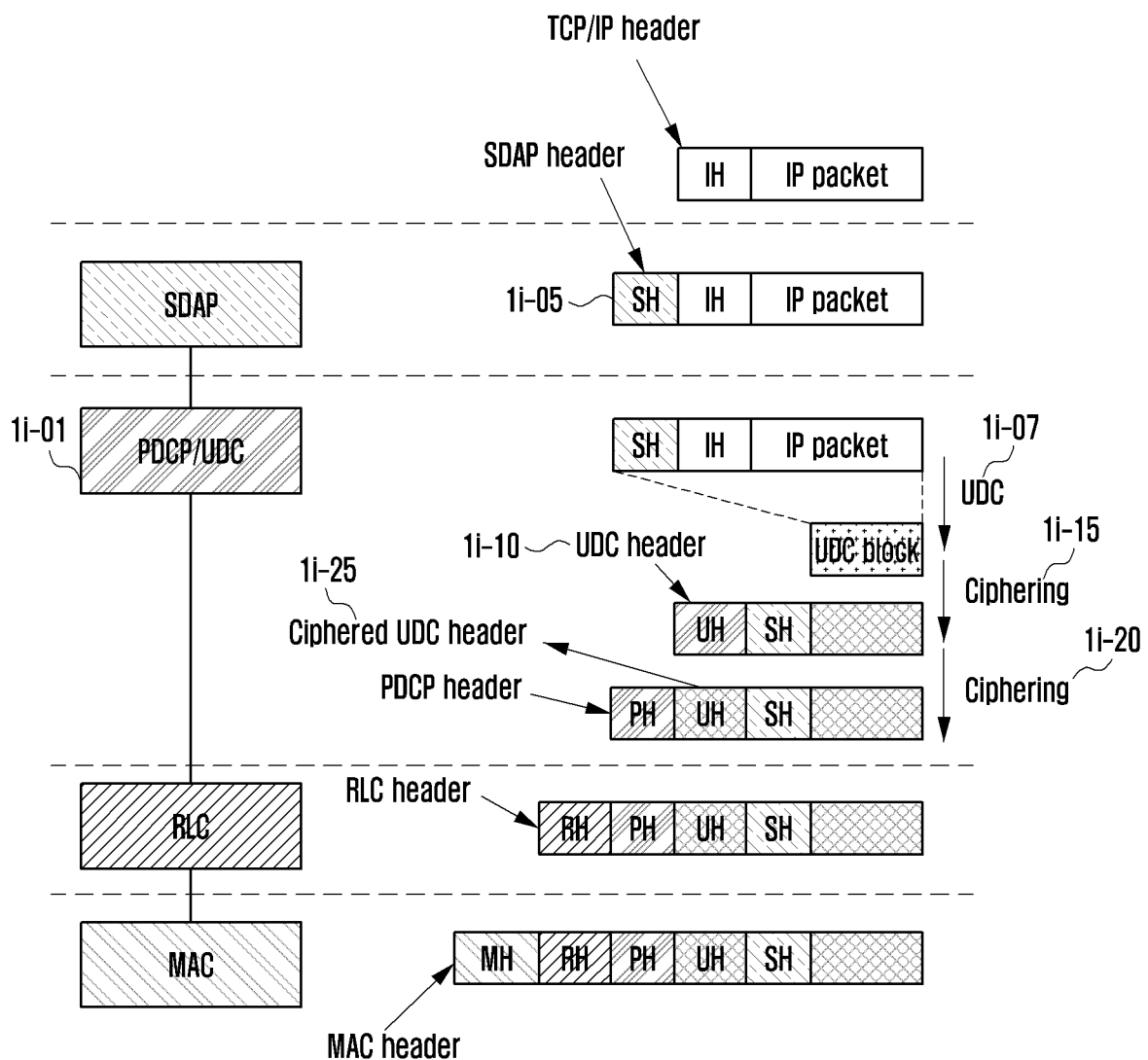
FIG. 1I is a diagram illustrating the second embodiment of efficiently performing a user data compression method when SDAP layer device is set or SDAP header is set based on the RRC message in the disclosure.

FIG. 1I is a diagram illustrating the second embodiment of efficiently performing a user data compression method when SDAP layer device is set or SDAP header is set based on an RRC message in the disclosure.

In FIG. 1I, when it is set to use the SDAP layer device or when it is set to use the SDAP header and when UDC is set by an RRC message such as 1e-10, 1e-40, or 1e-75 in FIG. 1E, if the SDAP layer device receives data from an upper layer, the SDAP layer device may generate and configure an SDAP header as in 1i-05, and deliver the SDAP header to the PDCP layer device. The PDCP layer device may perform a user data compression procedure on the remaining data parts (e.g., IP header and IP packet) except for the SDAP header from the PDCP SDU (SDAP header and IP packet) 1i-06 received from the upper SDAP layer device (1i-07). The PDCP layer device may calculate a checksum field and set whether to apply UDC to generate UDC header and attach the UDC header in front of the SDAP header (1i-10). When integrity protection is set, the PDCP layer device may apply integrity protection to the UDC header and the compressed UDC block or PDCP header before performing a ciphering procedure, then perform ciphering on the UDC block in order to perform ciphering on the UDC header and the compressed UDC block, and perform separately ciphering on the UDC header (1i-15, 1i-20). When performing the ciphering procedure only once, the PDCP layer device may remove the SDAP header in the middle, cipher the UDC header and the UDC block at once, insert the deciphered SDAP header between the UDC header and the UDC block to configure data, and generate, configure, concatenate a PDCP header 1i-20, and deliver the data to a lower layer, thereby performing data processing in the RLC layer device and the MAC layer device.

In the disclosure, a third embodiment of efficiently performing a user data compression method when an SDAP layer device is set or SDAP header is set based on the RRC message is proposed as follows. In the third embodiment, it is characterized that the user data compression method is not applied to the SDAP header and that the SDAP header and the UDC header are ciphered, and due to the above characteristics, because the transmitting PDCP layer device may perform ciphering on a part except for the PDCP header, and the receiving PDCP layer device may perform deciphering on parts except for the PDCP header; thus, implementation may be facilitated. Further, a procedure for ciphering and deciphering the SDAP header may be applied only to a bearer to which an uplink data compression procedure (UDC) is set. For example, for bearers to which the UDC is not set, ciphering and deciphering procedures of the SDAP header may not be performed, and for bearers to which the UDC is set, ciphering and deciphering procedures of the SDAP header may be performed.

Figure 1J:
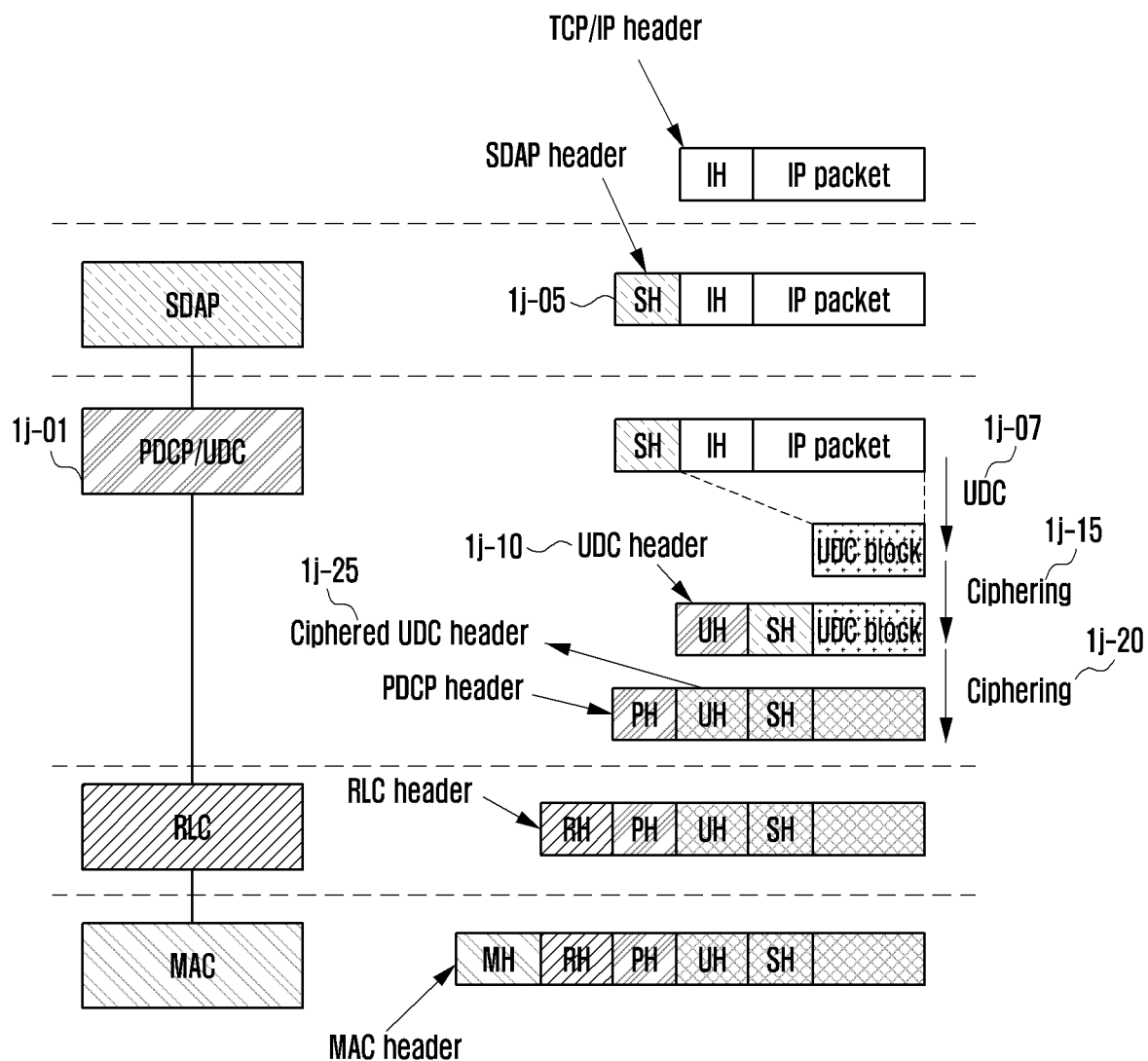
FIG. 1J is a diagram illustrating the third embodiment of efficiently performing a user data compression method when SDAP layer device is set or SDAP header is set based on the RRC message in the disclosure.

FIG. 1J is a diagram illustrating a third embodiment of efficiently performing a user data compression method when SDAP layer device is set or an SDAP header is set based on the RRC message in the disclosure.

In FIG. 1J, when it is set to use the SDAP layer device or when it is set to use the SDAP header and when UDC is set by an RRC message such as 1e-10, 1e-40, or 1e-75 in FIG. 1E, if the SDAP layer device receives data from an upper layer, the SDAP layer device may generate and configure SDAP header as in 1j-05, and deliver the SDAP header to the PDCP layer device. The PDCP layer device may perform a user data compression procedure on the remaining data parts except for the SDAP header from the PDCP SDU (SDAP header and IP packet) 1j-06 received from the upper SDAP layer device (1j-07). The PDCP layer device may calculate a checksum field and set whether to apply UDC to generate a UDC header and attach the UDC header in front of the SDAP header (1j-10). When integrity protection is set, the PDCP layer device may apply integrity protection to the UDC header and the compressed UDC block or PDCP header before performing the ciphering procedure, and then perform ciphering on the UDC header, the SDAP header, and the compressed UDC block (1j-15, 1j-20). The PDCP layer device may concatenate a PDCP header 1j-20 to the ciphered data (PDCP SDU), then deliver the data to a lower layer and perform data processing in the RLC layer device and the MAC layer device.

In the disclosure, a fourth embodiment of efficiently performing a user data compression method when SDAP layer device is set or SDAP header is set based on an RRC message is proposed as follows. In the fourth embodiment, it is characterized that the user data compression method is not applied to the SDAP header and that the SDAP header is not ciphered and that the UDC header is ciphered and that the UDC header is attached after the SDAP header or the UDC header is attached immediately before the compressed UDC block and the SDAP header is attached before the UDC header. Due to the above characteristics, there is the advantage that the transmitter or the receiver may use QoS information of the SDAP header without the need for a deciphering procedure of SDAP header information. For example, the base station may use the QoS information for scheduling, perform a UDC procedure with a hardware accelerator without the need to generate an SDAP header whenever higher layer data is received even in a UE implementation, immediately generate and attach a UDC header, and perform ciphering on the UDC header, and the SDAP header may be attached later; thus, it is also easy to implement the UE. Further, the UDC header may be ciphered to enhance security. Further, in the above embodiment, by changing a position of the SDAP header and a position of the UDC header, when performing the user data compression procedure, it is possible to reduce unnecessary procedures of processing except for the SDAP header or removing and processing the SDAP header and re-attaching the SDAP header, and there is the advantage that one unified procedure may be performed for the UDC header and the UDC data block.

Figure 1K:
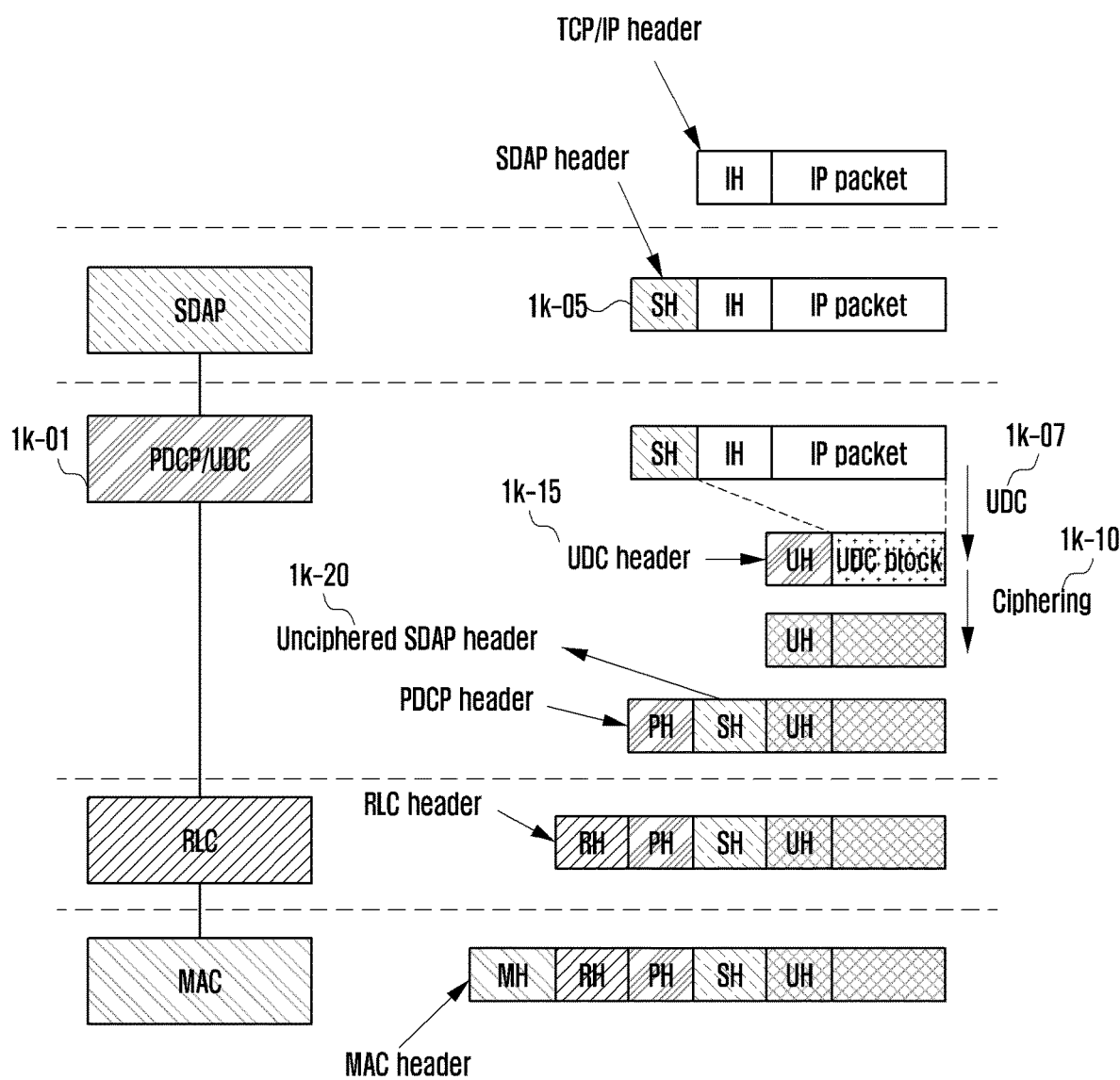
FIG. 1K is a diagram illustrating the fourth embodiment of efficiently performing a user data compression method when SDAP layer device is set or SDAP header is set based on the RRC message in the disclosure.

FIG. 1K is a diagram illustrating the fourth embodiment of efficiently performing a user data compression method when an SDAP layer device is set or an SDAP header is set based on an RRC message in the disclosure.

In FIG. 1K, when it is set to use the SDAP layer device or it is set to use the SDAP header and when uplink data compression (UDC) is set by an RRC message such as 1e-10, 1e-40, or 1e-75 in FIG. 1E, if the SDAP layer device receives data (e.g., IP header and IP packet) from an upper layer, the SDAP layer device may generate and configure an SDAP header as in 1k-05 and deliver the SDAP header to the PDCP layer device. The PDCP layer device may perform a user data compression procedure on the remaining data parts except for the SDAP header from the PDCP SDU (SDAP header and IP packet) 1k-06 received from the upper SDAP layer device (1k-07). The PDCP layer device may calculate a checksum field and set whether to apply UDC to generate a UDC header, and attach the UDC header immediately before (after the SDAP header) the compressed UDC data block (1k-10). When integrity protection is set, the PDCP layer device may apply integrity protection to the SDAP header, the UDC header, and the compressed UDC block and PDCP header before performing a ciphering procedure, and then perform ciphering on the UDC header and the compressed UDC block. In this case, the PDCP layer device may perform ciphering only on the UDC header and the compressed UDC block except for the SDAP header. The PDCP layer device may configure data and generate and configure a PDCP header 1k-20 to first concatenate the SDAP header, concatenate the PDCP header, and then deliver the data to the lower layer to perform data processing in the RLC layer device and the MAC layer device.

In the disclosure, a fifth embodiment of efficiently performing a user data compression method when the SDAP layer device is set or the SDAP header is set based on an RRC message is proposed as follows. In the fifth embodiment, it is characterized that the user data compression method is not applied to the SDAP header. Further, it is characterized that the SDAP header is not ciphered and the UDC header is not ciphered. Due to the above characteristics, there is the advantage that the transmitter or the receiver may use QoS information of the SDAP header without the need for a deciphering procedure of information of the SDAP header. Further, because the UDC header is not ciphered, the receiving PDCP layer device may identify a checksum field of the UDC header before deciphering to identify integrity of the UDC buffer, and when there is an error in integrity, the receiving PDCP layer device may immediately discard the data without deciphering to reduce unnecessary data processing. When the checksum field identification of the UDC header passes, the receiving PDCP layer device may perform a deciphering procedure on data except for the PDCP header, the UDC header, and the SDAP header, and then apply a decompression procedure. For example, the base station may use the QoS information for scheduling, and even in the UE implementation, the base station may perform an UDC procedure and ciphering on data received from the upper layer with a hardware accelerator without the need to generate an UDC header or an SDAP header whenever upper layer data is received, and in implementation, because the UDC header or SDAP header may be generated and attached later, it is easy in the UE implementation. Further, in the fifth embodiment of the disclosure, by positioning the UDC header in front of the SDAP header, a structure of the PDCP PDU may configure data in order of the PDCP header, the UDC header, the SDAP header, and the compressed data (e.g., PDCP SDU), and because the UDC header is a header generated in the PDCP layer device, the UDC header may be positioned in front of the upper layer SDAP header.

Figure 1L:
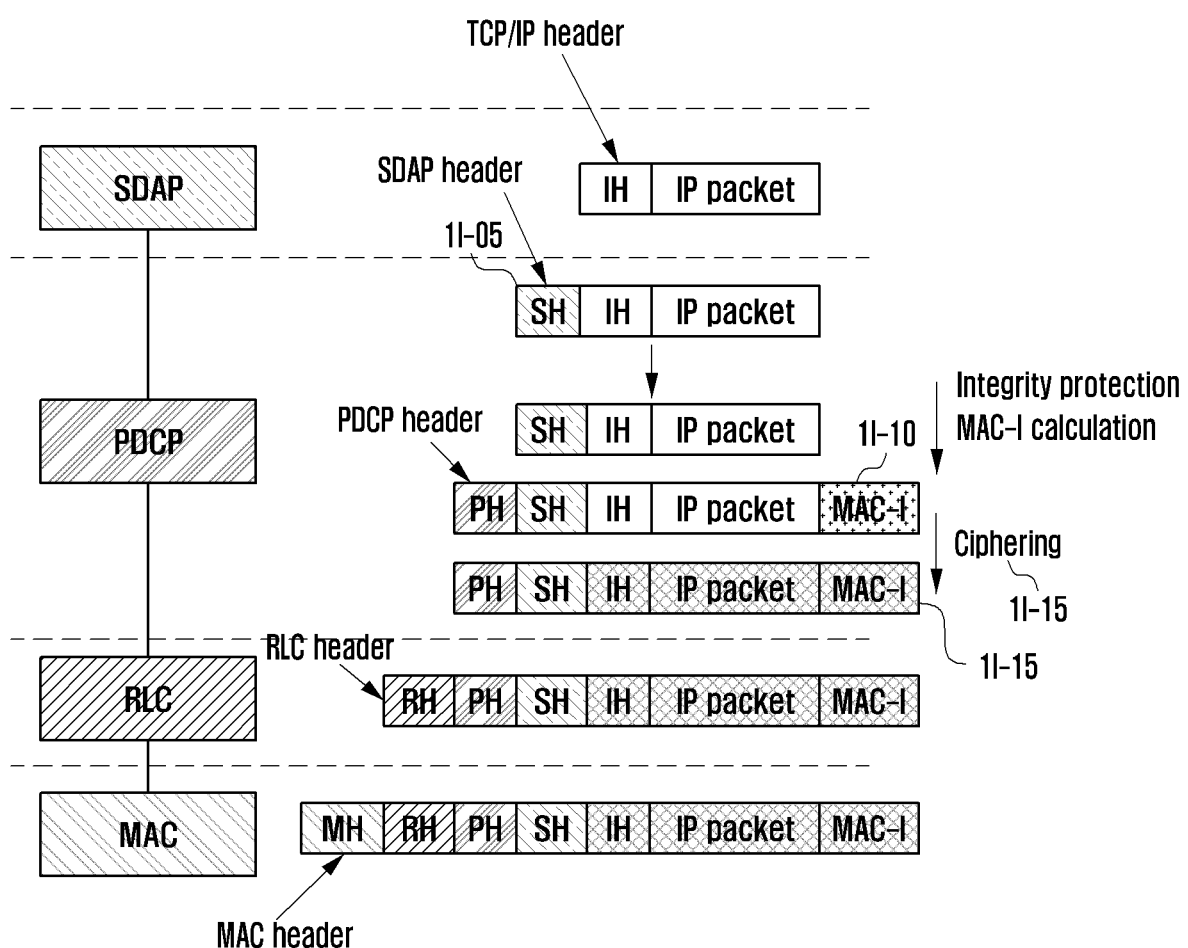
FIG. 1L is a diagram specifically illustrating a data processing procedure when an integrity protection and verification procedure is set in the above embodiments of the disclosure.
Figure 1M:
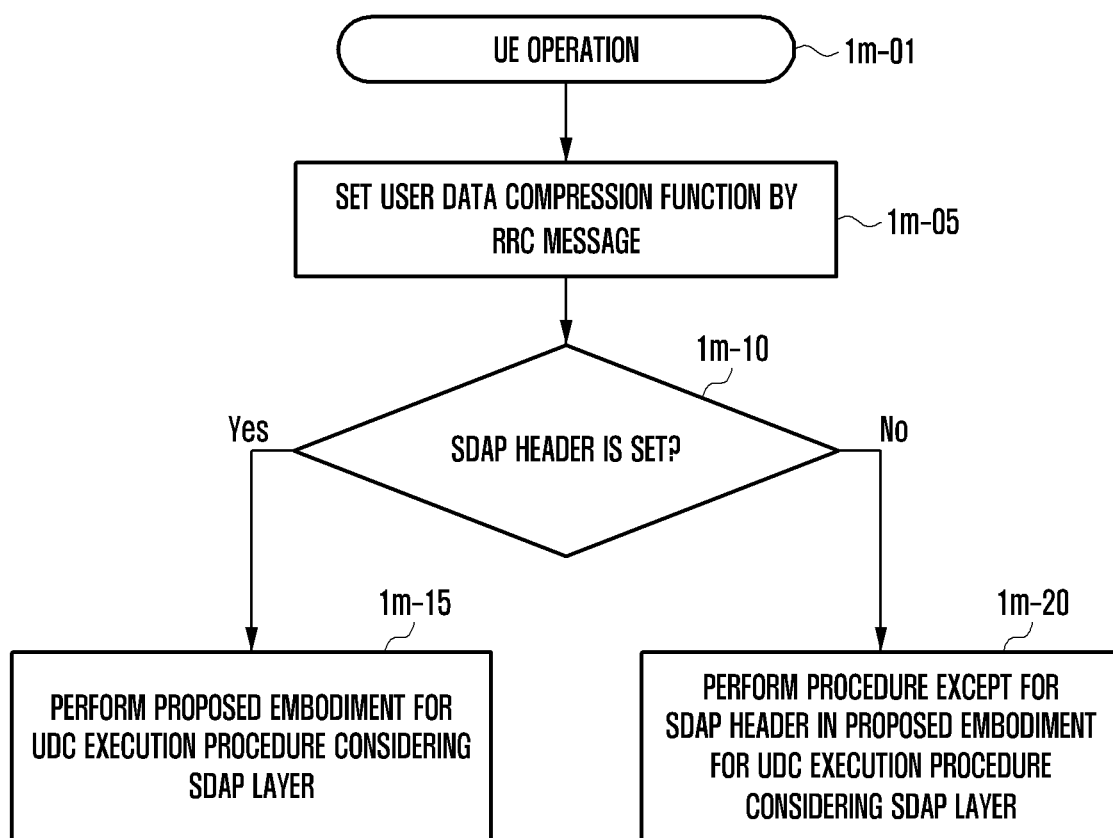
FIG. 1M is a flowchart illustrating UE operation according to various embodiments of the disclosure.
Figure 1N:
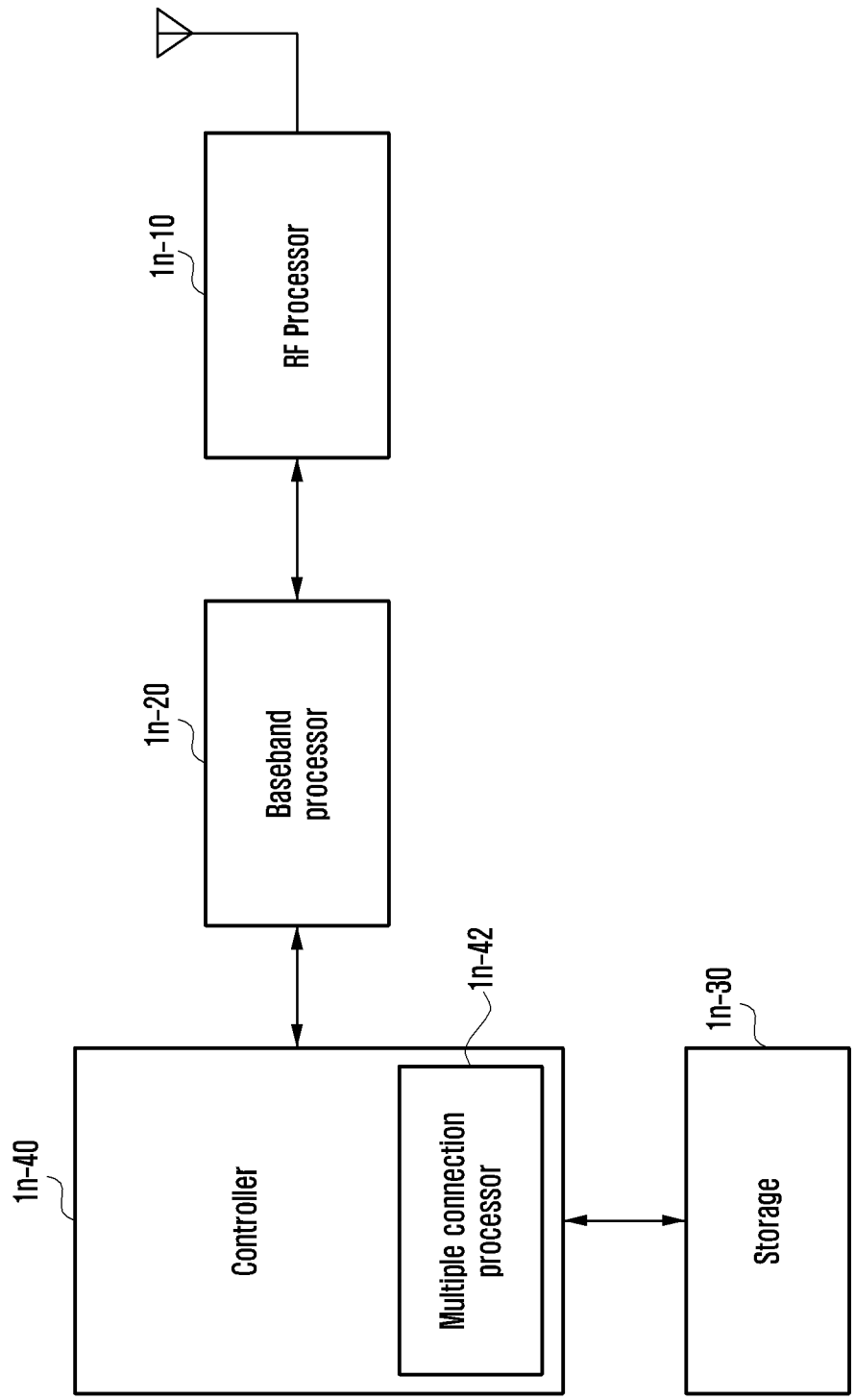
FIG. 1N illustrates a structure of UE to which an embodiment of the disclosure may be applied.
Figure 10:
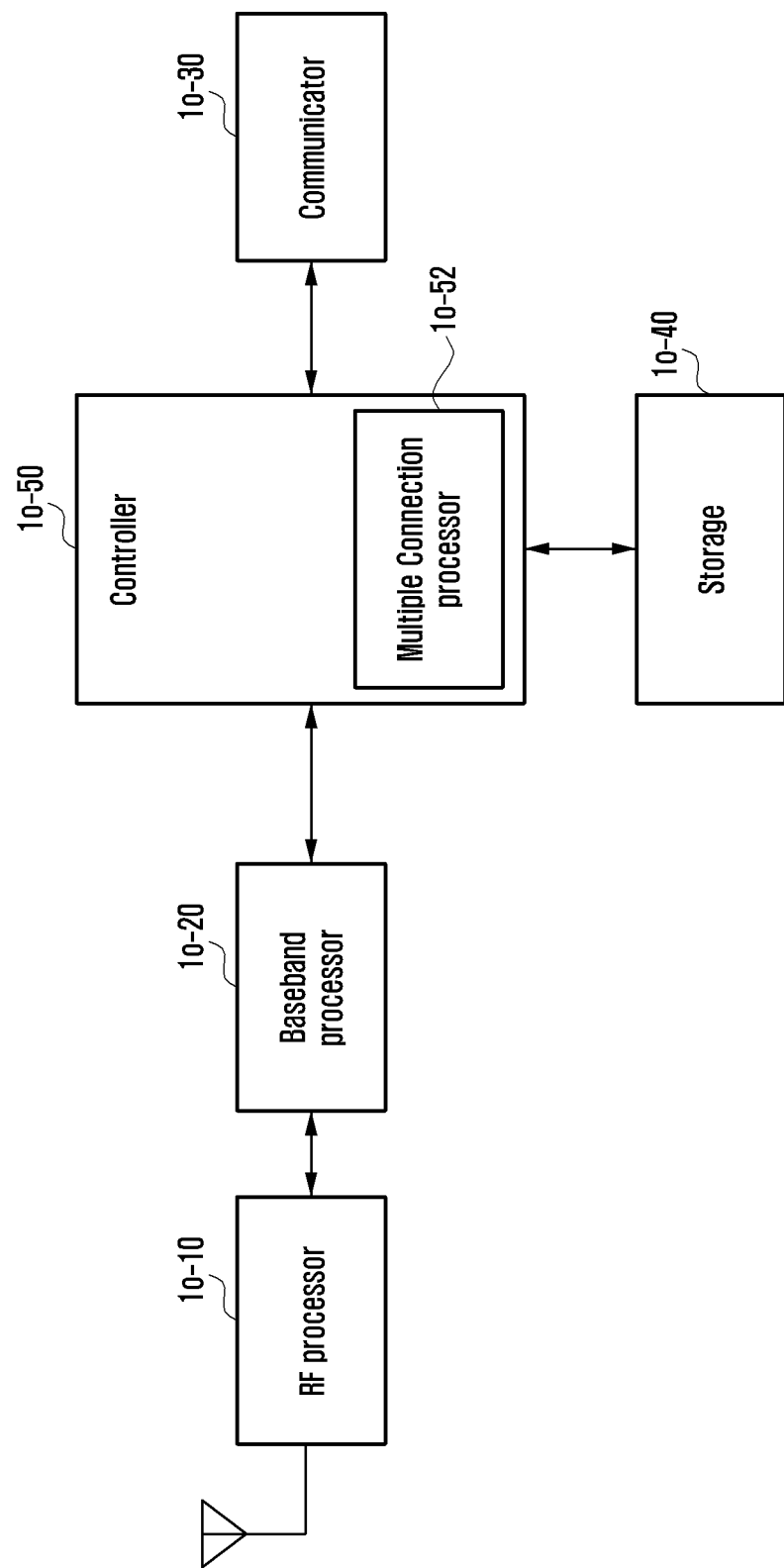
Figure 1P:
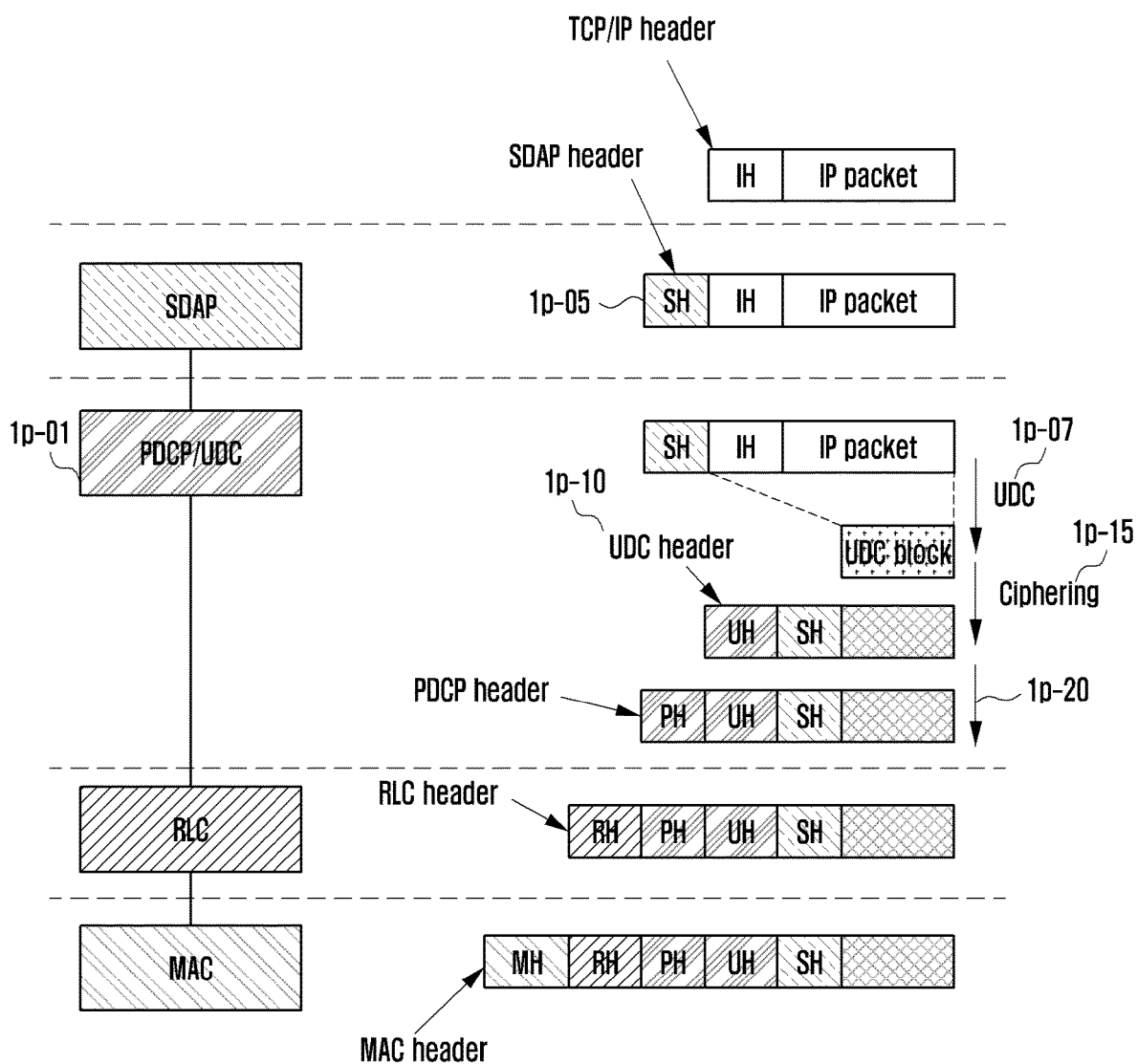
FIG. 1P is a diagram illustrating the fifth embodiment of efficiently performing a user data compression method when SDAP layer device is set or SDAP header is set based on the RRC message in the disclosure.

FIG. 1P is a diagram illustrating a fifth embodiment of efficiently performing a user data compression method when an SDAP layer device is set or SDAP header is set based on the RRC message in the disclosure.

In FIG. 1P, when it is set to use the SDAP layer device or when it is set to use the SDAP header and when UDC is set by an RRC message such as 1e-10, 1e-40, or 1e-75 in FIG. 1E, if the SDAP layer device receives data from an upper layer, the SDAP layer device may generate and configure an SDAP header as in 1p-05, and deliver the SDAP header to the PDCP layer device. The PDCP layer device may perform a user data compression procedure on the remaining data parts except for the SDAP header from the PDCP SDU (SDAP header and IP packet) 1p-06 received from the upper SDAP layer device (1p-07). The PDCP layer device may calculate a checksum field and set whether to apply UDC to generate UDC header and attach the UDC header in front of the SDAP header (1p-10). When integrity protection is set, the PDCP layer device applies integrity protection to the UDC header, the SDAP header, and the compressed UDC block or PDCP header before performing a ciphering procedure, then performs ciphering on the UDC block in order to cipher only the compressed UDC block except for the UDC header and the SDAP header, and does not perform ciphering on the UDC header and the SDAP header (1p-15, 1p-20). The PDCP layer device may configure and concatenate a PDCP header at the front of the data to deliver the data to a lower layer device (e.g., RLLC layer device).

In the disclosure, a sixth embodiment of efficiently performing a user data compression method when the SDAP layer device is set or the SDAP header is set based on an RRC message is proposed as follows. In the sixth embodiment, it is characterized that the user data compression method is not applied to the SDAP header and that the SDAP header is not ciphered and that the UDC header is not ciphered, and due to the above characteristics, there is the advantage that the transmitter or the receiver may use QoS information of the SDAP header without the need for a deciphering procedure of information of the SDAP header. Further, because the UDC header was not ciphered, the receiving PDCP layer device may identify a checksum field of the UDC header before deciphering to identify integrity of the UDC buffer, and when there is an error in integrity, the receiving PDCP layer device may immediately discard the data without deciphering to reduce unnecessary data processing. When the checksum field identification of the UDC header passes, the receiving PDCP layer device may perform a deciphering procedure on data except for the PDCP header, the SDAP header, and the UDC header, and then apply a decompression procedure. For example, the base station may use the QoS information for scheduling, and even in the UE implementation, the receiving PDCP layer device may perform an UDC procedure and ciphering on data received from the upper layer with a hardware accelerator without the need to generate an SDAP header or UDC header whenever upper layer data is received, and in implementation, because the SDAP header or the UDC header may be generated and attached later, it is easy in the UE implementation. Further, in the sixth embodiment of the disclosure, by positioning the SDAP header in front of the UDC header, a structure of the PDCP PDU may configure data in order of the PDCP header, the SDAP header, the UDC header, and the compressed data (e.g., PDCP SDU), and when the PDCP layer device performs an UDC compression procedure, the UDC header may be together generated; thus, it may be easy in implementation that the UDC header may be positioned in front of the pressed data. Accordingly, in the sixth embodiment, it may be characterized by having a structure in which the UDC header is positioned behind the SDAP header to concatenate the UDC header and compressed data.

Figure 1Q:
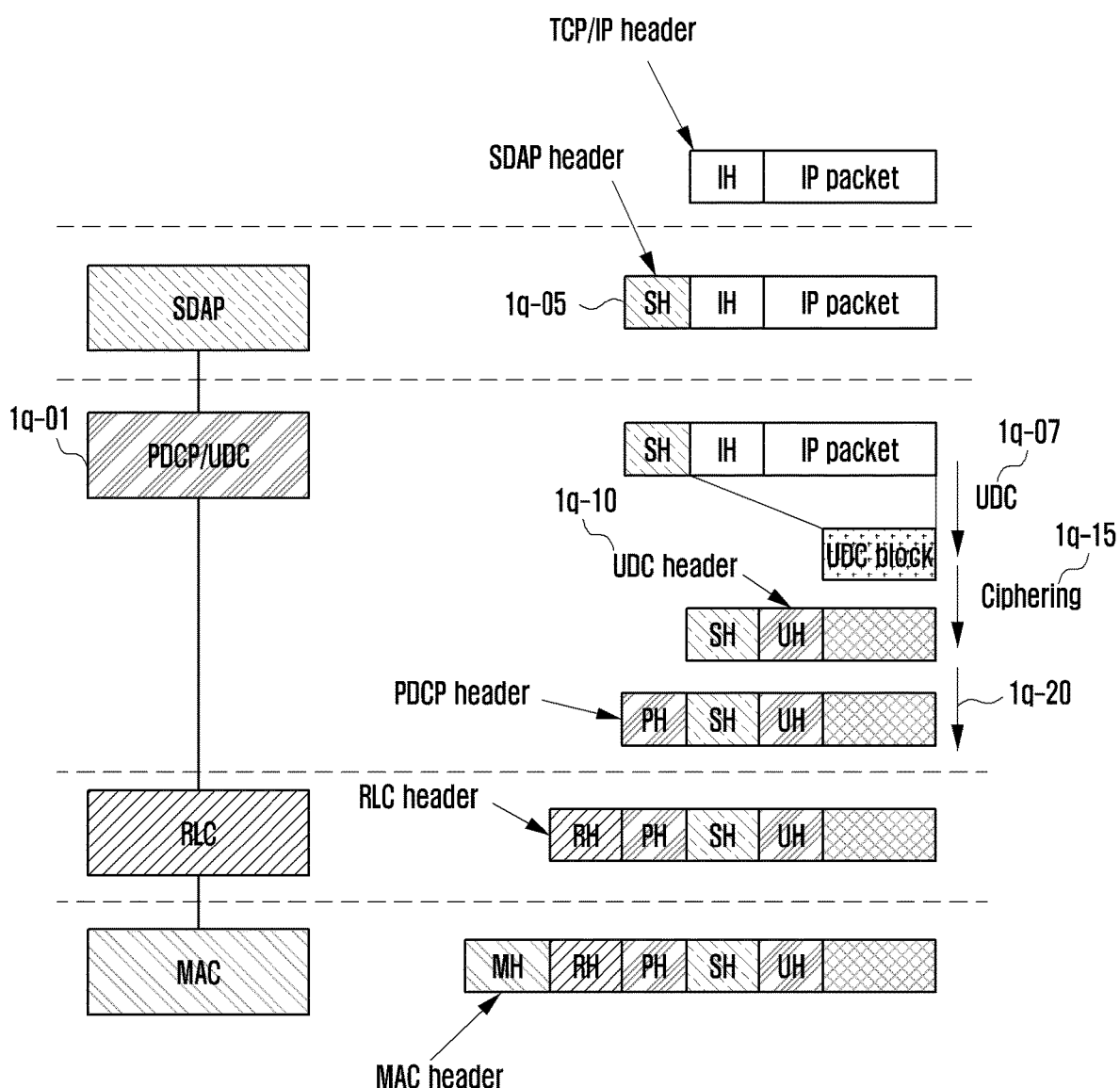
FIG. 1Q is a diagram illustrating the sixth embodiment of efficiently performing a user data compression method when SDAP layer device is set or SDAP header is set based on the RRC message in the disclosure.

FIG. 1Q is a diagram illustrating a sixth embodiment of efficiently performing a user data compression method when an SDAP layer device is set or an SDAP header is set based on the RRC message in the disclosure.

In FIG. 1Q, when it is set to use the SDAP layer device or when it is set to use the SDAP header and when UDC is set by an RRC message such as 1e-10, 1e-40, or 1e-75 in FIG. 1E, if the SDAP layer device receives data from an upper layer, the SDAP layer device may generate and configure an SDAP header as in 1q-05, and deliver the SDAP header to the PDCP layer device. The PDCP layer device may perform a user data compression procedure on the remaining data parts except for the SDAP header from PDCP SDUs (SDAP header and IP packet) 1q-06 received from the upper SDAP layer device (1q-07). The PDCP layer device may calculate a checksum field, set whether to apply UDC to generate a UDC header, and attach the UDC header in front of the compressed data (1q-15). When integrity protection is set, the PDCP layer device may apply integrity protection to the PDCP header, the SDAP header, the UDC header, and the compressed UDC block before performing a ciphering procedure, and in order to cipher only the compressed UDC block except for the SDAP header and the UDC header, the PDCP layer device may perform ciphering on the UDC block and not perform ciphering on the SDAP header and the UDC header (1q-15, 1q-20). The PDCP layer device may configure and concatenate a PDCP header at the front of the data and deliver the data to a lower layer device.

In the above embodiments of the disclosure, it is characterized that a data compression procedure or ciphering procedure is not applied to the SDAP header or SDAP control data.

In the following description of the disclosure, when it is set to use the SDAP layer device or when it is set to use the SDAP header and when UDC is set by an RRC message such as 1e-10, 1e-40, or 1e-75 in FIG. 1E, if the transmitting PDCP layer device receives SDAP control data from an upper layer device (e.g., SDAP layer device), methods for efficiently processing SDAP control data are proposed.

Figure 1R:
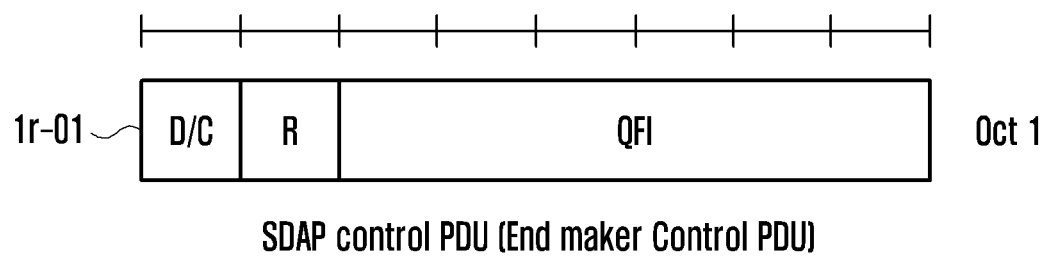
FIG. 1R is a diagram illustrating SDAP control data (SDAP control PDU or end-marker control PDU) generated by SDAP layer device.

FIG. 1R is a diagram illustrating SDAP control data (SDAP control PDU or end-marker control PDU) generated by an SDAP layer device.

In FIG. 1R, 1r-01 represents a structure of SDAP control data, and may have the same structure as that of an uplink SDAP header. The SDAP control data structure is SDAP control data indicating that the data flow corresponding to a QFI field value has ended or is the last with a field indicating a QoS Flow ID (QFI), and may be called an end marker control PDU.

In the following description of the disclosure, when it is set to use the SDAP layer device or when it is set to use the SDAP header and when UDC is set by an RRC message such as 1e-10, 1e-40, or 1e-75 in FIG. 1E, if the transmitting PDCP layer device receives SDAP control data from an upper layer device (e.g., SDAP layer device), methods for efficiently processing SDAP control data are proposed.

In the disclosure, when an SDAP layer device is set or when an SDAP header is set based on an RRC message, a seventh embodiment of efficiently performing a user data compression method and processing SDAP control data is proposed as follows.

In the seventh embodiment, it is characterized that the user data compression method is not applied to SDAP control data and that the SDAP control data is not ciphered and that the UDC header is not ciphered. Due to the above characteristics, there is the advantage that the transmitter or the receiver may use QoS information of the SDAP header without the need for a deciphering procedure of SDAP control data information. Further, because the UDC header is not ciphered, the receiving PDCP layer device may identify that the SDAP control data is not compressed through a 1-bit indicator of the UDC header. Because SDAP control data is not ciphered, the receiving PDCP layer device may have an advantage in that it may quickly process SDAP control data without applying a deciphering procedure. For example, the base station may use the QoS information for scheduling. Further, the UE does not perform a deciphering procedure whenever SDAP control data is received, and performs integrity protection when integrity protection is set, and may generate and attach a UDC header and PDCP header and deliver the data to the lower layer; thus, it is easy to implement a UE for fast data processing. Further, in the seventh embodiment of the disclosure, by positioning the UDC header in front of the SDAP control data, a structure of the PDCP PDU may configure data in order of the PDCP header, the UDC header, and the SDAP control data, and because the UDC header is generated in the PDCP layer device, it may be efficient to implement the UE that the UDC header is logically positioned in front of SDAP control data generated in the SDAP layer device, which is a higher layer device. Accordingly, in the seventh embodiment, it is characterized by having a structure of concatenating the UDC header and the SDAP control data by positioning the UDC header in front of the SDAP control data.

Figure 1S:
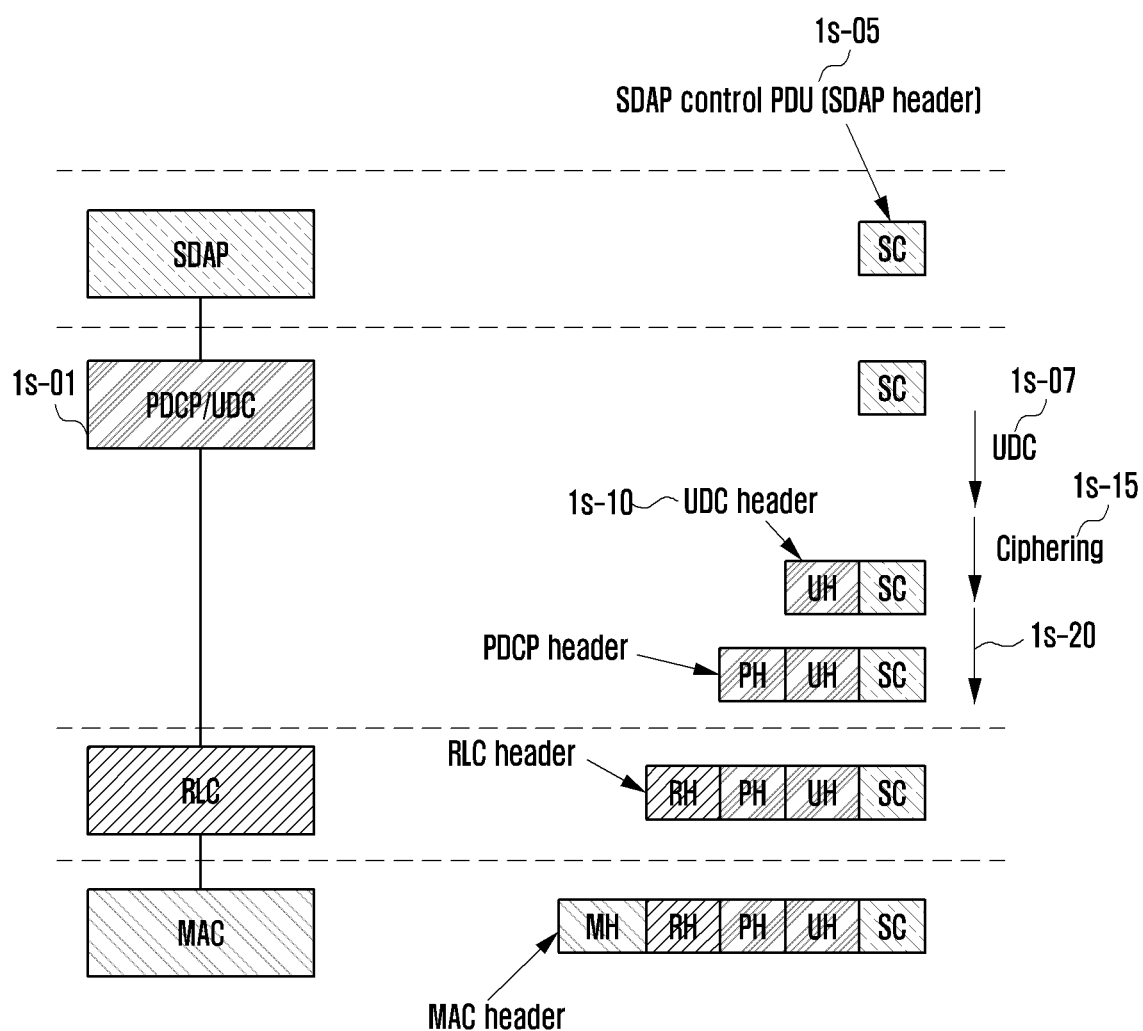
FIG. 1S is a diagram illustrating the seventh embodiment of efficiently performing a user data compression method and processing SDAP control data when SDAP layer device is set or an SDAP header is set based on the RRC message in the disclosure.

FIG. 1S is a diagram illustrating a seventh embodiment of efficiently performing a user data compression method and processing SDAP control data when an SDAP layer device is set or an SDAP header is set based on an RRC message in the disclosure.

In FIG. 1S, when it is set to use the SDAP layer device or when it is set to use the SDAP header and when UDC is set by the RRC message such as 1e-10, 1e-40, or 1e-75 in FIG. 1E, if the SDAP layer device receives SDAP control data 1s-05 from an upper layer (SDAP layer device), the transmitting PDCP layer device do not perform a user data compression procedure on the SDAP control data received from the upper SDAP layer device (1s-07). The transmitting PDCP layer device may calculate a checksum field, set whether to apply UDC, generate a UDC header, and attach the UDC header to the front of SDAP control data (1s-15). When integrity protection is set, the transmitting PDCP layer device may apply integrity protection to the PDCP header, the UDC header, and the SDAP control data before performing the ciphering procedure, and then not cipher the UDC header and the SDAP control data (1s-15, 1s-20). The transmitting PDCP layer device may configure and concatenate PDCP header at the front of the data and deliver the data to lower layer device.

In the disclosure, when an SDAP layer device is set or when an SDAP header is set based on an RRC message, an eighth embodiment of efficiently performing a user data compression method and processing SDAP control data is proposed as follows.

In the eighth embodiment, it is characterized that the user data compression method is not applied to SDAP control data and that the SDAP control data is not ciphered and that the UDC header is not ciphered. Due to the above characteristics, there is the advantage that the transmitter or the receiver may use QoS information of the SDAP header without the need for a deciphering procedure on information of the SDAP control data. Further, because the UDC header was not ciphered, the receiving PDCP layer device may identify that the SDAP control data has not been compressed through a 1-bit indicator of the UDC header. Because SDAP control data was not ciphered, the receiving PDCP layer device may have an advantage that it may quickly process SDAP control data without applying a deciphering procedure. For example, the base station may use the QoS information for scheduling, not perform a deciphering procedure whenever SDAP control data is received in UE implementation, perform integrity protection when integrity protection is set, generate and attach an UDC header and a PDCP header, and deliver the data to a lower layer; thus, it is easy to implement the UE for fast data processing. Further, in the eighth embodiment of the disclosure, it is characterized that a structure of the PDCP PDU configures data in order of a PDCP header, SDAP control data, and UDC header by positioning the UDC header after the SDAP control data. Because the UDC procedure is a first procedure in a processing procedure of the PDCP layer device, the UDC header is generated first, and the SDAP control data received from the upper layer is placed in front of the UDC header, making it easier to implement the UE. Accordingly, in the eighth embodiment, it is characterized by having a structure of concatenating the SDAP control data and the UDC header by positioning the SDAP control data in front of the UDC header.

Figure 1T:
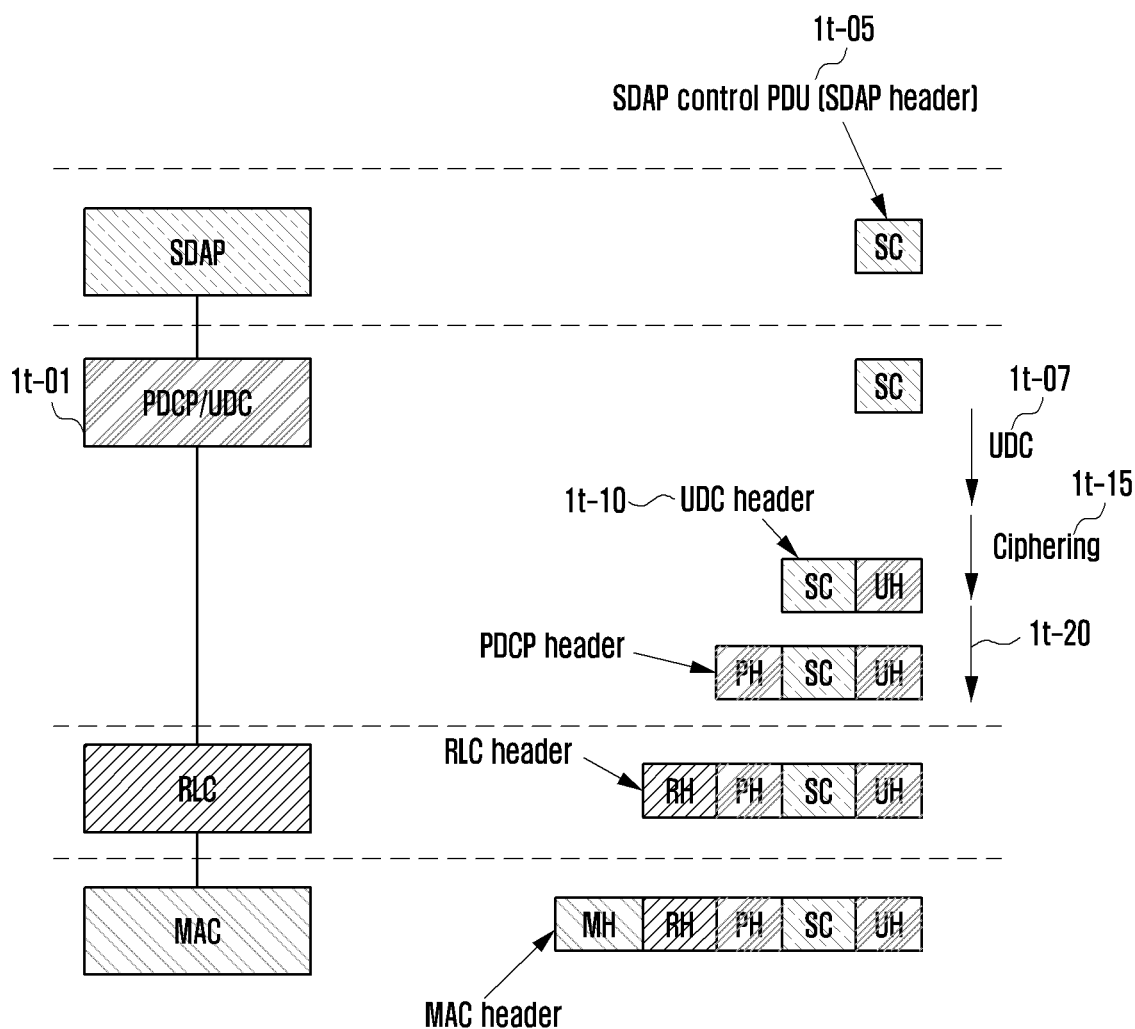
FIG. 1T is a diagram illustrating the eighth embodiment of efficiently performing a user data compression method and processing SDAP control data when SDAP layer device is set or SDAP header is set based on the RRC message in the disclosure.

FIG. 1T is a diagram illustrating an eighth embodiment of efficiently performing a user data compression method and processing SDAP control data when an SDAP layer device is set or an SDAP header is set based on an RRC message in the disclosure.

In FIG. 1T, when it is set to use the SDAP layer device or when it is set to use the SDAP header by an RRC message such as 1e-10, 1e-40, or 1e-75 in FIG. 1E, the SDAP layer device may transmit the SDAP control data to a lower layer (e.g., PDCP layer).

When UDC is set, if SDAP control data 1t-05 is received from an upper layer (SDAP layer device), the transmitting PDCP layer device does not perform a user data compression procedure to the SDAP control data received from the upper SDAP layer device (1t-07). The transmitting PDCP layer device may calculate a checksum field and set whether to apply UDC to generate a UDC header and attach the UDC header to the back of SDAP control data (1t-15). When integrity protection was set, it may be characterized that the transmitting PDCP layer device applies integrity protection to the PDCP header, SDAP control data, and UDC header before performing the ciphering procedure, and then does not perform ciphering on the SDAP control data and the UDC header (1t-15, 1t-20). The transmitting PDCP layer device may configure and concatenate a PDCP header at the front of the data to deliver the data to the lower layer device.

In the disclosure, when the SDAP layer device is set or when the SDAP header is set based on an RRC message, a ninth embodiment of efficiently performing a user data compression method and processing SDAP control data is proposed as follows.

In the ninth embodiment, it is characterized that the user data compression method is not applied to SDAP control data and that the SDAP control data is not ciphered and that the UDC header is ciphered, and due to the above characteristics, there is the advantage that the transmitter or the receiver may use QoS information of the SDAP header without the need for a deciphering procedure of information of the SDAP control data. Further, because the UDC header has been ciphered, the receiving PDCP layer device may distinguish data by an attack of a hacker into a deciphering failure, and enhance security. After deciphering the UDC header, it may be identified that the SDAP control data is not compressed through a 1-bit indicator of the UDC header, and because the SDAP control data is not ciphered, there is the advantage that the SDAP control data may be processed quickly without applying a deciphering procedure. For example, the base station may use the QoS information for scheduling, not perform a deciphering procedure whenever SDAP control data is received even in the UE implementation, perform integrity protection when integrity protection is set, decode immediately only the UDC header to generate and attach a PDCP header, and deliver the data to a lower layer; thus, it is easy to implement a UE for fast data processing. Further, in the ninth embodiment of the disclosure, it is characterized that a structure of the PDCP PDU configures data in order of the PDCP header, the UDC header, and the SDAP control data by positioning the UDC header in front of the SDAP control data, and because the UDC header is generated in the PDCP layer device, it may be efficient in implementing the UE to logically position the UDC header in front of the SDAP control data generated in the SDAP layer device, which is a higher layer device. Accordingly, in the ninth embodiment, it is characterized by having a structure of concatenating the UDC header and the SDAP control data by positioning the UDC header in front of the SDAP control data.

Figure 1U:
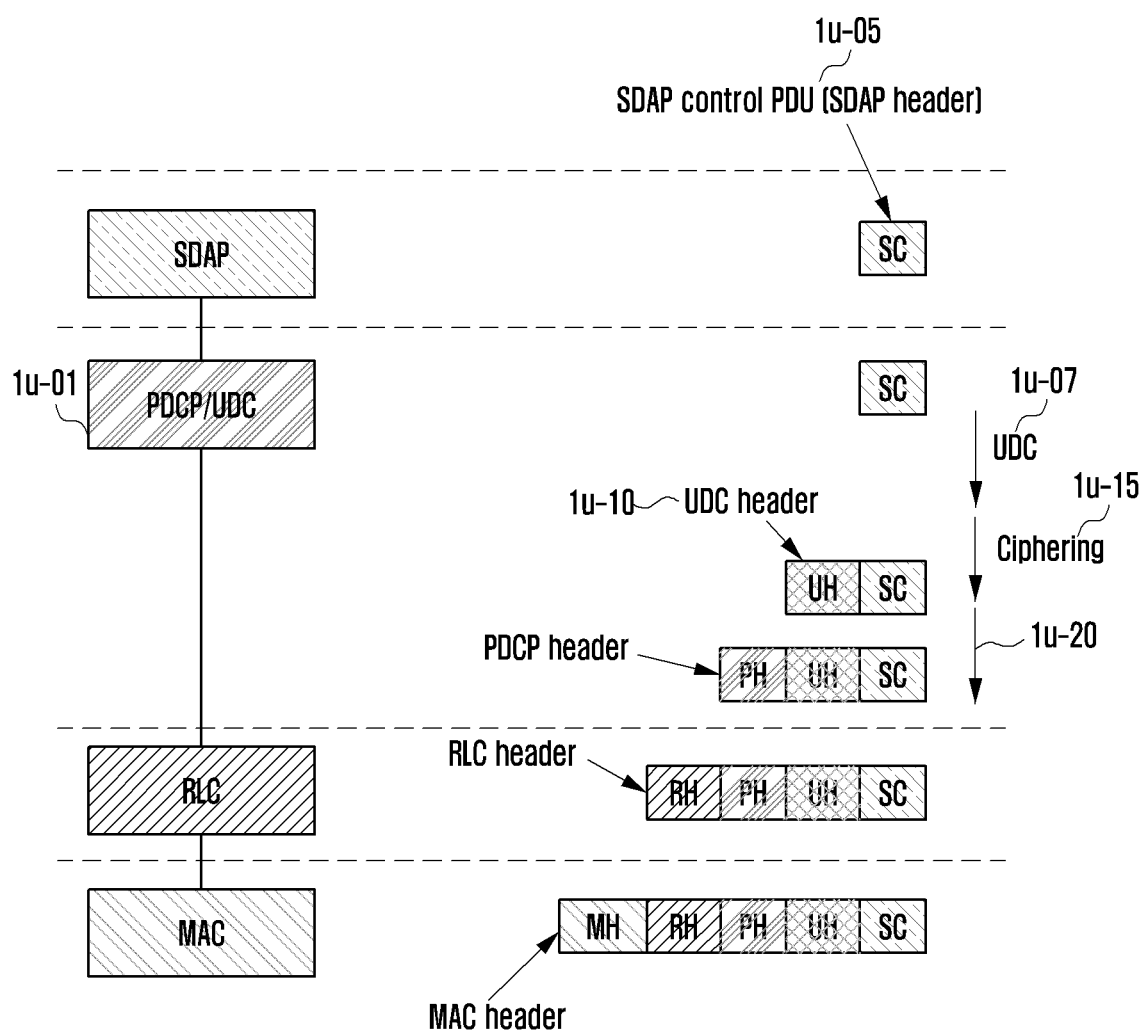
FIG. 1U is a diagram illustrating the ninth embodiment of efficiently performing a user data compression method and processing SDAP control data when SDAP layer device is set or SDAP header is set based on an RRC message in the disclosure.

FIG. 1U is a diagram illustrating a ninth embodiment of efficiently performing a user data compression method and processing SDAP control data when an SDAP layer device is set or an SDAP header is set based on an RRC message in the disclosure.

In FIG. 1U, when it is set to use the SDAP layer device or when it is set to use the SDAP header by an RRC message such as 1e-10, 1e-40, or 1e-75 in FIG. 1E, the SDAP layer device may transmit the SDAP control data to the lower layer (e.g., the PDCP layer).

When UDC is set, if the transmitting PDCP layer device receives SDAP control data 1u-05 from an upper layer (SDAP layer device), the transmitting PDCP layer device does not perform a user data compression procedure in the SDAP control data received from the upper SDAP layer device (1u-07). The transmitting PDCP layer device may calculate a checksum field and set whether to apply UDC to generate a UDC header and attach the UDC header to the front of SDAP control data (1u-15). When integrity protection is set, it may be characterized that the transmitting PDCP layer device applies integrity protection to the PDCP header, the UDC header, and the SDAP control data before performing the ciphering procedure, then performs ciphering on the UDC header, and does not perform ciphering on the SDAP control data (1u-15, 1u-20). The transmitting PDCP layer device may configure and concatenate a PDCP header at the front of the data to deliver the data to the lower layer device.

In the disclosure, a tenth embodiment of efficiently performing a user data compression method and processing SDAP control data when an SDAP layer device is set or SDAP header is set based on the RRC message is proposed as follows.

In the tenth embodiment, it is characterized that the user data compression method is not applied to SDAP control data and that the SDAP control data is not ciphered and that the UDC header is ciphered, and due to the above characteristics, there is the advantage that the transmitter or the receiver may use QoS information of the SDAP header without the need for a deciphering procedure of information of the SDAP control data. Further, because the UDC header has been ciphered, the receiving PDCP layer device may distinguish data by an attack of a hacker into a deciphering failure, and enhance security. Further, after deciphering the UDC header, the receiving PDCP layer device may identify that the SDAP control data was not compressed through a 1-bit indicator of the UDC header, and because SDAP control data is not ciphered, there is the advantage that the receiving PDCP layer device may process quickly the SDAP control data without applying a deciphering procedure. For example, the base station may use the QoS information for scheduling, and the UE does not perform a deciphering procedure whenever SDAP control data is received, performs integrity protection when integrity protection is set, ciphers the UDC header, generates and attaches a PDCP header, and deliver the data to the lower layer; thus it is easy to implement a UE for fast data processing. Further, in the tenth embodiment of the disclosure, by positioning the UDC header after the SDAP control data, it may be characterized that a structure of the PDCP PDU configures data in order of the PDCP header, the SDAP control data, and the UDC header, and because a UDC procedure is a first procedure in the processing procedure of the PDCP layer device, the UDC header is generated first, and the SDAP control data received from the upper layer is placed in front of the UDC header, making it easier to implement the UE. Accordingly, in the tenth embodiment, by positioning the SDAP control data in front of the UDC header, it may be characterized by having a structure in which SDAP control data and UDC header are concatenated.

Figure 1V:
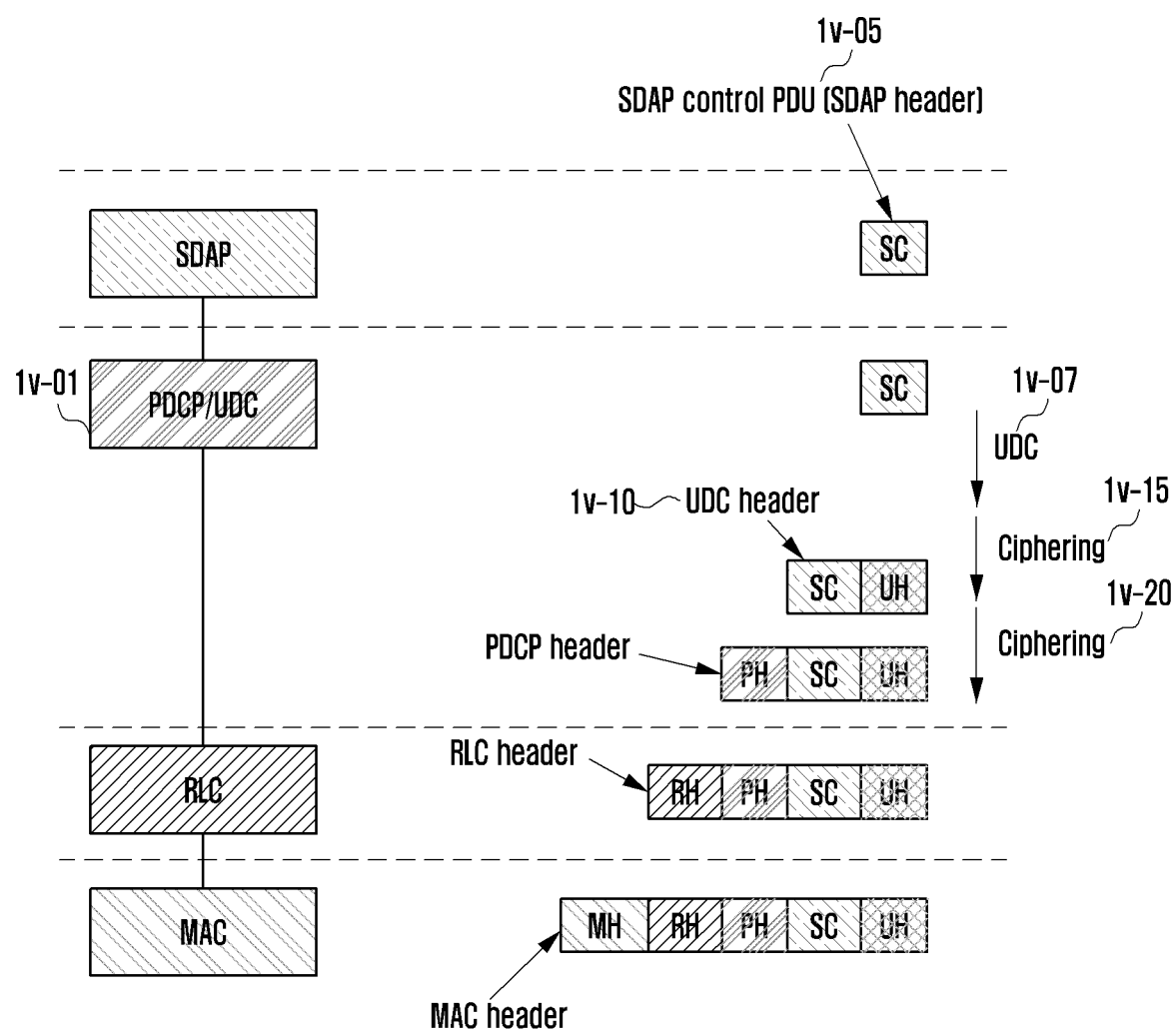
FIG. 1V is a diagram illustrating the tenth embodiment of efficiently performing a user data compression method and processing SDAP control data when SDAP layer device is set or SDAP header is set based on an RRC message in the disclosure.

FIG. 1V is a diagram illustrating a tenth embodiment of efficiently performing a user data compression method and processing SDAP control data when an SDAP layer device is set or an SDAP header is set based on an RRC message in the disclosure.

In FIG. 1V, when it is set to use the SDAP layer device or when it is set to use the SDAP header by an RRC message such as 1e-10, 1e-40, or 1e-75 in FIG. 1E, the SDAP layer device may transmit SDAP control data to the lower layer (e.g., the PDCP layer).

When UDC is set, if the transmitting PDCP layer device receives SDAP control data 1v-05 from an upper layer (SDAP layer device), the transmitting PDCP layer device does not perform a user data compression procedure to the SDAP control data received from the upper SDAP layer device (1v-07). The transmitting PDCP layer device may calculate a checksum field and set whether to apply UDC to generate a UDC header and attach the UDC header to the back of SDAP control data (1t-15). When integrity protection was set, it is characterized that the transmitting PDCP layer device applies integrity protection to the PDCP header, the SDAP control data, and the UDC header before performing the ciphering procedure, then does not cipher the SDAP control data, and performs ciphering on the UDC header (1v-15, 1v-20). The transmitting PDCP layer device may configure and concatenate a PDCP header at the front of the data to deliver the data to the lower layer device.

In the disclosure, when the SDAP layer device is set or when the SDAP header is set based on an RRC message, an eleventh embodiment of efficiently performing a user data compression method and processing SDAP control data is proposed as follows.

In the eleventh embodiment, it is characterized that the user data compression method is not applied to SDAP control data. Further, SDAP control data is not ciphered, a UDC header is not generated for SDAP control data, and a 1-bit indicator of the PDCP header may indicate SDAP control data or indicate that there is no UDC header. Due to the above characteristics, there is an advantage that an overhead may be reduced. Further, the transmitting PDCP layer device does not need to generate a UDC header, and because there is no UDC header, there is the advantage that the receiving PDCP layer device may immediately identify a 1-bit indicator of the PDCP header, not apply a deciphering procedure because the SDAP control data is not ciphered, and quickly process SDAP control data.

As another method, data processing may be performed using a 1-bit D/C field of an SDAP header 1r-01 or SDAP control data instead of a 1-bit indicator of the PDCP header. For example, when the 1-bit D/C field of the SDAP header 1r-01 or the SDAP control data indicates SDAP control data (when the D/C field is 0, it may indicate SDAP control data, and when the D/C field is 1, it may indicate SDAP user data (or SDAP header)), it may indicate that there is no UDC header or that there is no UDC header and that only SDAP control data to which user compression is not applied is included. Therefore, the transmitting PDCP layer device does not need to generate a UDC header. The receiving PDCP layer device may first identify the 1-bit D/C field of the SDAP header or SDAP control data before applying the user decompression procedure, and when the SDAP user data or SDAP header is indicated, the receiving PDCP layer device may process the UDC header as in the other embodiments and perform a user decompression procedure. When the 1-bit D/C field of SDAP control data or the SDAP header indicates SDAP control data, the receiving PDCP layer device determines that there is no UDC header and the SDAP control data is not ciphered; thus, the receiving PDCP layer device may not apply a deciphering procedure, but process quickly SDAP control data without applying a user data decompression procedure. In other words, the transmitting PDCP layer device and the receiving PDCP layer device may separate and process SDAP control data (SDAP control PDU) and SDAP user data (SDAP data PDU).

For example, the base station may use the QoS information for scheduling. Further, the UE does not perform a deciphering procedure whenever SDAP control data is received, performs integrity protection when the integrity protection is set, and generate and attach the PDCP header to deliver the data to the lower layer without a procedure of generating the UDC header; thus, it is also easy to implement a UE for fast data processing. Further, in the eleventh embodiment of the disclosure, a procedure for processing SDAP control data without a UDC header is proposed, and it may be characterized that a structure of the PDCP PDU configures data in order of the PDCP header and the SDAP control data. When processing SDAP control data received from an upper layer, the eleventh embodiment may have a structure in which a PDCP header is concatenated in front of the SDAP control data.

Figure 1W:
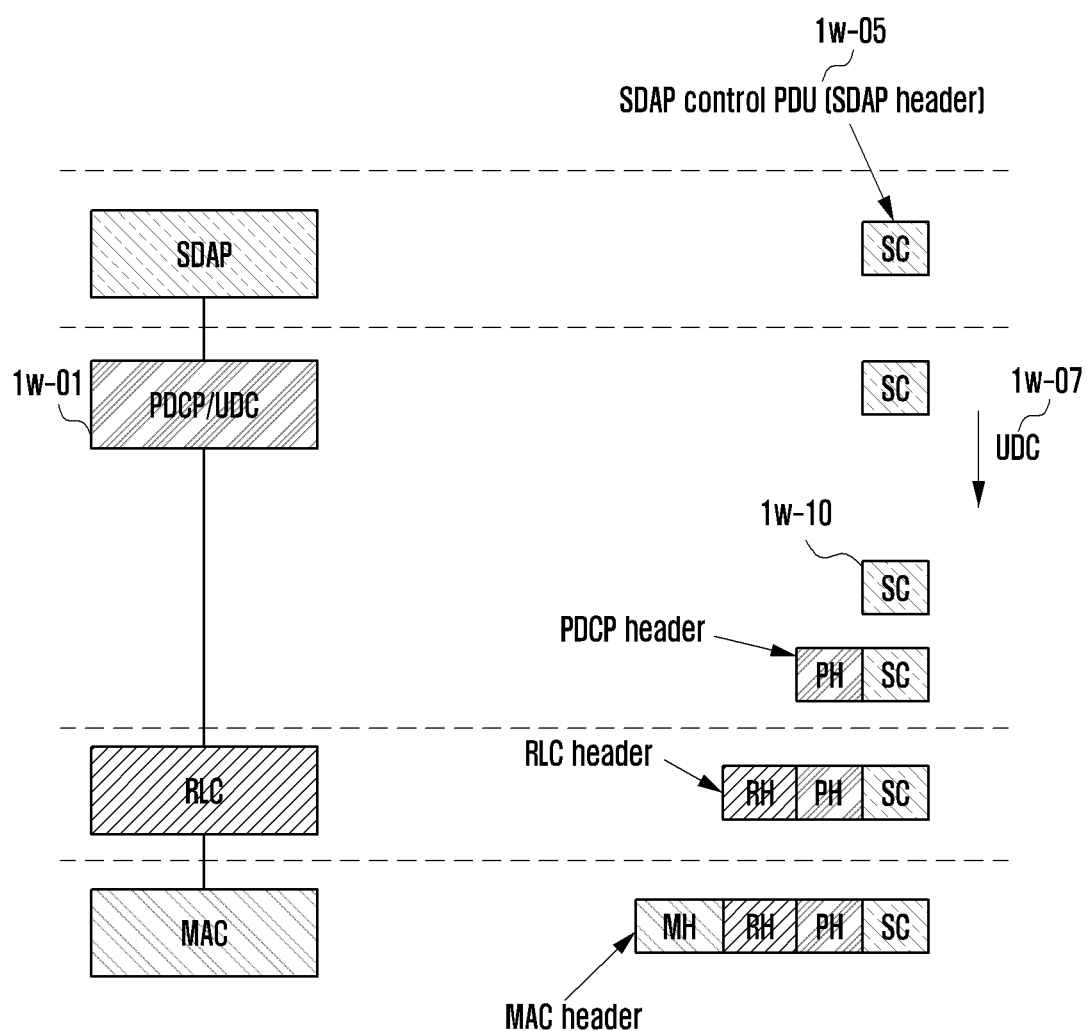
FIG. 1W is a diagram illustrating the eleventh embodiment of efficiently performing a user data compression method and processing SDAP control data when SDAP layer device is set or SDAP header is set based on the RRC message in the disclosure.

FIG. 1W is a diagram illustrating an eleventh embodiment of efficiently performing a user data compression method and processing SDAP control data when an SDAP layer device is set or when an SDAP header is set based on an RRC message in the disclosure.

In FIG. 1W, when it is set to use the SDAP layer device or when it is set to use the SDAP header by an RRC message such as 1e-10, 1e-40, or 1e-75 in FIG. 1E, the SDAP layer device may transmit SDAP control data to a lower layer (e.g., PDCP layer).

When UDC is set, if SDAP control data 1w-05 is received from an upper layer (SDAP layer device), the SDAP layer device may set a 1-bit D/C field of an SDAP header to '1' to indicate SDAP user data or the SDAP header in the case of SDAP user data (SDAP data PDU), and set a 1-bit D/C field of the SDAP header to '0' in the case of SDAP control data (SDAP control PDU) to indicate SDAP control data. The transmitting PDCP layer device does not perform a user data compression procedure on the SDAP control data received from the upper SDAP layer device (1v-07). It is characterized that a UDC header for the SDAP control data is not generated (1w-10). When integrity protection is set, it is characterized that the transmitting PDCP layer device applies integrity protection to the PDCP header and SDAP control data before performing a ciphering procedure, and then does not perform ciphering on the SDAP control data. The transmitting PDCP layer device may configure and concatenate a PDCP header at the front of the SDP control data to transmit the SDP control data to a lower layer device.

A 1-bit indicator of the PDCP header or a 1-bit D/C field of the SDAP header or SDAP control data of 1r-01 of FIG. 1R proposed in the eleventh embodiment of the disclosure may have a function of indicating presence or absence of a UDC header. The 1-bit indicator or the D/C field is extended and applied to the first embodiment, the second embodiment, the third embodiment, the fourth embodiment, the fifth embodiment, or the sixth embodiment of the disclosure and when a user compression procedure is not applied to the SDAP header and data received from the upper layer, the UDC header is omitted, and the 1-bit indicator of the PDCP header indicates that the UDC header was not attached, thereby reducing an overhead.

In the first embodiment, the second embodiment, the third embodiment, the fourth embodiment, the fifth embodiment, the sixth embodiment, the seventh embodiment, the eighth embodiment, the ninth embodiment, the tenth embodiment, or the eleventh embodiment of the disclosure, when the SDAP header or the SDAP layer device is set to each bearer of the UE based on an RRC message, as illustrated in FIG. 1E, in order to process the data (PDCP PDU) received from the lower layer device, it is characterized that the receiving PDCP layer device of the each bearer first identifies the 1-bit D/C field of the SDAP header or SDAP control data, and then performs a data processing procedure of the PDCP layer device. Because when the SDAP header and data are included in the PDCP PDU, as in the proposed embodiments (the first embodiment, the second embodiment, the third embodiment, the fourth embodiment, the fifth embodiment, or the sixth embodiment), data processing may be performed, but when only SDAP control data is included in the PDCP PDU, the data should be processed as in the eleventh embodiment (or the seventh embodiment, the eighth embodiment, the ninth embodiment, or the tenth embodiment); thus, the receiving PDCP layer device should first distinguish whether it is SDAP user data or SDAP control data. Further, even when the transmitting PDCP layer device processes data (PDCP SDU) received from the upper layer device, the transmitting PDCP layer device may first identify and classify a 1-bit D/C field of the SDAP header or SDAP control data and set a 1-bit D/C field of the SDAP header to '1' to indicate SDAP user data or the SDAP header in the case of SDAP user data (SDAP data PDU) and set the 1-bit D/C field of the SDAP header to '0' to indicate SDAP control data in the case of SDAP control data (SDAP control PDU), and then apply the procedure proposed in the embodiments of the disclosure.

As another method, in the seventh embodiment, the eighth embodiment, the ninth embodiment, or the tenth embodiment, data processing may be performed by newly defining 1 bit of the UDC header 1f-25. For example, when a 1-bit indicator field of the UDC header 1f-25 indicates SDAP control data (when the field is 1 (or 0), SDAP control data may be indicated, and when the field is 0 (or 1), the SDAP user data (or SDAP header) may be indicated), it may indicate that only SDAP control data to which user compression is not applied is included. Therefore, the transmitting PDCP layer device does not need to perform a ciphering procedure on the SDAP control data, and the receiving PDCP layer device first identifies a 1-bit indicator field of the UDC header before applying a user decompression procedure, and when SDAP user data or the SDAP header is indicated, the receiving PDCP layer device may process the UDC header, as in the other embodiments and perform a user decompression procedure, and when a 1-bit indicator field of the UDC header indicates SDAP control data, the receiving PDCP layer device may quickly process SDAP control data without applying a deciphering procedure and without applying a user data decompression procedure because SDAP control data is not ciphered. That is, the transmitting PDCP layer device and the receiving PDCP layer device may separate and process SDAP control data (SDAP control PDU) and SDAP user data (SDAP data PDU). As another method, a 1-bit indicator is defined in the PDCP header instead of the 1-bit of the UDC header to indicate whether the compressed data is included behind or the uncompressed data is included, or whether SDAP control data is included or whether SDAP user data is included.

As another method, in the seventh embodiment, the eighth embodiment, the ninth embodiment, or the tenth embodiment, the receiving PDCP layer device may identify a size of data received from the lower layer to perform data processing. For example, in the case of applying the seventh embodiment, the eighth embodiment, the ninth embodiment, or the tenth embodiment, when a size of data except for the PDCP header or the UDC header is 1 byte, the receiving PDCP layer device may determine that the SDAP control data is indicated, and when a size of data except for the PDCP header or the UDC header exceeds 1 byte, the receiving PDCP layer device may determine that SDAP user data (or SDAP header) is indicated. As another method, when a size of data except for the PDCP header is 2 bytes (1 byte UDC header and 1 byte SDAP control data), the receiving PDCP layer device may determine that SDAP control data is indicated, and when a size of data except for the PDCP header exceeds 2 bytes, the receiving PDCP layer device may determine that SDAP user data (or SDAP header) is indicated. As another method, when a size of data received from the lower layer is the sum of a size of the PDCP header, a size of the UDC header, and a size of the SDAP control data, the receiving PDCP layer device may determine that SDAP control data is indicated, and when a size of data received from the lower layer exceeds the sum of a size of the PDCP header and a size of the UDC header, and a size of the SDAP control data, the receiving PDCP layer device may determine that SDAP user data (or SDAP header) is indicated.

As another method, for example, in the case of applying the eleventh embodiment, the receiving PDCP layer device identifies a size of data received from the lower layer, and when a size of data except for the PDCP header is 1 byte, the receiving PDCP layer device may determine that SDAP control data is indicated, and when a size of data except for the PDCP header exceeds 1 byte, the receiving PDCP layer device may determine that SDAP user data (or SDAP header) is indicated. As another method, when a size of data received from the lower layer is the sum of a size of the PDCP header and a size of the SDAP control data, the receiving PDCP layer device may determine that SDAP control data is indicated, and when a size of data received from the lower layer exceeds the sum of a size of the PDCP header and a size of SDAP control data, the receiving PDCP layer device may determine that SDAP user data (or SDAP header) is indicated.

The transmitting PDCP layer device may identify a size of data received from the upper layer to perform data processing. For example, when a size of data received from the upper layer device is 1 byte, the transmitting PDCP layer device may determine that the data is SDAP control data (when a size of the data is 1 byte, the transmitting PDCP layer device may determine that the SDAP control data is indicated, and when a size of the data exceeds 1 byte, the transmitting PDCP layer device may determine that SDAP user data (or SDAP header) is indicated) and determine that only SDAP control data to which user compression is not applied is included. Therefore, the transmitting PDCP layer device does not need to perform a ciphering procedure on the SDAP control data, and the receiving PDCP layer device first identifies a size of the received data before applying a user decompression procedure, and when SDAP user data or SDAP header is indicated, the receiving PDCP layer device may process the UDC header as in the embodiments proposed in the disclosure and perform the user decompression procedure, and when a size of the received data indicates SDAP control data, SDAP control data is not ciphered; thus, the receiving PDCP layer device may quickly process SDAP control data without applying a deciphering procedure and without applying a user data decompression procedure. That is, the transmitting PDCP layer device and the receiving PDCP layer device may separate and process SDAP control data (SDAP control PDU) and SDAP user data (SDAP data PDU).

In the following description of the disclosure, there is proposed an operation of a PDCP layer device of a UE or a base station that performs different data processing by distinguishing the case where the transmitting or receiving PDCP layer device receives an SDAP header and upper layer data from an upper layer device or a lower layer device and the case where the transmitting or receiving PDCP layer device receives SDAP control data.

In FIG. 1e, when it is set to use the SDAP layer device or when it is set to use the SDAP header and when UDC is set by the RRC message such as 1e-10, 1e-40, or 1e-75, When data (e.g., PDCP SDU) received from the upper layer device (SDAP layer device) is configured with the SDAP header and the upper layer data or is not SDAP control data, in order to process the data (e.g., PDCP SDU) received from the upper layer device, the transmitting PDCP layer device may first identify and classify an 1-bit D/C field of the SDAP header or the SDAP control data. The transmitting PDCP layer device may indicate the SDAP header or the SDAP control data (or whether it is compressed) with a 1-bit indicator of an UDC header or a 1-bit indicator of a PDCP header. As another method, a size of the received data exceeds 1 byte, the transmitting PDCP layer device may determine that the data is not SDAP control data and that the SDAP header and data are included. However, when a size of the received data is 1 byte, the transmitting PDCP layer device may determine that the data is SDAP control data.

The transmitting PDCP layer device performs a procedure of the first embodiment, the second embodiment, the third embodiment, the fourth embodiment, the fifth embodiment, or the sixth embodiment of the disclosure. For example, the transmitting PDCP layer device applies a UDC compression procedure except for the SDAP header, performs integrity protection when integrity protection is set, ciphers the data, concatenates the PDCP header, and delivers the data to the lower layer device.

When data (e.g., PDCP SDU) received from the upper layer device (SDAP layer device) is not configured with the SDAP header and upper layer data or is SDAP control data, in order to process the data (e.g., PDCP SDU) received from the upper layer device, the transmitting PDCP layer device may first identify and classify a 1-bit D/C field of the SDAP header or SDAP control data. The transmitting PDCP layer device may indicate whether it is the SDAP header or the SDAP control data (or it is compressed) with a 1-bit D/C field of a UDC header or a 1-bit D/C field of a PDCP header. As another method, when a size of the received data exceeds 1 byte, the transmitting PDCP layer device may determine that the data is not SDAP control data and determine that the SDAP header and data are included. However, when a size of the received data is 1 byte, the transmitting PDCP layer device may determine that the data is SDAP control data.

The transmitting PDCP layer device performs a procedure of the seventh embodiment, the eighth embodiment, the ninth embodiment, the tenth embodiment, or the eleventh embodiment of the disclosure. For example, the transmitting PDCP layer device performs integrity protection when integrity protection is set to the SDAP control data, does not apply a UDC compression procedure or a ciphering procedure, concatenates the PDCP header, and delivers the data to the lower layer device.

When data (e.g., PDCP PDU) received from the lower layer device (RLC layer device) is configured with the SDAP header and upper layer data or is not SDAP control data, in order to process the data (PDCP PDU) received from the lower layer device, the receiving PDCP layer device may first identify and classify a 1-bit D/C field of the SDAP header or SDAP control data. As another method, the receiving PDCP layer device may identify and classify a 1-bit indicator of the UDC header or a 1-bit indicator of the PDCP header. As another method, in the seventh embodiment, the eighth embodiment, the ninth embodiment, or the tenth embodiment, the receiving PDCP layer device may identify a size of data received from the lower layer to perform data processing. For example, when the seventh embodiment, the eighth embodiment, the ninth embodiment, or the tenth embodiment is applied, if a size of data except for the PDCP header or the UDC header is 1 byte, the receiving PDCP layer device may determine that SDAP control data is indicated, and if a size of data except for the PDCP header or the UDC header exceeds 1 byte, the receiving PDCP layer device may determine that SDAP user data (or SDAP header) is indicated. As another method, when a size of data except for the PDCP header is 2 bytes (1 byte UDC header and 1 byte SDAP control), the receiving PDCP layer device may determine that SDAP control data is indicated, and when a size of data except for the PDCP header exceeds 2 bytes, the receiving PDCP layer device may determine that SDAP user data (or SDAP header) is indicated. As another method, when a size of data received from the lower layer is the sum of a size of the PDCP header, a size of the UDC header, and a size of the SDAP control data, the receiving PDCP layer device may determine that SDAP control data is indicated, and when a size of data received from the lower layer exceeds the sum of a size of the PDCP header, a size of the UDC header, and a size of the SDAP control data, the receiving PDCP layer device may determine that SDAP user data (or SDAP header) is indicated. As another method, for example, in the case of applying the eleventh embodiment, the receiving PDCP layer device identifies a size of data received from the lower layer, and when a size of data except for the PDCP header is 1 byte, the receiving PDCP layer device may determine that SDAP user data (or SDAP header) is indicated, and when a size of data except for the PDCP header exceeds 1 byte, the receiving PDCP layer device may determine that SDAP control data (or SDAP header) is indicated. As another method, when a size of data received from the lower layer is the sum of a size of the PDCP header and a size of the SDAP control data, the receiving PDCP layer device may determine that SDAP control data is indicated, and when a size of data received from the lower layer exceeds the sum of a size of the PDCP header and a size of the SDAP control data, the receiving PDCP layer device may determine that SDAP user data (or SDAP header) is indicated.

The receiving PDCP layer device performs a procedure of the first embodiment, the second embodiment, the third embodiment, the fourth embodiment, the fifth embodiment, or the sixth embodiment of the disclosure. For example, the receiving PDCP layer device performs a deciphering procedure except for the SDAP header, performs integrity verification when integrity protection is set, and when there is an indicator that a UDC compression procedure is applied to the UDC header, the receiving PDCP layer device performs a UDC decompression procedure and delivers the data to the higher layer device.

When data (e.g., PDCP PDU) received from the lower layer device (RLC layer device) is not configured with the SDAP header and upper layer data or is SDAP control data, in order to process the data (e.g., PDCP PDU) received from the lower layer device, the receiving PDCP layer device may first identify and classify a 1-bit D/C field of the SDAP header or SDAP control data. As another method, the receiving PDCP layer device may identify and classify a 1-bit indicator of the UDC header or a 1-bit indicator of the PDCP header. As another method, in the seventh embodiment, the eighth embodiment, the ninth embodiment, or the tenth embodiment, the receiving PDCP layer device may identify a size of data received from the lower layer to perform data processing. For example, in the case of applying the seventh embodiment, the eighth embodiment, the ninth embodiment, or the tenth embodiment, when a size of data except for the PDCP header or the UDC header is 1 byte, the receiving PDCP layer device may determine that SDAP control data is indicated, and when a size of data except for the PDCP header or the UDC header exceeds 1 byte, the receiving PDCP layer device may determine that SDAP user data (or SDAP header) is indicated. As another method, when a size of data except for the PDCP header is 2 bytes (1 byte UDC header and 1 byte SDAP control data), the receiving PDCP layer device may determine that SDAP control data is indicated, and when a size of data except for the PDCP header exceeds 2 bytes, the receiving PDCP layer device may determine that SDAP user data (or SDAP header) is indicated. As another method, when a size of data received from the lower layer is the sum of a size of the PDCP header, a size of the UDC header, and a size of the SDAP control data, the receiving PDCP layer device may determine that the SDAP control data is indicated, and when a size of data received from the lower layer exceeds the sum of a size of the PDCP header, a size of the UDC header, and a size of the SDAP control data, the receiving PDCP layer device may determine that the SDAP user data (or SDAP header) is indicated. As another method, for example, in the case of applying the eleventh embodiment, the receiving PDCP layer device may identify a size of data received from the lower layer, and when a size of data except for the PDCP header is 1 byte, the receiving PDCP layer device may determine that SDAP control data is indicated, and when a size of data except for the PDCP header exceeds 1 byte, the receiving PDCP layer device may determine that SDAP user data (or SDAP header) is indicated. As another method, when a size of data received from the lower layer is the sum of a size of the PDCP header and a size of the SDAP control data, the receiving PDCP layer device may determine that SDAP control data is indicated, and when a size of data received from the lower layer exceeds the sum of a size of the PDCP header and a size of the SDAP control data, the receiving PDCP layer device may determine that SDAP user data (or SDAP header) is indicated.

The receiving PDCP layer device performs a procedure of the seventh embodiment, the eighth embodiment, the ninth embodiment, the tenth embodiment, or the eleventh embodiment of the disclosure. For example, the receiving PDCP layer device may not perform a deciphering procedure on SDAP control data, perform integrity verification when integrity protection is set, and deliver the data to a higher layer device without performing a UDC decompression procedure.

In the above description of the disclosure, efficient methods of processing an SDAP header or SDAP control data when a header or data compression method is set to the PDCP layer device based on an RRC message have been proposed. In particular, methods that consider whether ciphering or a header position are considered together with a new header (e.g., UDC header) generated by a header or data compression method set to the PDCP layer device have been specifically proposed. Specific embodiments (the first embodiment, the second embodiment, the third embodiment, the fourth embodiment, the fifth embodiment, the sixth embodiment, the seventh embodiment, the eighth embodiment, the ninth embodiment, the tenth embodiment, or the eleventh embodiment) proposed in the disclosure may be extended and applied to a case where a new compression method (e.g., Ethernet header compression method, Ethernet header compression) is introduced and is set to the PDCP layer device, and when another new header (e.g., Ethernet header compression header (EHC header)) is generated because of a new compression method, embodiments of the disclosure that consider whether to cipher or a header position together with the new header may be extended and applied. Further, specific embodiments (the first embodiment, the second embodiment, the third embodiment, the fourth embodiment, the fifth embodiment, the sixth embodiment, the seventh embodiment, the eighth embodiment, the ninth embodiment, the tenth embodiment, or the eleventh embodiment) proposed in the disclosure may be extended and applied to the case where an existing compression method (e.g., ROHC compression method) is set to the PDCP layer device, and when another new header is generated because of the header compression method, embodiments of the disclosure that consider whether ciphering or a header position together with the new header may be extended and applied. For example, when the ROHC header compression method is applied, it may be extended as follows.

In FIG. 1E, when it is set to use the SDAP layer device or when it is set to use the SDAP header and when robust header compression (ROHC) is set by an RRC message such as 1e-10, 1e-40, or 1e-75, When data (e.g., PDCP SDU) received from the upper layer device (SDAP layer device) is configured with the SDAP header and upper layer data or is not SDAP control data, in order to process the data (e.g., PDCP SDU) received from the upper layer device, the transmitting PDCP layer device may first identify and classify a 1-bit D/C field of the SDAP header or SDAP control data. The transmitting PDCP layer device may indicate whether the data is an SDAP header or SDAP control data (or whether it is compressed) with a 1-bit indicator of the PDCP header. As another method, when a size of received data exceeds 1 byte, the transmitting PDCP layer device may determine that the data is not SDAP control data and determine that the SDAP header and data are included. However, when a size of the received data is 1 byte, the transmitting PDCP layer device may determine that the data is SDAP control data.

The transmitting PDCP layer device performs a procedure of the first embodiment, the second embodiment, the third embodiment, the fourth embodiment, the fifth embodiment, or the sixth embodiment of the disclosure. For example, the transmitting PDCP layer device applies the ROHC compression procedure except for the SDAP header, performs integrity protection when integrity protection is set, performs ciphering, concatenates the PDCP header, and delivers the data to the lower layer device.

When data (e.g., PDCP SDU) received from the upper layer device (SDAP layer device) is not configured with the SDAP header and upper layer data or is SDAP control data, in order to process the data (e.g., PDCP SDU) received from the upper layer device, the transmitting PDCP layer device may first identify and classify a 1-bit D/C field of the SDAP header or SDAP control data. Whether the data is the SDAP header or SDAP control data (or whether it is compressed) may be indicated with a 1-bit indicator of the PDCP header. As another method, when a size of received data exceeds 1 byte, the transmitting PDCP layer device may determine that the data is not SDAP control data, and determine that the SDAP header and data are included. However, when a size of the received data is 1 byte, the transmitting PDCP layer device may determine that the data is SDAP control data.

The transmitting PDCP layer device performs a procedure of the seventh embodiment, the eighth embodiment, the ninth embodiment, the tenth embodiment, or the eleventh embodiment of the disclosure. For example, the transmitting PDCP layer device performs integrity protection when integrity protection is set to the SDAP control data, does not apply the ROHC compression procedure or the ciphering procedure, and concatenates the PDCP header to deliver the data to the lower layer device.

When data (e.g., PDCP PDU) received from the lower layer device (the RLC layer device) is configured with the SDAP header and upper layer data or is not SDAP control data, in order to process the data (e.g., PDCP PDU) received from the lower layer device, the receiving PDCP layer device may first identify and classify a 1-bit D/C field of the SDAP header or SDAP control data. As another method, the receiving PDCP layer device may identify and classify a 1-bit indicator of the PDCP header. As another method, when a size of data except for the PDCP header of data received from the lower layer exceeds 1 byte, the receiving PDCP layer device may determine that the data is not SDAP control data, and determine that the SDAP header and data are included. However, when a size of data except for the PDCP header of data received from the lower layer is 1 byte, the receiving PDCP layer device may determine that the data is SDAP control data. As another method, when a size of data received from the lower layer is the sum of a size of the PDCP header and a size of the SDAP control data, the receiving PDCP layer device may determine that the SDAP control data is indicated, and when a size of data received from the lower layer exceeds the sum of a size of the PDCP header and a size of the SDAP control data, the receiving PDCP layer device may determine that SDAP user data (or SDAP header) is indicated.

The receiving PDCP layer device performs a procedure of the first embodiment, the second embodiment, the third embodiment, the fourth embodiment, the fifth embodiment, or the sixth embodiment of the disclosure. For example, the receiving PDCP layer device performs a deciphering procedure except for the SDAP header, performs integrity verification when integrity protection is set, performs an ROHC decompression procedure, and transmits the data to the higher layer device.

When data (e.g., PDCP PDU) received from the lower layer device (RLC layer device) is not configured with the SDAP header and upper layer data or is SDAP control data, in order to process the data (e.g., PDCP PDU) received from the lower layer device, the receiving PDCP layer device may first identify and classify a 1-bit D/C field of the SDAP header or SDAP control data. As another method, the receiving PDCP layer device may identify and classify a 1-bit indicator of the PDCP header. As another method, when a size of data except for the PDCP header of data received from the lower layer exceeds 1 byte, the receiving PDCP layer device may determine that the data is not SDAP control data and determine that the SDAP header and data are included. However, when a size of data except for the PDCP header of data received from the lower layer is 1 byte, the receiving PDCP layer device may determine that the data is SDAP control data. As another method, when a size of data received from the lower layer is the sum of a size of the PDCP header and a size of the SDAP control data, the receiving PDCP layer device may determine that the SDAP control data is indicated, and when a size of data received from the lower layer exceeds the sum of a size of the PDCP header and a size of the SDAP control data, the receiving PDCP layer device may determine that the SDAP user data (or SDAP header) is indicated.

The receiving PDCP layer device performs a procedure of the seventh embodiment, the eighth embodiment, the ninth embodiment, the tenth embodiment, or the eleventh embodiment of the disclosure. For example, the receiving PDCP layer device does not perform a deciphering procedure on the SDAP control data, performs integrity verification when integrity protection is set, does not perform the ROHC decompression procedure, and delivers the data to the upper layer device.

The following description of the disclosure, as an extended embodiment of embodiments of the disclosure, there is proposed an operation of the PDCP layer device of the UE or the base station that performs different data processing by distinguishing a case where the transmitting or receiving PDCP layer device receives an SDAP header and upper layer data from an upper layer device or a lower layer device and a case where the transmitting or receiving PDCP layer device receives SDAP control data from an upper layer device or a lower layer device.

In FIG. 1E, when it is set to use the SDAP layer device or when it is set to use the SDAP header, and when UDC is set by an RRC message such as 1e-10, 1e-40, or 1e-75, When data (e.g., PDCP SDU) received from the upper layer device (SDAP layer device) is configured with the SDAP header and upper layer data or is not SDAP control data, in order to process the data (e.g., PDCP SDU) received from the upper layer device, the transmitting PDCP layer device may first identify and classify a 1-bit D/C field of the SDAP header or SDAP control data. Whether the data is the SDAP header or SDAP control data (or whether it is compressed) may be indicated with a 1-bit indicator of the UDC header or a 1-bit indicator of the PDCP header. As another method, when a size of received data exceeds 1 byte, the transmitting PDCP layer device may determine that the data is not SDAP control data and determine that the SDAP header and data are included. However, when a size of the received data is 1 byte, the transmitting PDCP layer device may determine that the data is SDAP control data.

The transmitting PDCP layer device performs a procedure of the fourth embodiment (FIG. 1K) of the disclosure. For example, the transmitting PDCP layer device applies the UDC compression procedure except for the SDAP header and performs integrity protection when integrity protection is set, attaches the UDC header after the SDAP header, ciphers the UDC header and compressed data except for the SDAP header, concatenates a PDCP header at the front, and delivers the data to the lower layer device.

When data (e.g., PDCP SDU) received from the upper layer device (SDAP layer device) is not configured with the SDAP header and upper layer data or is SDAP control data, in order to process the data (PDCP SDU) received from the upper layer device, the transmitting PDCP layer device may first identify and classify a 1-bit D/C field of the SDAP header or SDAP control data. Whether the data is the SDAP header or SDAP control data (or whether it is compressed) may be indicated with a 1-bit indicator of the UDC header or a 1-bit indicator of the PDCP header. As another method, when a size of the received data exceeds 1 byte, the transmitting PDCP layer device may determine that the data is not SDAP control data, and determine that the SDAP header and data are included. However, when a size of the received data is 1 byte, the transmitting PDCP layer device may determine that the data is SDAP control data.

The transmitting PDCP layer device performs a procedure of the eleventh embodiment (FIG. 1W) of the disclosure. For example, the transmitting PDCP layer device performs integrity protection when integrity protection is set to the SDAP control data, does not apply a UDC compression procedure or a ciphering procedure, does not generate a UDC header, concatenates the PDCP header, and delivers the data to the lower layer device. As another method, the transmitting PDCP layer device may generate and cipher a UDC header to apply the ninth embodiment (FIG. 1U) or the tenth embodiment (FIG. 1V).

When data (e.g., PDCP PDU) received from the lower layer device (RLC layer device) is configured with the SDAP header and upper layer data or is not SDAP control data, in order to process the data (PDCP PDU) received from the lower layer device, the receiving PDCP layer device may first identify and classify a 1-bit D/C field of the SDAP header or SDAP control data. As another method, the receiving PDCP layer device may identify and classify a 1-bit indicator of the UDC header or a 1-bit indicator of the PDCP header. As another method, in the ninth embodiment or the tenth embodiment, the receiving PDCP layer device may identify a size of data received from the lower layer to perform data processing. For example, in the case of applying the ninth embodiment or the tenth embodiment, when a size of data except for the PDCP header or the UDC header is 1 byte, the receiving PDCP layer device may determine that the SDAP control data is indicated, and when a size of data except for the PDCP header or the UDC header exceeds 1 byte, the receiving PDCP layer device may determine that SDAP user data (or SDAP header) is indicated. As another method, when a size of data except for the PDCP header is 2 bytes (1 byte UDC header and 1 byte SDAP control data), the receiving PDCP layer device may determine that SDAP control data is indicated, and when a size of data except for the PDCP header exceeds 2 bytes, the receiving PDCP layer device may determine that SDAP user data (or SDAP header) is indicated. As another method, when a size of data received from the lower layer is the sum of a size of the PDCP header, a size of the UDC header, and a size of the SDAP control data, the receiving PDCP layer device may determine that the SDAP control data is indicated, and when a size of data received from the lower layer exceeds the sum of a size of the PDCP header, a size of the UDC header, and a size of the SDAP control data, the receiving PDCP layer device may determine that SDAP user data (or SDAP header) is indicated. As another method, for example, in the case of applying the eleventh embodiment, the receiving PDCP layer device identifies a size of data received from the lower layer, and when a size of data except for the PDCP header is 1 byte, the receiving PDCP layer device may determine that SDAP control data is indicated, and when a size of data except for the PDCP header exceeds 1 byte, the receiving PDCP layer device may determine that SDAP user data (or SDAP header) is indicated. As another method, when a size of data received from the lower layer is the sum of a size of the PDCP header and a size of the SDAP control data, the receiving PDCP layer device may determine that the SDAP control data is indicated, and when a size of data received from the lower layer exceeds the sum of a size of the PDCP header and a size of the SDAP control data, the receiving PDCP layer device may determine that SDAP user data (or SDAP header) is indicated.

The receiving PDCP layer device performs a procedure of the fourth embodiment (FIG. 1K) of the disclosure. For example, the receiving PDCP layer device performs a deciphering procedure on the UDC header and data except for the SDAP header, performs integrity verification when integrity protection is set, and when there is an indicator that the UDC compression procedure is applied to the UDC header, the receiving PDCP layer device performs a UDC decompression procedure and delivers the data to the upper layer device.

When data (e.g., PDCP PDU) received from the lower layer device (RLC layer device) is not configured with the SDAP header and upper layer data or is SDAP control data, in order to process the data (e.g., PDCP PDU) received from the lower layer device, the receiving PDCP layer device may first identify and classify a 1-bit D/C field of the SDAP header or SDAP control data. As another method, the receiving PDCP layer device may identify and classify a 1-bit indicator of the UDC header or a 1-bit indicator of the PDCP header. As another method, in the ninth or tenth embodiment, the receiving PDCP layer device may identify a size of data received from the lower layer to perform data processing. For example, when the ninth embodiment or the tenth embodiment is applied, if a size of data except for the PDCP header or the UDC header is 1 byte, the receiving PDCP layer device may determine that SDAP control data is indicated, and if a size of data except for the PDCP header or the UDC header exceeds 1 byte, the receiving PDCP layer device may determine that SDAP user data (or SDAP header) is indicated. As another method, when a size of data except for the PDCP header is 2 bytes (1 byte UDC header and 1 byte SDAP control data), the receiving PDCP layer device may determine that SDAP control data is indicated, and when a size of data except for the PDCP header exceeds 2 bytes, the receiving PDCP layer device may determine that SDAP user data (or SDAP header) is indicated. As another method, when a size of data received from the lower layer is the sum of a size of the PDCP header, a size of the UDC header, and a size of SDAP control data, the receiving PDCP layer device may determine that SDAP control data is indicated, and when a size of data received from the lower layer exceeds the sum of a size of the PDCP header, a size of the UDC header, and a size of SDAP control data, the receiving PDCP layer device may determine that SDAP user data (or SDAP header) is indicated. As another method, for example, in the case of applying the eleventh embodiment, the receiving PDCP layer device identifies a size of data received from the lower layer, and when a size of data except for the PDCP header is 1 byte, the receiving PDCP layer device may determine that SDAP control data is indicated, and when a size of data except for the PDCP header exceeds 1 byte, the receiving PDCP layer device may determine that SDAP user data (or SDAP header) is indicated. As another method, when a size of data received from the lower layer is the sum of a size of the PDCP header and a size of SDAP control data, the receiving PDCP layer device may determine that SDAP control data is indicated, and when a size of data received from the lower layer exceeds the sum of a size of the PDCP header and a size of SDAP control data, the receiving PDCP layer device may determine that SDAP user data (or SDAP header) is indicated.

The receiving PDCP layer device performs a procedure of the eleventh embodiment (FIG. 1W) of the disclosure. For example, the receiving PDCP layer device does not perform a deciphering procedure for SDAP control data, and performs integrity verification when integrity protection is set, and because there is no UDC header and UDC compression is not applied to SDAP control data, the receiving PDCP layer device does not perform a UDC decompression procedure and transmits the data to the upper layer device. As another method, the ninth embodiment (FIG. 1U) or the 10th embodiment (FIG. 1V) in which the UDC header included in the received data is deciphered and processed may be applied.

In the following description of the disclosure, as an extended embodiment of embodiments of the disclosure, there is proposed an operation of the PDCP layer device of the UE or the base station that performs different data processing by distinguishing a case where the transmitting or receiving PDCP layer device receives an SDAP header and upper layer data from an upper layer device and a lower layer device and a case where the transmitting or receiving PDCP layer device receives SDAP control data from an upper layer device and a lower layer device.

In FIG. 1E, when it is set to use the SDAP layer device or when it is set to use the SDAP header, and when UDC is set by an RRC message such as 1e-10, 1e-40, or 1e-75, When data (e.g., PDCP SDU) received from the upper layer device (SDAP layer device) is configured with the SDAP header and upper layer data or is not SDAP control data, in order to process the data (e.g., PDCP SDU) received from the upper layer device, the transmitting PDCP layer device may first identify and classify a 1-bit D/C field of the SDAP header or SDAP control data. Whether the SDAP header or SDAP control data (or whether it is compressed) may be indicated with a 1-bit indicator of the UDC header or a 1-bit indicator of the PDCP header. As another method, when a size of the received data exceeds 1 byte, the transmitting PDCP layer device may determine that the data is not SDAP control data and determine that the SDAP header and data are included. However, when a size of the received data is 1 byte, the transmitting PDCP layer device may determine that the data is SDAP control data.

The transmitting PDCP layer device performs a procedure of the fifth embodiment (FIG. 1P) of the disclosure. For example, the transmitting PDCP layer device applies a UDC compression procedure except for the SDAP header, performs integrity protection when integrity protection is set, attaches the UDC header after the SDAP header, ciphers the compressed data except for the SDAP header and the UDC header, concatenates the PDCP header at the front, and delivers the data to the lower layer device.

When data (e.g., PDCP SDU) received from the upper layer device (SDAP layer device) is not configured with the SDAP header and upper layer data or is SDAP control data, in order to process the data (e.g., PDCP SDU) received from the upper layer device, the transmitting PDCP layer device may first identify and classify a 1-bit D/C field of the SDAP header or SDAP control data. Whether the SDAP header or SDAP control data (or whether it is compressed) may be indicated with a 1-bit indicator of the UDC header or a 1-bit indicator of the PDCP header. As another method, when a size of the received data exceeds 1 byte, the transmitting PDCP layer device may determine that the data is not SDAP control data, and determine that the SDAP header and data are included. However, when a size of the received data is 1 byte, the transmitting PDCP layer device may determine that the data is SDAP control data.

The transmitting PDCP layer device performs a procedure of the eleventh embodiment (FIG. 1W) of the disclosure. For example, the transmitting PDCP layer device performs integrity protection when integrity protection is set to the SDAP control data, does not apply a UDC compression procedure or a ciphering procedure, does not generate a UDC header, concatenates the PDCP header, and delivers the data to the lower layer device. As another method, the seventh embodiment (FIG. 1S) may be applied without generating and ciphering the UDC header.

When data (e.g., PDCP PDU) received from the lower layer device (the RLC layer device) is configured with the SDAP header and upper layer data or is not SDAP control data, in order to process the data (e.g., PDCP PDU) received from the lower layer device, the receiving PDCP layer device may first identify and classify a 1-bit D/C field of the SDAP header or SDAP control data. As another method, the receiving PDCP layer device may identify and classify a 1-bit indicator of a UDC header or a 1-bit indicator of a PDCP header. As another method, in the seventh embodiment, the receiving PDCP layer device may identify a size of data received from the lower layer to perform data processing. For example, in the case of applying the seventh embodiment, when a size of data except for the PDCP header or the UDC header is 1 byte, the receiving PDCP layer device may determines that SDAP control data is indicated, and when a size of data except for the PDCP header or the UDC header exceeds 1 byte, the receiving PDCP layer device may determines that SDAP user data (or SDAP header) is indicated. As another method, when a size of data except for the PDCP header is 2 bytes (1 byte UDC header and 1 byte SDAP control data), the receiving PDCP layer device may determines that SDAP control data is indicated, and when a size of data except for the PDCP header exceeds 2 bytes, the receiving PDCP layer device may determines that SDAP user data (or SDAP header) is indicated. As another method, when a size of data received from the lower layer is the sum of a size of the PDCP header, a size of the UDC header, and a size of the SDAP control data, the receiving PDCP layer device may determine that the SDAP control data is indicated, and when a size of data received from the lower layer exceeds the sum of a size of the PDCP header, a size of the UDC header, and a size of the SDAP control data, the receiving PDCP layer device may determine that SDAP user data (or SDAP header) is indicated. As another method, for example, when applying the eleventh embodiment, the receiving PDCP layer device may identify a size of data received from the lower layer and when a size of data except for the PDCP header is 1 byte, the receiving PDCP layer device may determine that SDAP control data is indicated, and when a size of data except for the PDCP header exceeds 1 byte, the receiving PDCP layer device may determine that SDAP user data (or SDAP header) is indicated. As another method, when a size of data received from the lower layer is the sum of a size of the PDCP header and a size of the SDAP control data, the receiving PDCP layer device may determine that the SDAP control data is indicated, and when a size of data received from the lower layer exceeds the sum of a size of the PDCP header and a size of the SDAP control data, the receiving PDCP layer device may determine that SDAP user data (or SDAP header) is indicated.

The receiving PDCP layer device performs a procedure of the fifth embodiment (FIG. 1P) of the disclosure. For example, the receiving PDCP layer device performs a deciphering procedure on the data except for the SDAP header and the UDC header, performs integrity verification when integrity protection is set, performs a UDC decompression procedure when there is an indicator that a UDC compression procedure was applied to the UDC header, and deliver the data to the upper layer device.

When data (e.g., PDCP PDU) received from the lower layer device (RLC layer device) is not configured with the SDAP header and upper layer data or is SDAP control data, in order to process the data (e.g., PDCP PDU) received from the lower layer device, the receiving PDCP layer device may first identify and classify a 1-bit D/C field of the SDAP header or SDAP control data. As another method, the receiving PDCP layer device may identify and classify a 1-bit indicator of a UDC header or a 1-bit indicator of a PDCP header. As another method, in the seventh embodiment, the receiving PDCP layer device may identify a size of data received from the lower layer to perform data processing. For example, in the case of applying the seventh embodiment, when a size of data except for the PDCP header or the UDC header is 1 byte, the receiving PDCP layer device may determine that SDAP control data is indicated, and when a size of data except for the PDCP header or the UDC header exceeds 1 byte, the receiving PDCP layer device may determine that SDAP user data (or SDAP header) is indicated. As another method, when a size of data except for the PDCP header is 2 bytes (1 byte UDC header and 1 byte SDAP control data), the receiving PDCP layer device may determine that SDAP control data is indicated, and when a size of data except for the PDCP header exceeds 2 bytes, the receiving PDCP layer device may determine that SDAP user data (or SDAP header) is indicated. As another method, when a size of data received from the lower layer is the sum of a size of the PDCP header, a size of the UDC header, and a size of the SDAP control data, the receiving PDCP layer device may determine that SDAP control data is indicated, and when a size of data received from the lower layer exceeds the sum of a size of the PDCP header, a size of the UDC header, and a size of the SDAP control data, the receiving PDCP layer device may determine that SDAP user data (or SDAP header) is indicated. As another method, for example, when applying the eleventh embodiment, the receiving PDCP layer device may identify a size of data received from the lower layer, and when a size of data except for the PDCP header is 1 byte, the receiving PDCP layer device may determine that SDAP control data is indicated, and when a size of data except for the PDCP header exceeds 1 byte, the receiving PDCP layer device may determine that SDAP user data (or SDAP header) is indicated. As another method, when a size of data received from the lower layer is the sum of a size of the PDCP header and a size of the SDAP control data, the receiving PDCP layer device may determine that SDAP control data is indicated, and when a size of data received from the lower layer exceeds the sum of a size of the PDCP header and a size of the SDAP control data, the receiving PDCP layer device may determine that SDAP user data (or SDAP header) is indicated.

The receiving PDCP layer device performs a procedure of the eleventh embodiment (FIG. 1W) of the disclosure. For example, the receiving PDCP layer device does not perform a deciphering procedure for SDAP control data, and performs integrity verification when integrity protection is set, and because there is no UDC header and UDC compression is not applied to SDAP control data, the receiving PDCP layer device does not perform a UDC decompression procedure and delivers the data to the upper layer device. As another method, the receiving PDCP layer device may apply the seventh embodiment (FIG. 1S) in which the UDC header included in the received data is processed without deciphering.

When the ROHC header compression method is applied, the above embodiments of the disclosure may be extended as follows.

In FIG. 1E, when it is set to use the SDAP layer device or when it is set to use the SDAP header and when robust header compression (ROHC) is set by an RRC message such as 1e-10, 1e-40, or 1e-75, When data (e.g., PDCP SDU) received from the upper layer device (SDAP layer device) is configured with the SDAP header and upper layer data or is not SDAP control data, in order to process the data (e.g., PDCP SDU) received from the upper layer device, the transmitting PDCP layer device may first identify and classify a 1-bit D/C field of the SDAP header or SDAP control data. As another method, when a size of received data exceeds 1 byte, the transmitting PDCP layer device may determine that the data is not SDAP control data and determine that the SDAP header and data are included. However, when a size of the received data is 1 byte, the transmitting PDCP layer device may determine that the data is SDAP control data.

The transmitting PDCP layer device performs a procedure of the fourth embodiment (FIG. 1K) of the disclosure. For example, the transmitting PDCP layer device applies an ROHC compression procedure except for the SDAP header, performs integrity protection when integrity protection is set, attaches a header compressed with ROHC behind the SDAP header, ciphers a header and data compressed with ROHC except the SDAP header, concatenates the PDCP header at the front, and delivers the data to the lower layer device.

When data (e.g., PDCP SDU) received from the upper layer device (SDAP layer device) is not configured with the SDAP header and upper layer data or is SDAP control data, in order to process the data (e.g., PDCP SDU) received from the upper layer device, the transmitting PDCP layer device may first identify and classify a 1-bit D/C field of the SDAP header or SDAP control data. As another method, when a size of the received data exceeds 1 byte, the transmitting PDCP layer device may determine that the data is not SDAP control data, and determine that the SDAP header and data are included. However, when a size of the received data is 1 byte, the transmitting PDCP layer device may determine that the data is SDAP control data.

The transmitting PDCP layer device performs a procedure of the eleventh embodiment (FIG. 1W) of the disclosure. For example, the transmitting PDCP layer device performs integrity protection when integrity protection is set to SDAP control data, does not apply an ROHC compression procedure or a ciphering procedure, does not generate a header for ROHC, concatenates the PDCP header, and delivers the data to the lower layer device.

When data (e.g., PDCP PDU) received from the lower layer device (RLC layer device) is configured with the SDAP header and upper layer data or is not SDAP control data, in order to process the data (e.g., PDCP PDU) received from the lower layer device, the receiving PDCP layer device may first identify and classify a 1-bit D/C field of the SDAP header or SDAP control data. As another method, for example, in the case of applying the eleventh embodiment, the receiving PDCP layer device may identify a size of data received from the lower layer, and when a size of data except for the PDCP header is 1 byte, the receiving PDCP layer device may determine that SDAP control data is indicated, and when a size of data except for the PDCP header exceeds 1 byte, the receiving PDCP layer device may determine that SDAP user data (or SDAP header) is indicated. As another method, when a size of data received from the lower layer is the sum of a size of the PDCP header and a size of the SDAP control data, the receiving PDCP layer device may determine that the SDAP control data is indicated, and when a size of data received from the lower layer exceeds the sum of a size of the PDCP header and a size of the SDAP control data, the receiving PDCP layer device may determine that SDAP user data (or SDAP header) is indicated.

The receiving PDCP layer device performs a procedure of the fourth embodiment (FIG. 1K) of the disclosure. For example, the receiving PDCP layer device performs a deciphering procedure on the header and data compressed with ROHC except for the SDAP header, performs integrity verification when integrity protection is set, performs an ROHC decompression procedure on the header compressed with ROHC, and delivers the data to the upper layer device.

When data (e.g., PDCP PDU) received from the lower layer device (RLC layer device) is not configured with the SDAP header and upper layer data or is SDAP control data, in order to process the data (e.g., PDCP PDU) received from the lower layer device, the receiving PDCP layer device may first identify and classify a 1-bit D/C field of the SDAP header or SDAP control data. As another method, for example, when applying the eleventh embodiment, the receiving PDCP layer device may identify a size of data received from the lower layer, and when a size of data except for the PDCP header is 1 byte, the receiving PDCP layer device may determine that SDAP control data is indicated, and when a size of data except for the PDCP header exceeds 1 byte, the receiving PDCP layer device may determine that SDAP user data (or SDAP header) is indicated. As another method, when a size of data received from the lower layer is the sum of a size of the PDCP header and a size of the SDAP control data, the receiving PDCP layer device may determine that the SDAP control data is indicated, and when a size of data received from the lower layer exceeds the sum of a size of the PDCP header and a size of the SDAP control data, the receiving PDCP layer device may determine that SDAP user data (or SDAP header) is indicated.

The receiving PDCP layer device performs a procedure of the eleventh embodiment (FIG. 1W) of the disclosure. For example, the receiving PDCP layer device does not perform a deciphering procedure on SDAP control data, and performs integrity verification when integrity protection is set, and because there is no header for ROHC and ROHC compression is not applied to SDAP control data, the receiving PDCP layer device does not perform an ROHC decompression procedure and delivers data to the upper layer device.

FIG. 1L is a diagram specifically illustrating a data processing procedure when an integrity protection and verification procedure is set in the above embodiments of the disclosure.

In FIG. 1L, when it is set to use the SDAP layer device or when it is set to use the SDAP header by an RRC message such as 1e-10, 1e-40, or 1e-75 in FIG. 1E, if the SDAP layer device receives data from a higher layer, the SDAP layer device may generate and configure an SDAP header to deliver the SDAP header to the PDCP layer device, as in 1l-05. When integrity protection is set to a PDCP SDU (SDAP header and IP packet) received from the upper SDAP layer device, the PDCP layer device may perform integrity protection before performing a ciphering procedure, apply integrity protection to the SDAP header, the PDCP header, and data (PDCP SDU), specifically calculate a MAC-I field value, configure a MAC-I field (e.g., 4 bytes) having a predetermined length, and attach the MAC-I field to the end of the data (1l-10). The PDCP layer device may perform ciphering on the MAC-I field and data except for the PDCP header and the SDAP header (1l-15). The PDCP layer device may concatenate the PDCP header and transmit the data to a lower layer; thus, the RLC layer device and the MAC layer device may perform data processing.

The integrity protection and verification procedure proposed in FIG. 1L may be applied together with the proposed first embodiment, second embodiment, third embodiment, fourth embodiment, fifth embodiment, sixth embodiment, seventh embodiment, eighth embodiment, ninth embodiment, tenth embodiment, or eleventh embodiment.

FIG. 1M is a diagram illustrating a proposed UE operation according to various embodiments of the disclosure.

In FIG. 1M, the UE may be set to apply a user data compression function by an RRC message such as 1e-10, 1e-40, or 1e-75 in FIG. 1E (1m-05). Further, when it is set to use the SDAP layer device or when it is set to use the SDAP header by the RRC message (1m-10), if the SDAP layer device is set or the SDAP header is set in the disclosure, the first embodiment, the second embodiment, the third embodiment, or the fourth embodiment of efficiently performing a user data compression method may be performed (1m-15). However, when it is not set to use the SDAP layer device or when it is not set to use the SDAP header in the RRC message (1m-10), if the SDAP layer device is set or the SDAP header is set in the disclosure, in the first embodiment, the second embodiment, the third embodiment, the fourth embodiment, the fifth embodiment, or the sixth embodiment of efficiently performing a user data compression method, the procedure except for data processing for the SDAP header may be performed as it is (1m-20).

In the disclosure, various cases that may occur because of the generation and ciphering of the SDAP header and the UDC and implementation methods according to the various cases were described and proposed.

In the above description, whether to use the SDAP header for each bearer may be set by the base station based on an RRC message, as described with reference to FIG. 1E. Whether to apply UDC for each bearer may also be set by the base station based on an RRC message, as described above.

In the following description of the disclosure, when the base station sets whether to use the SDAP header and whether to apply UDC for each bearer based on an RRC message, it is proposed that the SDAP header and UDC cannot be used simultaneously for one bearer (The SDAP header cannot be configured for a DRB configured with UDC or Both SDAP header and UDC cannot be configured for a DRB or Either SDAP header or UDC can be configured for a DRB, not both). For example, the base station may prohibit from simultaneously setting the use of the SDAP header and the application of UDC for one bearer based on an RRC message. As described above, when a UDC procedure is performed for a bearer in which UDC is set, because of generation and deciphering of the SDAP header, the UDC procedure is complicated and implementation complexity increases. The UDC is applied to uplink data, and when the SDAP header is set for uplink data, remapping between bearers and flows is set. This may not be a suitable case when using UDC. This is because in the UDC procedure, the transmitter and the receiver should be synchronized for data compression; thus, it is very inefficient to perform remapping between bearers and flows for the bearer to which UDC is applied. Therefore, in order to solve the above complexity, when use of the SDAP header and setup of the UDC are not simultaneously for one bearer, the above-described complex problems do not occur. Therefore, as another embodiment of the disclosure, it is proposed that the base station does not allow the UE to simultaneously set the use of the SDAP header and setup of the UDC for one bearer.

In the above description, when the base station does not simultaneously set the use of the SDAP header and setup of the UDC for one bearer to the UE, the UDC header may be ciphered for security enhancement. For example, when higher layer data is received, as a UDC procedure, data compression may be performed, a UDC header may be generated, then ciphering may be performed on the UDC header and the compressed UDC data block, a PDCP header may be generated and connected in front of the ciphered UDC header and the UDC data block, and the data may be delivered to a lower layer.

As another method, when the base station does not simultaneously set use of the SDAP header and setup of UDC for one bearer to the UE, the UE may quickly identify a checksum field of the UDC header to enable to quickly determine whether to discard UDC data, thereby reducing the number of deciphering procedures. For example, the UDC header may not be ciphered. In other words, when the transmitting PDCP layer device receives upper layer data, as a UDC procedure, the transmitting PDCP layer may perform data compression, cipher the compressed data block, generate a UDC header and a PDCP header, connect the UDC header and the PDCP header in front of the ciphered UDC data block, and deliver the data to the lower layer. Therefore, the receiving PDCP layer device may identify the UDC header before performing deciphering, identify the validity of the UDC with the checksum field, and when the UDC is not valid, the receiving PDCP layer device may immediately discard the received data without performing deciphering. The receiving PDCP layer device may perform deciphering only on data that has been verified as valid by the checksum field and perform a user data decompression procedure.

Further, when the integrity protection procedure is set for one bearer together with the use of an SDAP header or UDC application, a complicated implementation problem may occur. Therefore, it may not be allowed to simultaneously set the SDAP header use and integrity verification protection for one bearer. Further, it may not be allowed to simultaneously set integrity verification and UDC application for one bearer.

FIG. 1N illustrates a structure of a UE to which an embodiment of the disclosure may be applied.

With reference to FIG. 1N, the UE includes a radio frequency (RF) processor 1n-10, a baseband processor 1n-20, a storage 1n-30, and a controller 1n-40.

The RF processor 1n-10 performs a function for transmitting and receiving a signal through a wireless channel such as band conversion and amplification of a signal. For example, the RF processor 1n-10 up-converts a baseband signal provided from the baseband processor 1n-20 to an RF band signal, then transmits the RF band signal through an antenna, and down-converts the RF band signal received through the antenna to a baseband signal. For example, the RF processor 1n-10 may include a transmission filter, a reception filter, an amplifier, a mixer, an oscillator, a digital to analog convertor (DAC), an analog to digital convertor (ADC), and the like. In the drawing, only one antenna is illustrated, but the UE may include a plurality of antennas. Further, the RF processor 1n-10 may include a plurality of RF chains. Furthermore, the RF processor 1n-10 may perform beamforming. For the beamforming, the RF processor 1n-10 may adjust a phase and magnitude of each of signals transmitted and received through a plurality of antennas or antenna elements. Further, the RF processor may perform MIMO, and receive multiple layers when performing a MIMO operation. The RF processor 1n-10 may appropriately set a plurality of antennas or antenna elements under the control of the controller to perform reception beam sweeping, or adjust a direction and beam width of the reception beam so that the reception beam cooperates with the transmission beam.

The baseband processor 1n-20 performs a function of converting a baseband signal and a bit string according to a physical layer standard of a system. For example, when transmitting data, the baseband processor 1n-20 encodes and modulates a transmission bit string to generate complex symbols. Further, when receiving data, the baseband processor 1n-20 restores a received bit string through demodulation and deciphering of a baseband signal provided from the RF processor 1n-10. For example, in the case of the orthogonal frequency division multiplexing (OFDM) scheme, when transmitting data, the baseband processor 1n-20 encodes and modulates a transmission bit string to generate complex symbols, maps the complex symbols to subcarriers, and then configures OFDM symbols through an inverse fast Fourier transform (IFFT) operation and cyclic prefix (CP) insertion. Further, when receiving data, the baseband processor 1n-20 divides the baseband signal provided from the RF processor 1n-10 in units of OFDM symbols, restores the signals mapped to subcarriers through a fast Fourier transform (FFT) operation, and then restores the received bit string through demodulation and deciphering.

The baseband processor 1n-20 and the RF processor 1n-10 transmit and receive signals, as described above. Accordingly, the baseband processor 1n-20 and the RF processor 1n-10 may be referred to as a transmission unit, a reception unit, a transceiver, or a communicator. Furthermore, in order to support a plurality of different wireless access technologies, at least one of the baseband processor 1n-20 and the RF processor 1n-10 may include a plurality of communication modules. Further, in order to process signals of different frequency bands, at least one of the baseband processor 1n-20 and the RF processor 1n-10 may include different communication modules. For example, the different radio access technologies may include an LTE network, an NR network, and the like. Further, the different frequency bands may include a super high frequency (SHF) (e.g., 2.5 GHz, 5 GHz) band, and a millimeter wave (e.g., 60 GHz) band.

The storage 1n-30 stores data such as a basic program, an application program, and setup information for an operation of the UE. The storage 1n-30 provides stored data according to the request of the controller 1n-40.

The controller 1n-40 controls overall operations of the UE. For example, the controller 1n-40 transmits and receives signals through the baseband processor 1n-20 and the RF processor 1n-10. Further, the controller 1n-40 writes and reads data in the storage 1n-40. To this end, the controller 1n-40 may include at least one processor. For example, the controller 1n-40 may include a communication processor (CP) that controls communication and an application processor (AP) that controls an upper layer such as an application program.

FIG. 1O illustrates a block configuration of a TRP (base station) in a wireless communication system to which an embodiment of the disclosure may be applied.

As illustrated in FIG. 1O, the base station includes an RF processor 1o-10, a baseband processor 1o-20, a backhaul communicator 1o-30, a storage 1o-40, and a controller 1o-50.

The RF processor 1o-10 performs a function of transmitting and receiving a signal through a wireless channel such as band conversion and amplification of a signal. That is, the RF processor 1o-10 up-converts a baseband signal provided from the baseband processor 1o-20 to an RF band signal, then transmits the RF band signal through an antenna, and down-converts an RF band signal received through the antenna to a baseband signal. For example, the RF processor 1o-10 may include a transmission filter, a reception filter, an amplifier, a mixer, an oscillator, a DAC, an ADC, and the like. In FIG. 1O, only one antenna is illustrated, but a first access node may include a plurality of antennas. Further, the RF processor 1o-10 may include a plurality of RF chains. Furthermore, the RF processor 1o-10 may perform beamforming. For the beamforming, the RF processor 1o-10 may adjust a phase and magnitude of each of signals transmitted and received through a plurality of antennas or antenna elements. The RF processor unit may transmit one or more layers to perform a downlink MIMO operation.

The baseband processor 1o-20 performs a function of converting a baseband signal and a bit string according to a physical layer standard of first wireless access technology. For example, when transmitting data, the baseband processor 1o-20 encodes and modulates a transmission bit string to generate complex symbols. Further, when receiving data, the baseband processor 1o-20 restores a received bit string through demodulation and deciphering of the baseband signal provided from the RF processor 1o-10. For example, in the case of the OFDM scheme, when transmitting data, the baseband processor 1o-20 encodes and modulates a transmission bit string to generate complex symbols, map the complex symbols to subcarriers, and then configure OFDM symbols through an IFFT operation and CP insertion. Further, when receiving data, the baseband processor 1o-20 divides the baseband signal provided from the RF processor 1o-10 in units of OFDM symbols, restores signals mapped to subcarriers through an FFT operation, and restores the received bit string through demodulation and deciphering. The baseband processor 1o-20 and the RF processor 1o-10 transmit and receive signals, as described above. Accordingly, the baseband processor 1o-20 and the RF processor 1o-10 may be referred to as a transmission unit, a reception unit, a transceiver, a communicator, or a wireless communicator The communicator 1o-30 provides an interface for performing communication with other nodes in the network.

The storage 1o-40 stores data such as a basic program, an application program, and setup information for an operation of the main base station. In particular, the storage 1o-40 may store information on bearers allocated to the accessed UE, measurement results reported from the accessed UE, and the like. Further, the storage 1o-40 may store information to be a criterion for determining whether to provide or to stop multiple connections to the UE. The storage 1o-40 provides stored data according to the request of the controller 1o-50.

The controller 1o-50 controls overall operations of the main base station. For example, the controller 1o-50 transmits and receives signals through the baseband processor 1o-20 and the RF processor 1o-10 or through the backhaul communicator 1o-30. Further, the controller 1o-50 writes and reads data in the storage 1o-40. To this end, the controller 1o-50 may include at least one processor.

The disclosure proposes a method of enhancing security between wireless devices for each bearer in one-to-one communication or one-to-many communication between wireless devices.

Specifically, in a next-generation mobile communication system, a transmitter (e.g., base station) and a receiver (e.g., UE) perform a procedure of ciphering and deciphering data when exchanging data. When data is ciphered and deciphered, the PDCP layer device applies a ciphering and deciphering algorithm or an integrity protection and verification algorithm using a ciphering key (or security key). The ciphering key applied to the algorithm includes ciphering keys (e.g., KgNB, K_RRCenc, and the like) previously set by the UE and the base station, and ciphering keys (COUNT values) that change for each data. Because the COUNT value is configured with a PDCP sequence number and an HFN value, the transmitting PDCP layer device and the receiving PDCP layer device should have good synchronization of the PDCP sequence number. Because the PDCP sequence number starts from 0, increases to 2^(PDCP sequence number length)−1, increases the HFN value by 1, and returns again to 0, when the PDCP sequence number differs by one round or more, the COUNT value in which the transmitting PDCP layer device uses for ciphering or protecting integrity of data and the COUNT value in which the receiving PDCP layer device uses for deciphering data or verifying the integrity of data may be different, and in this case, a deciphering failure or an integrity verification failure occurs, and an HFN desynchronization problems occurs.

The above deciphering failure, integrity verification failure, and HFN asynchronous problems may occur because of mass loss of data or unintended reception of data by a hacker. Therefore, if necessary, for example, when a deciphering failure or an integrity verification failure occurs, when an HFN asynchronous problem is suspected, or when a hacker intrusion is suspected, it is necessary to identify whether COUNT values of the transmitting PDCP layer device and the receiving PDCP layer device are well synchronized or whether the security keys are the same.

Accordingly, the disclosure proposes methods for identifying whether COUNT values of the transmitting PDCP layer device and the receiving PDCP layer device are well synchronized or whether security identifiers or security key values are the same for each bearer.

Figure 2A:
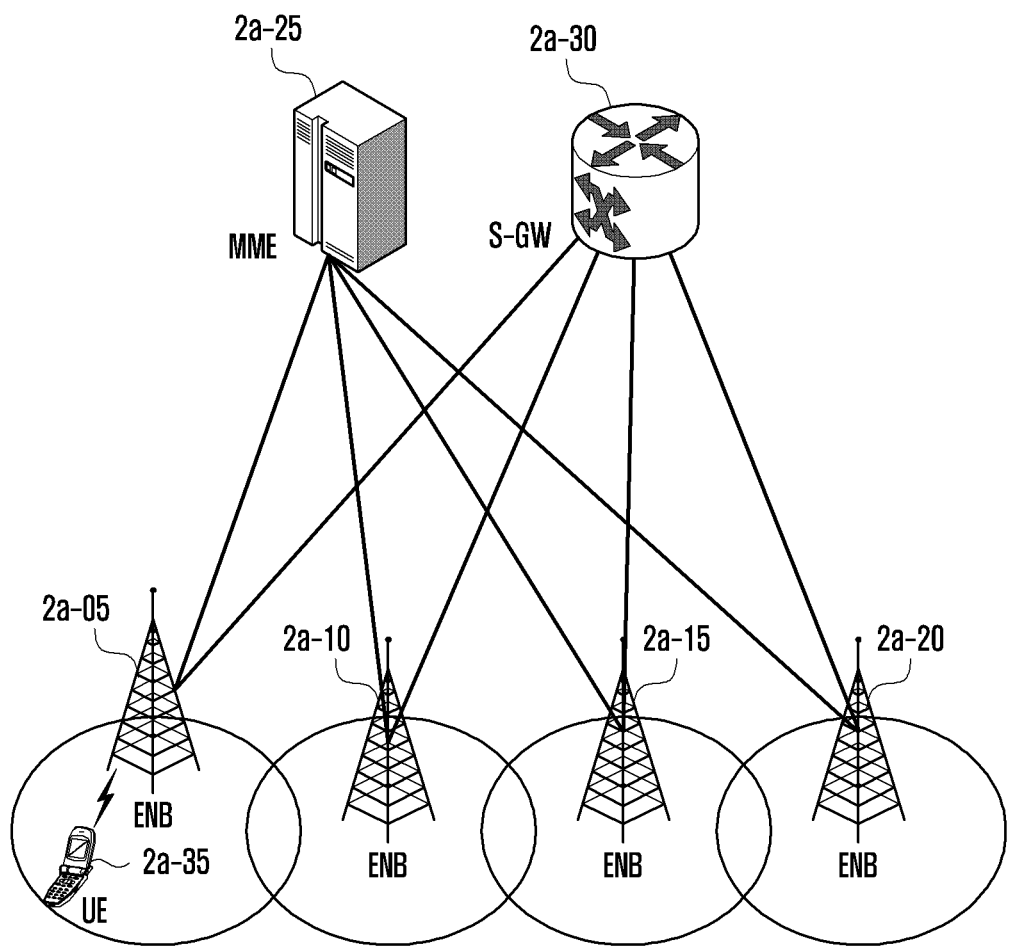
FIG. 2A is a diagram illustrating a structure of an LTE system to which the disclosure may be applied.

FIG. 2A is a diagram illustrating a structure of an LTE system to which the disclosure may be applied.

With reference to FIG. 2A, as illustrated, a radio access network of the LTE system is configured with evolved nodes B (hereinafter, ENB, node B, or base station) 2a-05, 2a-10, 2a-15, and 2a-20, a mobility management entity (MME) 2a-25, and a serving-gateway (S-GW) 2a-30. A user equipment (UE or terminal) 2a-35 accesses an external network through the ENBs 2a-05 to 2a-20 and the S-GW 2a-30.

In FIG. 2A, the ENBs 2a-05 to 2a-20 correspond to an existing node B of an UMTS system. The ENB is connected to the UEs 2a-35 through a radio channel and performs a more complex role than that of the existing node B. In the LTE system, because all user traffic including real-time services such as a voice over IP (VoIP) through an Internet protocol are serviced through a shared channel, a device that collects and schedules status information such as a buffer status, available transmission power status, and channel status of UEs is required, and the ENBs 2a-05 to 2a-20 are in charge of this. One ENB generally controls multiple cells. For example, in order to implement a transmission rate of 100 Mbps, the LTE system uses, for example, an orthogonal frequency division multiplexing (hereinafter, referred to as OFDM) in a 20 MHz bandwidth as radio access technology. Further, an adaptive modulation and coding method (hereinafter, referred to as AMC) is applied to determine a modulation scheme and a channel coding rate according to the channel status of the UE. The S-GW 2a-30 is a device that provides a data bearer, and generates or removes a data bearer under the control of the MME 2a-25. The MME is a device in charge of various control functions as well as mobility management functions for a UE, and is connected to a number of base station s.

Figure 2B:
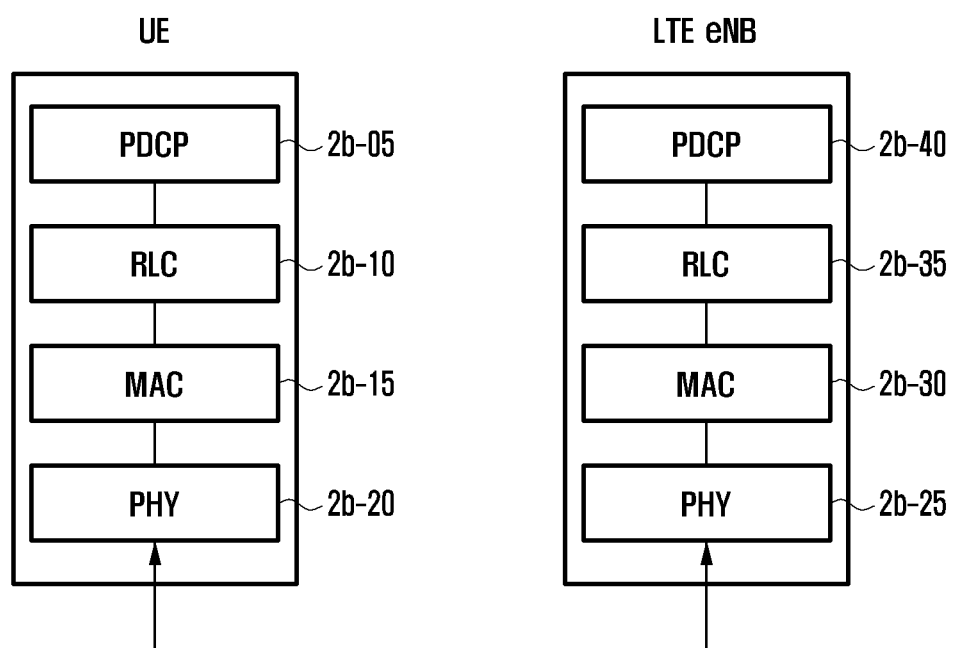
FIG. 2B is a diagram illustrating a radio protocol structure in an LTE system to which the disclosure may be applied.

FIG. 2B is a diagram illustrating a radio protocol structure in an LTE system to which the disclosure may be applied.

With reference to FIG. 2B, a radio protocol of the LTE system is configured with packet data convergence protocols (PDCPs) 2b-05 and 2b-40, radio link controls (RLC) 2b-10 and 2b-35, and medium access controls (MAC) 2b-15 and 2b-30 at the UE and the ENB, respectively. The PDCPs 2b-05 and 2b-40 are in charge of operations such as IP header compression/restoration. Main functions of the PDCP are summarized as follows.

Header compression and decompression (ROHC only)
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The radio link controls (hereinafter, referred to as RLC) 2b-10 and 2b-35 performs an ARQ operation by reconfiguring a PDCP protocol data unit (PDU) in an appropriate size. Main functions of RLC are summarized as follows.

Transfer of upper layer PDUs
Error correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)

Duplicate detection (only for UM and AM data transfer)
Protocol error detection (only for AM data transfer)
RLC SDU discard (only for UM and AM data transfer)
RLC re-establishment The MACs 2b-15 and 2b-30 are connected to several RLC layer devices configured in one UE, and perform an operation of multiplexing RLC PDUs to MAC PDUs and demultiplexing RLC PDUs from MAC PDUs. Main functions of MAC are summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding Physical layers 2b-20 and 2b-25 perform an operation of channel-coding and modulating upper layer data, converting the upper layer data into OFDM symbols, and transmitting the OFDM symbols to the radio channel, or demodulating OFDM symbols received through the radio channel, decoding the channel, and delivering the OFDM symbols to the upper layer.

Figure 2C:
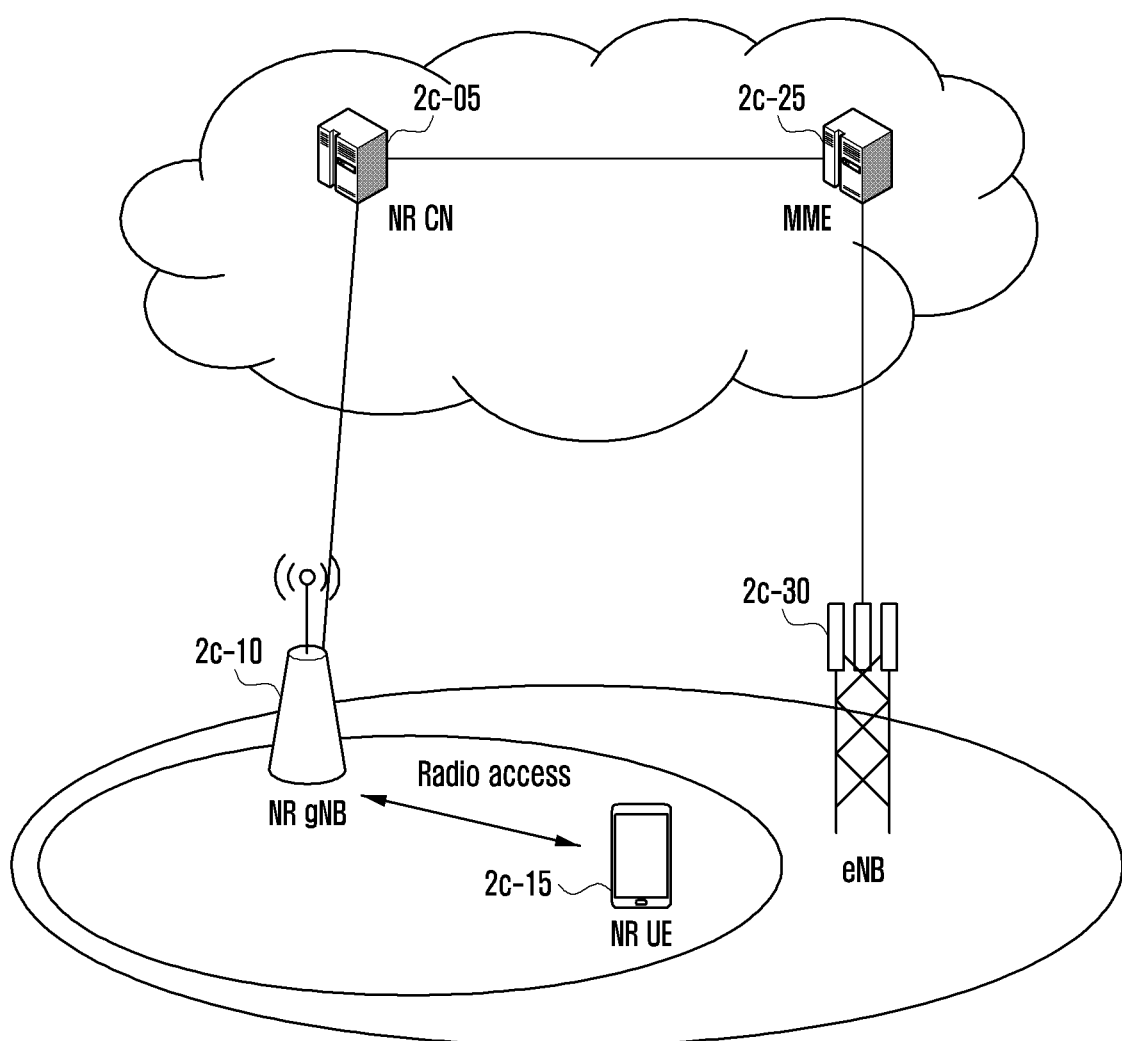
FIG. 2C is a diagram illustrating a structure of the next-generation mobile communication system to which the disclosure may be applied.

FIG. 2C is a diagram illustrating a structure of a next-generation mobile communication system to which the disclosure may be applied.

With reference to FIG. 2C, as illustrated, a radio access network of the next-generation mobile communication system (hereinafter, NR or 5g) is configured with a new radio node B (hereinafter, NR gNB or NR base station) 2c-10 and a new radio core network (NR CN) 2c-05. A new radio user equipment (hereinafter, NR UE or terminal) 2c-15 accesses an external network through the NR gNB 2c-10 and the NR CN 2c-05.

In FIG. 2C, the NR gNB 2c-10 corresponds to an evolved node B (eNB) of an existing LTE system. The NR gNB is connected to an NR UE 2c-15 through a radio channel and may provide a service superior to that of the existing node B. In the next-generation mobile communication system, because all user traffic is serviced through a shared channel, a device that collects and schedules status information such as a buffer status, available transmission power status, and channel status of UEs is required, and the NR gNB 2c-10 is in charge of this. One NR gNB generally controls multiple cells. In order to implement ultra-high speed data transmission compared to the current LTE, it may have the existing maximum bandwidth or more, and an orthogonal frequency division multiplexing (hereinafter, referred to as OFDM) may be used as radio access technology, and additional beamforming technology may be applied thereto. Further, an adaptive modulation and coding (hereinafter, referred to as AMC) method is applied to determine a modulation scheme and a channel coding rate according to a channel status of the UE. The NR CN 2c-05 performs functions such as mobility support, bearer setup, and QoS setup. The NR CN is a device in charge of various control functions as well as a mobility management function for the UE, and is connected to a plurality of base stations. Further, the next-generation mobile communication system may be interworked with the existing LTE system, and the NR CN is connected to an MME 2c-25 through a network interface. The MME is connected to an eNB 2c-30, which is the existing base station.

Figure 2D:
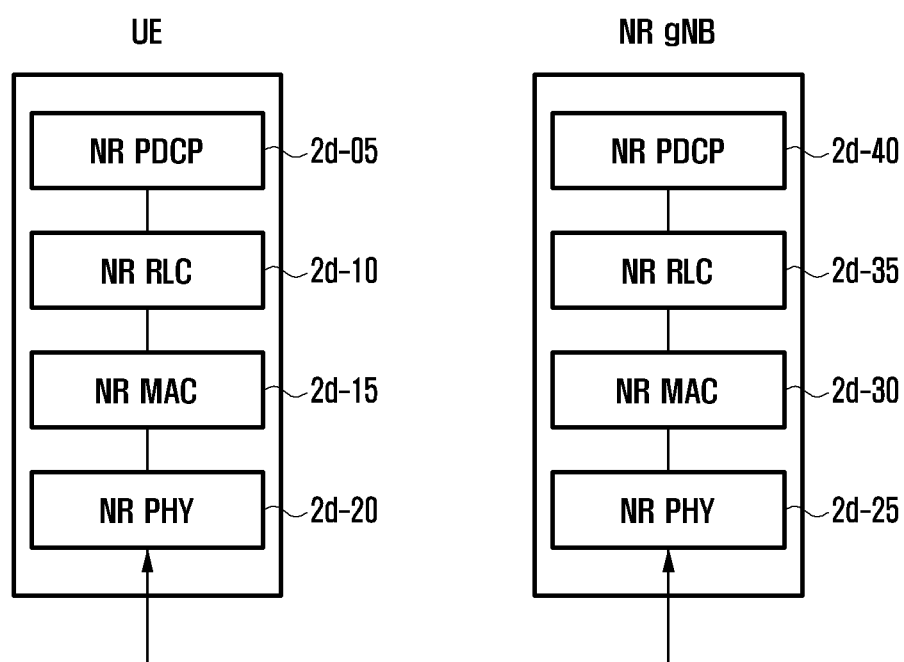
FIG. 2D is a diagram illustrating a radio protocol structure of the next-generation mobile communication system to which the disclosure may be applied.

FIG. 2D is a diagram illustrating a radio protocol structure of a next-generation mobile communication system to which the disclosure may be applied.

With reference to FIG. 2D, a radio protocol of the next-generation mobile communication system is configured with NR service data adaptation protocols (SDAPs) 2d-01 and 2d-45, NR PDCPs 2d-05 and 2d-40, NR RLCs 2d-10 and 2d-35, and NR MACs 2d-15 and 2d-30 in the UE and the NR base station, respectively.

Main functions of the NR SDAPs 2d-01 and 2d-45 may include some of the following functions.

Transfer of user plane data
Mapping between a QoS flow and a DRB for both DL and UL
Marking QoS flow ID in both DL and UL packets
Reflective QoS flow to DRB mapping for the UL SDAP PDUs.

For the SDAP layer device, the UE may receive setup on whether to use a header of the SDAP layer device or a function of the SDAP layer device for each PDCP layer device, for each bearer, or for each logical channel based on an RRC message, and when the SDAP header is set, the UE may instruct to update or reset a QoS flow of the uplink and downlink and mapping information on data bearer with NAS QoS reflection setup 1-bit indicator (NAS reflective QoS) and AS QoS reflection setup 1-bit indicator (AS reflective QoS) of the SDAP header. The SDAP header may include QoS flow ID information representing QoS. The QoS information may be used as a data processing priority, scheduling information, and the like to support a smooth service.

Main functions of the NR PDCPs 2d-05 and 2d-40 may include some of the following functions.

Header compression and decompression (ROHC only)
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink.

In the above description, a reordering function of the NR PDCP device refers to a function of reordering PDCP PDUs received from the lower layer based on the PDCP sequence number (SN), and may include a function of delivering data to the upper layer in the reordered order, or may include a function of immediately delivering without considering the order, a function of recording lost PDCP PDUs by reordering, a function of reporting a status of lost PDCP PDUs to the transmission side, and a function of requesting retransmission of lost PDCP PDUs.

Main functions of the NR RLCs 2d-10 and 2d-35 may include some of the following functions.

Transfer of upper layer PDUs
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection Protocol error detection
RLC SDU discard
RLC re-establishment In the above description, in-sequence delivery of the NR RLC device refers to a function of delivering RLC SDUs received from the lower layer in order to an upper layer, and when one RLC SDU is originally divided into several RLC SDUs and received, the in-sequence delivery may include a function of reassembling and delivering the several RLC SDUs, a function of rearranging the received RLC PDUs based on an RLC sequence number (SN) or PDCP SN, a function of reordering and recording lost RLC PDUs, a function of reporting a status of lost RLC PDUs to the transmitting side, and a function of requesting retransmission of lost RLC PDUs, and when there is a lost RLC SDU, the in-sequence delivery may include a function of delivering only RLC SDUs before the lost RLC SDU in order to the upper layer, or even if there is a lost RLC SDU, when a predetermined timer expires, the in-sequence delivery may include a function of delivering all RLC SDUs received before the start of the timer in order to the upper layer, or even if there is a lost RLC SDU, when a predetermined timer expires, the in-sequence delivery may include a function of delivering all RLC SDUs received so far in order to the upper layer. Further, RLC PDUs may be processed in order of reception (sequence number, regardless of the order of sequence number, and the order of arrival) and be delivered to the PDCP device out-of sequence delivery, and in the case of a segment, segments may be stored in a buffer or segments be received later may be received, reconfigured into one complete RLC PDU, processed, and delivered to the PDCP device. The NR RLC layer may not include a concatenation function, and the function may be performed in the NR MAC layer or may be replaced with a multiplexing function of the NR MAC layer.

In the above description, out-of-sequence delivery of the NR RLC device refers to a function of directly delivering RLC SDUs received from a lower layer to an upper layer regardless of the order, and when one RLC SDU is originally divided and received into several RLC SDUs, the out-of-sequence delivery function may include a function of reassembling and transmitting the RLC SDUs, and a function of storing an RLC SN or PDCP SN of the received RLC PDUs, sorting the order, and recording the lost RLC PDUs.

The NR MACs 2*d*-15 and 2*d*-30 may be connected to several NR RLC layer devices configured in one UE, and main functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 2*d*-20 and 2*d*-25 perform an operation of channel-coding and modulating upper layer data, converting the upper layer data into OFDM symbols, and transmitting the OFDM symbols to the radio channel, or demodulating and channel-decoding OFDM symbols received through the radio channel to transfer the OFDM symbols to the upper layer.

Figure 2E:
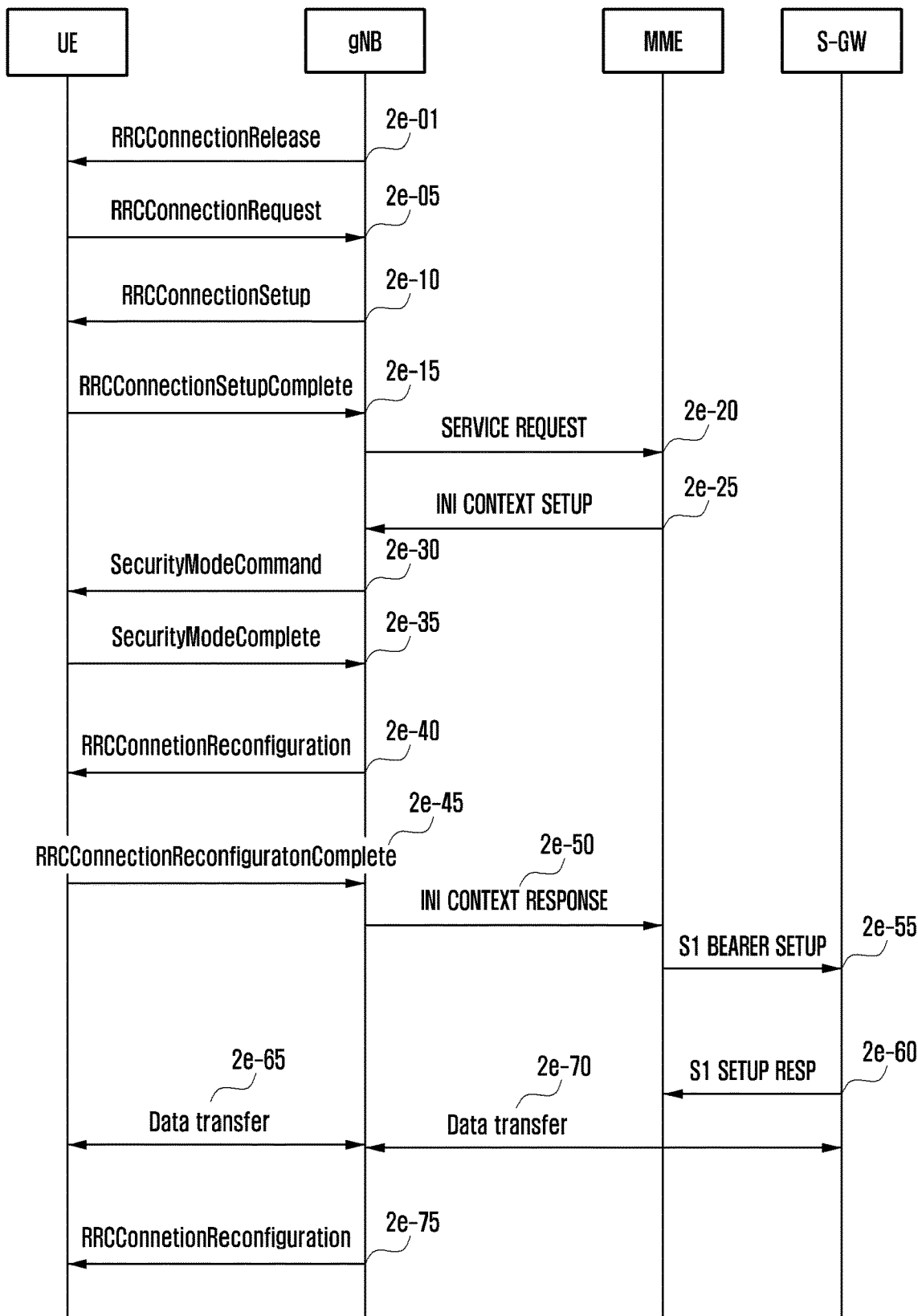
FIG. 2E is a diagram illustrating a procedure in which when a base station disconnects a UE, the UE switches from an RRC connected mode to RRC idle mode, and a procedure in which the UE sets connection with the base station to switch from an RRC idle mode to an RRC connected mode in the disclosure.

FIG. 2E is a diagram illustrating a procedure in which when the base station disconnects connection of the UE, the UE switches from an RRC connected mode to an RRC idle mode and in which the UE sets connection with the base station to convert the RRC idle mode to the RRC connected mode in the disclosure.

In FIG. 2E, when the UE transmitting and receiving data in the RRC connected mode does not transmit or receive data for a predetermined reason or for a predetermined time, the base station may send an RRCConnectionRelease message to the UE to switch the UE to the RRC idle mode (2*e*-01). In the future, when data to transmit occurs, the UE (hereinafter, idle mode UE) to which the connection is not currently set performs an RRC connection establishment process with the base station. The UE establishes reverse direction transmission synchronization with the base station through a random access process and transmits an RRCConnectionRequest message to the base station (2*e*-05). In the message, an identifier of the UE and the reason for setting connection (establishmentCause) are included. The base station transmits an RRCConnectionSetup message so that the UE sets an RRC connection (2*e*-10).

RRC connection setup information and the like are included in the RRCConnectionSetup message. Further, the RRC Connection Setup message may allocate a UE identifier that may be distinguished within the base station to an accessed UE. Further, it is possible to send a list of other UE identifiers currently connected to the base station. A list of other UE identifiers currently connected to the base station may be periodically updated, and in order to identify the identifiers of UEs capable of communicating by UEs in coverage supported by the base station, the base station may broadcast system information. Alternatively, when wireless devices are installed in a factory, identifiers of other wireless devices capable of communicating with the wireless device may be preset. The UE identifier may use a C-RNTI, a part of the C-RNTI, or a part of a unique identifier (e.g., GUTI) allocated in the NAS layer. Further, the message may include an indicator indicating whether a function capable of identifying security keys (e.g., COUNT value, security identifier, or security key value) has been set in the PDCP layer device for each bearer between the transmitter and the receiver.

RRC connection is referred to as signaling radio bearer (SRB) and is used for transmitting and receiving an RRC message, which is a control message between the UE and the base station. The UE that has set the RRC connection transmits RRCConnetionSetupComplete message to the base station (2*e*-15). The message includes a control message called service request in which the UE requests the MME to set up a bearer for a predetermined service. The base station transmits a service request message received in the RRCConnetionSetupComplete message to the MME (2*e*-20), and the MME determines whether to provide a service requested by the UE. When it is determined to provide a service requested by the UE, the MME transmits an initial context setup request message to the base station (2*e*-25). The message includes information such as quality of service (QoS) information to be applied when setting up a data radio bearer (DRB), and security related information to be applied to the DRB (e.g., security key, security algorithm). The base station exchanges SecurityModeCommand message (2*e*-30) and SecurityModeComplete message (2*e*-35) with the UE so as to set security with the UE. When the security setup is completed, the base station transmits RRCConnectionReconfiguration message to the UE (2*e*-40).

Further, in the RRCConnectionReconfiguration message, a UE identifier that may be distinguished within the base station may be allocated to an accessed UE. Further, it is possible to send a list of other UE identifiers currently accessed to the base station. The list of other UE identifiers currently accessed to the base station may be periodically updated, and in order to identify identifiers of UEs capable of communicating by UEs in coverage supported by the base station, the base station may broadcast system information. Alternatively, when wireless devices are installed in a factory, identifiers of other wireless devices capable of communicating with the wireless device may be preset. The UE identifier may use a C-RNTI, a part of the C-RNTI, or a part of a unique identifier (e.g., GUTI) allocated in an NAS layer. Further, the message may include an indicator indicating whether a function capable of identifying security keys (e.g., COUNT value, security identifier, or security key value) has been set in the PDCP layer device for each bearer between the transmitter and the receiver.

The message includes setup information of a DRB to which user data is to be processed, and the UE applies the information to set the DRB and transmits an RRCConnectionReconfigurationComplete message to the base station (2e-45). The base station that has completed DRB setup with the UE transmits an initial context setup complete message to the MME (2e-50), and the MME that has received the message exchanges an S1 BEARER SETUP message and an S1 BEARER SETUP RESPONSE message so as to set up S1 bearer with the S-GW (2e-055, 2e-60). The S1 bearer is a data transmission connection set between the S-GW and the base station and corresponds to the DRB on a one-to-one basis. When all of the above processes are completed, the UE transmits and receives data to and from the base station through the S-GW (2e-65, 2e-70). In this way, a general data transmission process is largely configured with three steps of RRC connection setup, security setup, and DRB setup. Further, in order to newly establish, add, or change setup to the UE for a predetermined reason, the base station may transmit an RRCConnectionReconfiguration message to the UE (2e-75).

In the following description of the disclosure, a procedure for one-to-one wireless connection setup or one-to-many wireless connection setup that enables to have low transmission delay when performing data transmission between wireless devices is proposed.

Figure 2F:
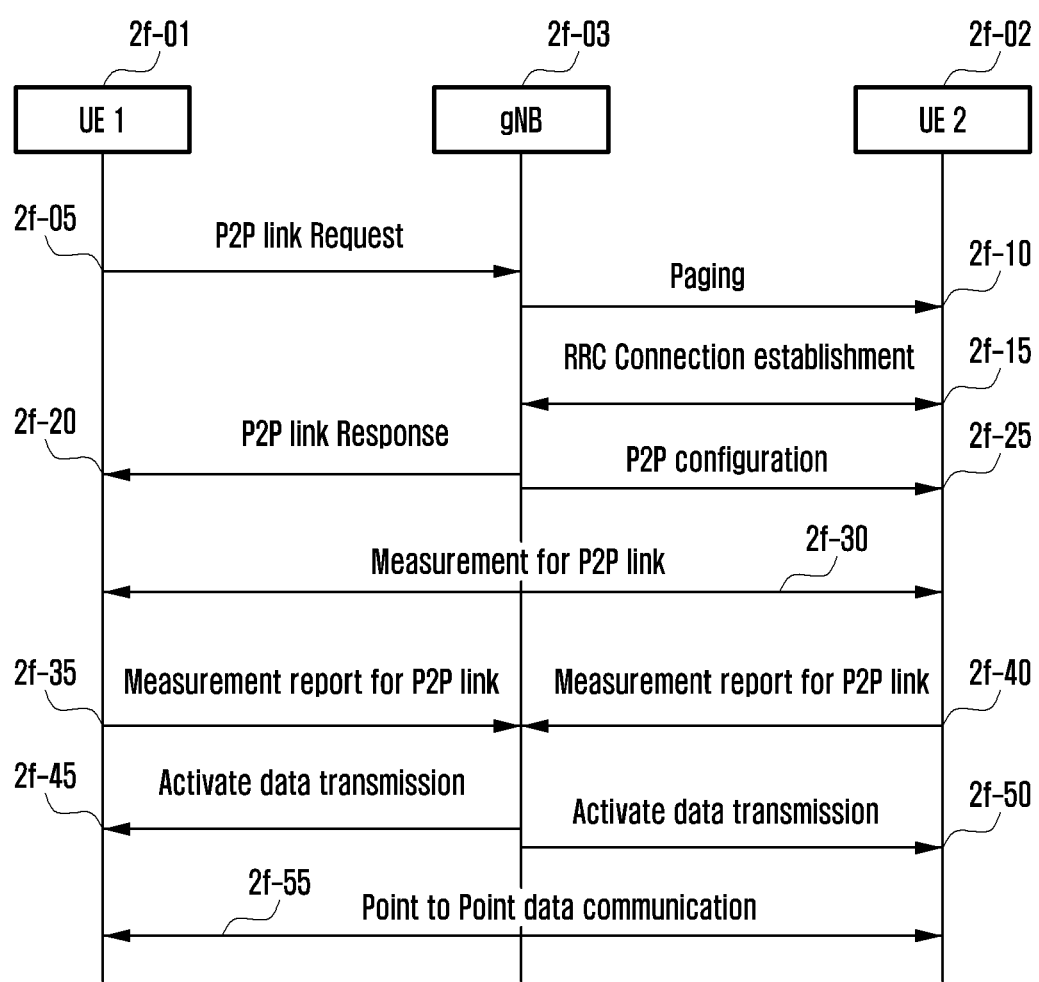
FIG. 2F illustrates a procedure for setting a one-to-one wireless link between wireless devices and enabling data transmission and reception according to various embodiments of the disclosure.

FIG. 2F illustrates a procedure for setting a one-to-one wireless link between wireless devices and enabling data transmission and reception according to various embodiments of the disclosure. The one-to-one wireless link refers to directly transmitting and receiving data without going through a base station when transmitting and receiving data between wireless devices.

A procedure for setting point-to-point communication between wireless devices proposed in the disclosure may be largely divided into steps of finding wireless devices, evaluating and measuring a one-to-one wireless link or a direct wireless link between wireless devices, establishing a direct wireless link between wireless devices, and transmitting data through a direct link between wireless devices, and have one or more of the following characteristics.

1. It is characterized that the base station may share and manage UE identifiers between wireless devices within coverage supporting wireless data transmission and reception.
2. It is characterized that wireless devices within coverage supporting wireless data transmission and reception by the base station may be set to always be in RRC connected mode or RRC inactive mode.
3. It is characterized that when the wireless device requests the base station to allocate transmission resources for one-to-one communication, the wireless device includes and transmits an identifier of the wireless device corresponding to a destination or an identifier of the wireless device corresponding to a source, and requests allocation of the transmission resource.
4. It is characterized that when receiving a request for allocation of transmission resources for one-to-one communication from the wireless device, the base station performs a procedure (e.g., paging message transmission) for finding a destination wireless device using an identifier of the destination wireless device. It is characterized that when the destination wireless device cannot be found or when the destination wireless device is not in coverage of the base station, the base station allocates uplink transmission resources to the source wireless device, and the base station transmits data in the middle.
5. It is characterized that the base station may allocate a part of the general uplink transmission resource of the UE to the transmission resource for one-to-one communication.
6. It is characterized that when the base station allocates transmission resources for one-to-one communication to wireless devices, the base station indicates an identifier of the source wireless device or an identifier of the destination wireless device, sets frequency setup information for the one-to-one wireless link, and indicates frequency measurement or sets and indicates to transmit a reference signal.
7. It is characterized that wireless devices to which transmission resources for one-to-one communication are allocated perform frequency measurements for one-to-one wireless links for one-to-one communication and report the frequency measurement result to the base station.
8. It is characterized that the base station may receive the frequency measurement result from the source wireless device and the destination wireless device, and instruct data transmission using a newly defined L1 signal (e.g., DCI) or L2 signal (e.g., MAC CE) to the source wireless device according to the frequency measurement result, and instruct data transmission using a newly defined L1 signal (e.g., DCI) or L2 signal (e.g., MAC CE) to the destination wireless device according to the frequency measurement result.
9. It is characterized that the wireless device starts data transmission when data transmission is instructed from the base station through a newly defined L1 signal (e.g., DCI) or L2 signal (e.g., MAC CE).

A specific procedure for setting a one-to-one wireless link (point to point communication) between wireless devices proposed in the disclosure is as follows.

A base station 2f-03 may share and manage UE identifiers of wireless devices within coverage supporting wireless data transmission and reception. In order to maintain low transmission delay, the base station may set wireless devices 2f-01 or 2f-02 within coverage supporting wireless data transmission and reception to always be in an RRC connected mode or an RRC inactive mode.

When the wireless device 2f-01 requests the base station to allocate transmission resources for one-to-one communication, the wireless device may include and transmit an identifier of the wireless device corresponding to the destination or an identifier of the wireless device corresponding to the source, and transmit a message that requests allocation of the transmission resource (2f-05). A message requesting transmission resources for one-to-one communication may include QoS requirements. For example, the message may include an average packet size, a transmission bit rate, a transmission delay requirement, reliability, an error rate, and the like to request to the base station.

When the base station receives a request for allocation of transmission resources for one-to-one communication from the wireless device, the base station may perform a procedure (e.g., transmission of a paging message) for finding a destination wireless device using an identifier of the destination wireless device 2*f*-02 (2*f*-10). When the destination wireless device cannot be found or is not in coverage of the base station, the base station may allocate uplink transmission resources to the source wireless device, receive data of the source wireless device, and transmit the data to the network to deliver the data in the middle. The paging message may include an identifier of the source wireless device or an identifier of the destination wireless device.

The destination wireless device that has received the paging message sets connection to the base station (2*f*-15). Therefore, the base station may send a one-to-one request response message to the source wireless device for one-to-one communication, and send a one-to-one configuration message to the destination wireless device for assignment (2*f*-20, 2*f*-25). The base station may allocate a part of a general uplink transmission resource of the UE to the transmission resource for one-to-one communication. Further, the allocated transmission resource may be a transmission resource continuously and repeatedly allocated with a predetermined period. Therefore, once set, the base station may continuously perform one-to-one communication between wireless devices using the transmission resource without additional intervention of the base station. Further, the transmission resource may not be individually allocated by the base station but may be broadcast from system information, and the base station may instruct a resource to use among resources broadcast from the system information. When both a transmission resource broadcasted from system information and a transmission resource individually allocated by the base station are given to the wireless device, the transmission resource individually allocated by the base station may be prioritized. Further, when the base station allocates transmission resources for one-to-one communication to wireless devices, the base station may indicate an identifier of the source wireless device or an identifier of the destination wireless device, set frequency setup information for a one-to-one wireless link, and instruct frequency measurement or set and instruct to transmit a reference signal.

Further, in the above description, transmission resources for one-to-one communication may include information such as a time resource, frequency resource, code resource, source wireless device identifier, or destination wireless device identifier, modulation or demodulation coding information (MCS), transport block size (TB size), and an identifier (e.g., RNTI) to activate the radio information.

The source wireless device and the destination wireless device to which transmission resources for one-to-one communication are allocated may transmit a reference signal with the transmission resource, perform frequency measurement on a one-to-one wireless link for mutual one-to-one communication (2*f*-30), and report the frequency measurement result to the base station (2*f*-35, 2*f*-40).

When the base station receives the frequency measurement result from the source wireless device and the destination wireless device, the base station may indicate data transmission using an L1 signal (e.g., DCI using an identifier) or an L2 signal (e.g., MAC CE) newly defined to the source wireless device according to the frequency measurement result (2*f*-45) and instruct data transmission using an L1 signal (e.g., DCI) or an L2 signal (e.g., MAC CE) newly defined to the destination wireless device according to the frequency measurement result (2*f*-50).

When the source wireless device or the destination wireless device is instructed to transmit data through an L1 signal (e.g., DCI using an identifier) or an L2 signal (e.g., MAC CE) newly defined by the base station, the source wireless device or the destination wireless device may start to transmit data using a transmission resource for one-to-one communication (2*f*-55).

In the above procedure, the source wireless device and the destination wireless device measure reliability of transmitted and received data or periodically measure a frequency with a reference signal of the direct wireless link, and when a set one-to-one wireless link is a predetermined or set predetermined level or lower, the source wireless device and the destination wireless device may request to update the one-to-one wireless link to the base station or may newly request an one-to-one wireless link as in 2*f*-05. When measuring reliability of transmitted and received data, the source wireless device and the destination wireless device may identify sequence numbers of data to identify the number, size, or amount of lost data, thereby directly evaluating a quality of the wireless link.

When the source wireless device or the destination wireless device requests the base station to update a one-to-one wireless link, the source wireless device or the destination wireless device may include and report the evaluated or experienced reliability, transmission delay, or an error rate of the currently set direct wireless link.

Figure 2G:
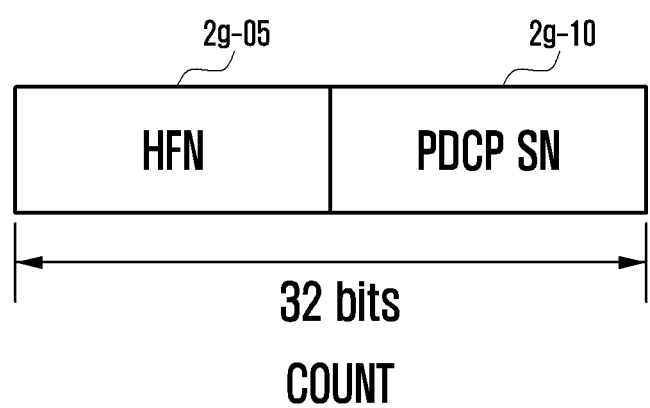
FIG. 2G is a diagram illustrating a structure of the COUNT value using in a next-generation mobile communication system according to various embodiments of the disclosure.

FIG. 2G is a diagram illustrating a structure of a COUNT value using in a next-generation mobile communication system according to various embodiments of the disclosure.

The PDCP layer device stores the COUNT value for ciphering and integrity protection between the UE and the base station and uses the COUNT value as a parameter of a preset ciphering and integrity protection algorithm when the PDCP packet is ciphered and integrity protected. A detailed operation thereof will be described in the following FIG. 2G.

All PDCP packets (data packets, control message packets) may have a PDCP sequence number and have a value increased by 1 from a previous value when generating the packet. In the case of exceeding the preset PDCP sequence number size, the PDCP SN is counted again from 0, and increases an HFN by 1. In this case, a case having the same PDCP sequence number as that of the previously sent PDCP packet may occur. When a hacker has a value for the previous PDCP sequence number and then attempts to hack using the corresponding value during communication between the UE and the base station, the PDCP sequence number continues to increase because of PDCP data transmitted by the hacker; thus, an HFN non-synchronization problem of the transmitter and the receiver may occur. Further, even if a hacker attack does not occur, when a large amount of data is lost, the above-described HFN non-synchronization problem may occur; thus, a deciphering failure of data received at the receiver may occur.

The COUNT value has a length of 32 bits, and is configured with a hyper frame number (HFN) 2*g*-05 and a PDCP sequence number 2*g*-10. The UE and the base station may hold the COUNT value and use the COUNT value for ciphering and integrity protection. Upon actual data transmission, only the PDCP sequence number is included in the PDCP packet (PDCP PDU). Therefore, because only the PDCP sequence number is transmitted in the wireless channel, it is difficult for a hacker to know an accurate COUNT value. When the base station sets PDCP setup information to the UE based on an RRC message, a length of the PDCP sequence number is set to 12 bits or 18 bits, and an HFN length of the COUNT value may be automatically determined to 32 bits-PDCP sequence number length according to a length of the PDCP sequence number.

Figure 2H:
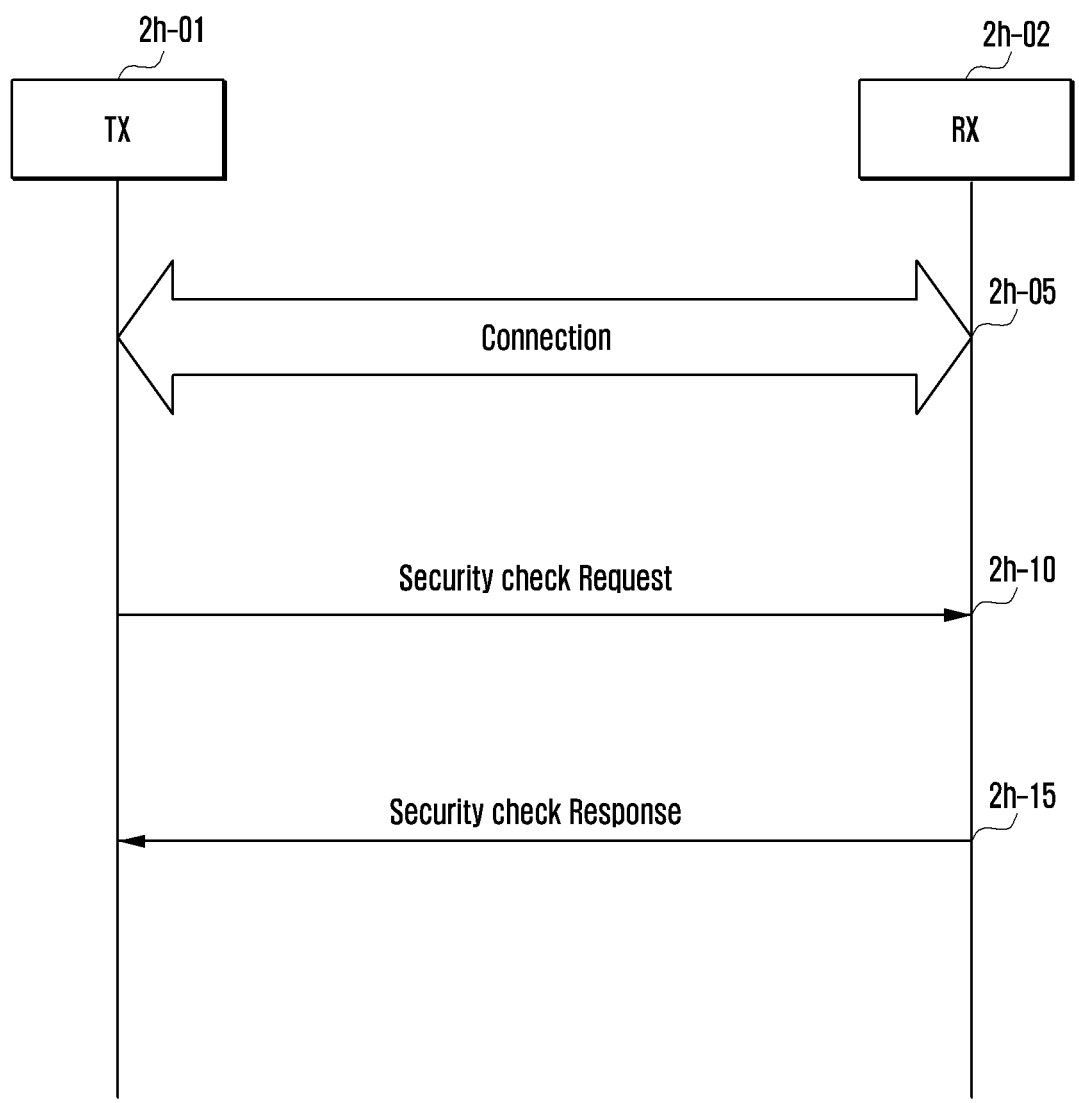
FIG. 2H is a diagram illustrating a security check procedure according to various embodiments of the disclosure.

FIG. 2H is a diagram illustrating a security check procedure according to various embodiments of the disclosure.

The security check procedure is a procedure for identifying security key values (security key, security identifier, or COUNT value) in order to solve the problem that a wireless link is exposed to security threats by receiving excessively many packets or changed packets by a hacker attack in a one-to-one or one-to-many wireless link between the transmitter and the receiver.

FIG. 2H illustrates an overall operation for the transmitter to identify security key values (e.g., COUNT value) of the UE, and through the proposed procedure, the transmitter may identify whether the COUNT value is valid for each set bearer or whether the COUNT value is synchronized.

First, a transmitter $2h$-$01$ and a receiver $2h$-$02$ may set a one-to-one or one-to-many wireless connection ($2h$-$05$). If necessary, for example, when an integrity verification failure or a deciphering failure occurs, when an HFN asynchronous problem is suspected, or when a hacker intrusion is suspected, in order to identify whether security key values (e.g., COUNT value) of the transmitting PDCP layer device and the receiving PDCP layer device is well synchronized, the transmitter may send a security check request message to the receiver to request a security check and report for each bearer to the receiver ($2h$-$10$).

After receiving the security check request message, the receiver may identify security key values (e.g., COUNT) for each bearer thereof, configure a security check response message, and transmit the security check response message to the transmitter ($2h$-$15$).

Upon receiving the security check response message, the transmitter may identify the security key values for each bearer to disconnect or reset the connection when HFN asynchronous problem is identified or when a hacker intrusion is identified FIG. 2I is a diagram illustrating a specific first embodiment of performing the security check procedure proposed in FIG. 2H in a data radio bearer (DRB).

A specific 1-1 embodiment of the transmitter and the receiver performing the security check procedure in the disclosure is as follows.

Transmitter: When an integrity verification failure or a deciphering failure occurs, when an HFN asynchronous problem is suspected, or when a hacker intrusion is suspected, in order to trigger the security check procedure, the transmitter may define a PDU type as in $2i$-$05$ to newly define and use a first PDCP control PDU. That is, the first PDCP control PDU may be used as a security check request message in FIG. 2H. The newly defined first PDCP control PDU may include and transmit security key values (e.g., security identifier, security key value, or COUNT value) using in the transmitter. For example, the transmitter may include and transmit the COUNT value corresponding to data having a highest PDCP sequence number among data sent so far from the transmitting PDCP layer device or the COUNT value corresponding to data having a highest PDCP sequence number among data received so far in the receiving PDCP layer device in the first PDCP control PDU. As another method, a new 1-bit T field is defined so that either the COUNT value of the transmitting PDCP layer device or the COUNT value of the receiving PDCP layer device may be separately transmitted to indicate whether it is the COUNT value of the transmitting PDCP layer device or the COUNT value of the receiving PDCP layer device. In the above description, in order to enhance security, when the COUNT value is transmitted from the first PDCP control PDU without transmitting the entire COUNT value, only some upper MSBs may be transmitted. For example, only the upper 20 bits or 25 bits of the 32-bit COUNT value may be sent. In order to enhance security, the first PDCP control PDU may perform ciphering or integrity protection.

Receiver: When the receiver receives a security check request message through the first PDCP control PDU, the receiver may compare a COUNT value of the transmitting PDCP layer device of the transmitter included in the first PDCP control PDU, the COUNT value of the receiving PDCP layer device of the transmitter, or some upper MSB values of the COUNT values with the COUNT value of the receiving PDCP layer device of the receiver, or the COUNT value of the transmitting PDCP layer device of the receiver, when the HFN asynchronous problem occurs or when a hacker intrusion is identified, the receiver may disconnect the connection to the transmitter or may reset the connection. In the above description, the receiver may compare the COUNT value of the transmitting PDCP layer device of the transmitter with the COUNT value corresponding to data having a highest PDCP sequence number among data received in the receiving PDCP layer device of the receiver. Further, the receiver may compare the COUNT value of the receiving PDCP layer device of the transmitter with the COUNT value corresponding to data having a highest PDCP sequence number among data transmitted from the transmitting PDCP layer device of the receiver. As another method, the receiver may define a PDU type, as illustrated in FIG. 2I-10 to newly define and use a second PDCP control PDU. The second PDCP control PDU may indicate to the transmitter that HFN asynchronous problem has occurred or that a hacker intrusion has been identified. As another method, a new 1-bit S field is defined to the second PDCP control PDU to indicate that an HFN asynchronous problem has occurred, that a hacker intrusion has been identified, or that there is no problem. As another method, when an HFN asynchronous problem occurs or a hacker intrusion is identified, the receiver defines the second PDCP control PDU as $2i$-$15$, and the receiver may include and transmit the COUNT value of the transmitting PDCP layer device of the receiver or the COUNT value of the receiving PDCP layer device of the receiver. As another method, a new 1-bit T field is defined so that one of the COUNT value of the transmitting PDCP layer device of the receiver or the COUNT value of the receiving PDCP layer device of the receiver may be separately transmitted to indicate whether it is the COUNT value of the transmitting PDCP layer device or the COUNT value of the receiving PDCP layer device. As another method, a new 1-bit S field is defined to the PDCP header of the PDCP data PDU as in $2i$-$20$ to indicate that an HFN asynchronous problem has occurred or that a hacker intrusion has been identified, or that there is no problem. The second PDCP control PDU may perform ciphering or integrity protection. In the above description, a second PDCP control PDU or a PDCP data PDU in which a PDCP header including a newly defined S field is concatenated may correspond to a security check response message of FIG. 2H.

A detailed 1-2 embodiment of the transmitter and the receiver performing a security check procedure in the disclosure is as follows.

Transmitter: When an integrity verification failure or a deciphering failure occurs, when an HFN asynchronous problem is suspected, or when a hacker intrusion is suspected, in order to trigger the security check procedure, the transmitter may define a PDU type as in 2*i*-10 to newly define and use a third PDCP control PDU or to define a new 1-bit S field to the third PDCP control PDU. Alternatively, a new 1-bit S field may be defined to the PDCP header of the PDCP data PDU as in 2*i*-20. That is, a third PDCP control PDU or a PDCP data PDU in which a PDCP header including a new 1-bit S field is concatenated may be used as a security check request message in FIG. 2H. The newly defined third PDCP control PDU may be transmitted from the transmitter and request information on security key values (e.g., security key value, COUNT value, or security identifier) to the receiver. In order to enhance security, the third PDCP control PDU may perform ciphering or integrity protection.

Receiver: When the receiver receives a security check request message through the third PDCP control PDU, the receiver defines a fourth PDCP control PDU as in 2*i*-15 and include and transmit security key values (e.g., security identifier, security key value, or COUNT value) using in the receiver. For example, the receiver may include and transmit a COUNT value corresponding to data having a highest PDCP sequence number among data transmitted so far from the transmitting PDCP layer device or a COUNT value corresponding to data having a highest PDCP sequence number among data received so far in the receiving PDCP layer device in the fourth PDCP control PDU. As another method, a new 1-bit T field is defined so that either the COUNT value of the transmitting PDCP layer device or the COUNT value of the receiving PDCP layer device may be separately transmitted to indicate whether it is the COUNT value of the transmitting PDCP layer device or the COUNT value of the receiving PDCP layer device. In the above description, for security enhancement, when the COUNT value is transmitted from a fourth PDCP control PDU without transmitting the entire COUNT value, only some upper MSBs may be transmitted. For example, only the upper 20 bits or 25 bits of the 32-bit COUNT value may be sent. In order to enhance security, the fourth PDCP control PDU may perform ciphering or integrity protection. In the above description, the fourth PDCP control PDU may correspond to the security check response message of FIG. 2H.

When the transmitter receives a security check response message through the fourth PDCP control PDU, the transmitter may compare the COUNT value of the transmitting PDCP layer device of the receiver included in the fourth PDCP control PDU, the COUNT value of the receiving PDCP layer of the receiver, or some upper MSB values of the COUNT values with the COUNT value of the receiving PDCP layer device of the transmitter or the COUNT value of the transmitting PDCP layer device of the transmitter, when an HFN asynchronous problem occurs or when a hacker intrusion is identified, the transmitter may disconnect the connection with the transmitter or may reset the connection. In the above description, the transmitter may compare the COUNT value of the transmitting PDCP layer device of the receiver with the COUNT value corresponding to data having a highest PDCP sequence number among data received in the receiving PDCP layer device of the transmitter. Further, the transmitter may compare the COUNT value of the receiving PDCP layer device of the receiver with the COUNT value corresponding to data having a highest PDCP sequence number among data transmitted from the transmitting PDCP layer device of the transmitter.

FIGS. 2JA and 2JB are diagrams illustrating a specific second embodiment of performing the security check procedure proposed in FIG. 2H in a sidelink radio bearer (SLRB).

A specific 2-1 embodiment of the transmitter and the receiver performing the security check procedure in the disclosure is as follows.

Transmitter: When an integrity verification failure or a deciphering failure occurs, when an HFN asynchronous problem is suspected, or when a hacker intrusion is suspected, in order to trigger a security check procedure, the transmitter may define a SDU type as in 2*j*-05 to newly define and use a first PDCP SDU. That is, the first PDCP SDU may be used as a security check request message in FIG. 2H. The newly defined first PDCP SDU may include and transmit security key values (e.g., security identifier, security key value, or COUNT value) using in the transmitter. For example, the transmitter may include and transmit a COUNT value corresponding to data having a highest PDCP sequence number among data sent so far from the transmitting PDCP layer device or a COUNT value corresponding to data having a highest PDCP sequence number among data received so far in the receiving PDCP layer device in the first PDCP SDU. As another method, a new 1-bit T field is defined so that either the COUNT value of the transmitting PDCP layer device or the COUNT value of the receiving PDCP layer device may be separately transmitted to indicate whether it is the COUNT value of the transmitting PDCP layer device or the COUNT value of the receiving PDCP layer device. In the above description, in order to enhance security, when the COUNT value is transmitted from the first PDCP SDU without transmitting the entire COUNT value, only some upper MSBs may be transmitted. For example, only upper 20 bits or 25 bits of the 32-bit COUNT value may be sent. In order to enhance security, the first PDCP SDU may perform ciphering or integrity protection. Further, the security identifier value may be omitted in the first PDCP SDU.

Receiver: When the receiver receives a security check request message through the first PDCP SDU, the receiver compares a COUNT value of the transmitting PDCP layer device of the transmitter included in the first PDCP SDU, a COUNT value of the receiving PDCP layer device of the transmitter, upper MSB values of the COUNT values with the COUNT value of the receiving PDCP layer device of the receiver, or a COUNT value of the transmitting PDCP layer device of the receiver, when an HFN asynchronous problem occurs or when a hacker intrusion is identified, the receiver may disconnect the connection to the transmitter or may reset the connection. In the above description, the receiver may compare the COUNT value of the transmitting PDCP layer device of the transmitter with a COUNT value corresponding to data having a highest PDCP sequence number among data received in the receiving PDCP layer device of the receiver. Further, the receiver may compare a COUNT value of the receiving PDCP layer device of the transmitter with a COUNT value corresponding to data having a highest PDCP sequence number among data transmitted from the transmitting PDCP layer device of the receiver. As another method, the receiver may define an SDU type as illustrated in FIG. 2J-10 to newly define and use a second PDCP SDU. The second PDCP SDU may indicate to the transmitter that an HFN asynchronous problem has occurred or that a hacker intrusion has been identified. As another method, a new 1-bit S field is defined to the second PDCP SDU to indicate that an HFN asynchronous problem has occurred or a hacker intrusion has been identified, or that there is no problem. As another method, when an HFN asynchronous problem occurs or when a hacker intrusion is identified, the receiver may define a second PDCP SDU as in 2j-15 and include and transmit a COUNT value of the transmitting PDCP layer device of the receiver or a COUNT value of the receiving PDCP layer device of the receiver. As another method, a new 1-bit T field is defined so that one of the COUNT value of the transmitting PDCP layer device of the receiver or the COUNT value of the receiving PDCP layer device of the receiver may be separately transmitted to indicate whether it is the COUNT value of the transmitting PDCP layer device or a COUNT value of the receiving PDCP layer device. As another method, a new 1-bit S field of the PDCP SDU that transmits data as in 2j-20 is defined to indicate that an HFN asynchronous problem has occurred or that a hacker intrusion has been identified, or that there is no problem. The second PDCP SDU may perform ciphering or integrity protection. In the above description, the second PDCP SDU or the PDCP SDU including the newly defined S field and including data may correspond to the security check response message of FIG. 2H. Further, the security identifier value may be omitted in the second PDCP SDU.

A detailed embodiment 1-2 of the transmitter and the receiver performing a security check procedure in the disclosure is as follows.

Transmitter: When an integrity verification failure or a deciphering failure occurs, when an HFN asynchronous problem is suspected, or when a hacker intrusion is suspected, in order to trigger the security check procedure, an SDU type is defined as in 2j-10, and a third PDCP SDU may be newly defined and used or a new 1-bit S field may be defined to the third PDCP SDU. Alternatively, a new 1-bit S field may be defined to the PDCP SDU including data as in 2j-20. That is, a third PDCP SDU or a PDCP SDU including a new 1-bit S field may be used as a security check request message, as illustrated in FIG. 2H. The newly defined third PDCP SDU is transmitted from the transmitter and may request information on security key values (e.g., security key value, COUNT value, or security identifier) to the receiver. In the above description, in order to enhance security, the third PDCP SDU may perform ciphering or integrity protection. Further, the security identifier value may be omitted in the third PDCP SDU.

Receiver: When the receiver receives a security check request message through the third PDCP SDU, the receiver may define a fourth PDCP SDU as in 2j-15 and include and transmit security key values (e.g., security identifier, security key value, or COUNT value) used in the receiver. For example, the receiver may include and transmit the COUNT value corresponding to data having a highest PDCP sequence number among data transmitted so far from the transmitting PDCP layer device or a COUNT value corresponding to data having a highest PDCP sequence number among data received so far in the receiving PDCP layer device in the fourth PDCP SDU. As another method, a new 1-bit T field is defined so that either a COUNT value of the transmitting PDCP layer device or a COUNT value of the receiving PDCP layer device may be separately transmitted to indicate whether it is the COUNT value of the transmitting PDCP layer device or the COUNT value of the receiving PDCP layer device. In the above description, in order to enhance security, when the COUNT value is transmitted from the fourth PDCP SDU without transmitting the entire COUNT value, only some upper MSBs may be transmitted. For example, only upper 20 bits or 25 bits of the 32-bit COUNT value may be sent. In the above description, in order to enhance security, the fourth PDCP SDU may perform ciphering or integrity protection. The fourth PDCP SDU may correspond to the security check response message of FIG. 2H. Further, the security identifier value may be omitted in the fourth PDCP SDU.

When the transmitter receives a security check response message through the fourth PDCP SDU, the transmitter compares a COUNT value of the transmitting PDCP layer device of the receiver included in the fourth PDCP SDU, the COUNT value of the receiving PDCP layer device of the receiver, or upper some MSB values of the COUNT values with the COUNT value of the receiving PDCP layer device of the transmitter or the COUNT value of the transmitting PDCP layer device of the transmitter, when an HFN asynchronous problem occurs or when a hacker intrusion is identified, the transmitter may disconnect the connection to the receiver or may reset the connection. In the above description, the transmitter may compare the COUNT value of the transmitting PDCP layer device of the receiver with the COUNT value corresponding to data having a highest PDCP sequence number among data received in the receiving PDCP layer device of the transmitter. Further, the transmitter may compare the COUNT value of the receiving PDCP layer device of the receiver with the COUNT value corresponding to data having a highest PDCP sequence number among data transmitted from the transmitting PDCP layer device of the transmitter.

Figure 2K:
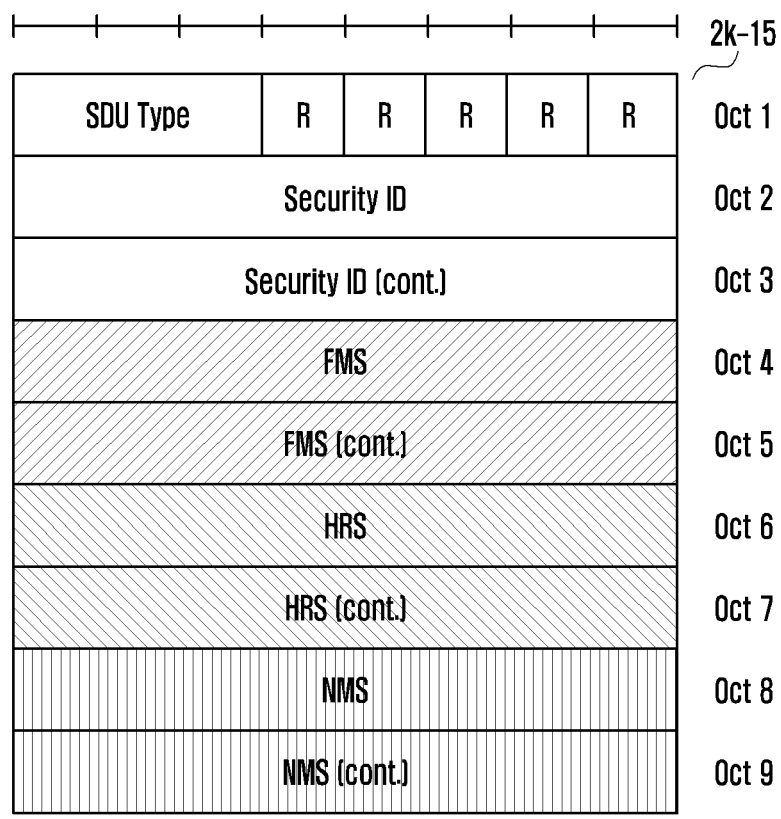
FIGS. 2KA and 2KB illustrate a method of identifying whether data is lost and checking a data transfer rate of a wireless link when a transmitter and a receiver perform wireless data communication through sidelink radio bearer (SLRB) according to various embodiments of the disclosure.

FIGS. 2KA and 2KB illustrate a method of identifying whether data is lost and checking a data transfer rate of a wireless link when the transmitter and the receiver perform wireless data communication through a sidelink radio bearer (SLRB) according to various embodiments of the disclosure.

In the disclosure, when the transmitter and the receiver perform wireless data communication through a sidelink radio bearer (SLRB), a specific third embodiment of a method capable of identifying whether data is lost and checking a data transfer rate of a wireless link is as follows.

Transmitter: When an integrity verification failure or a deciphering failure occurs, when an HFN asynchronous problem is suspected, when a hacker intrusion is suspected, or in order to identify a data transfer rate, or when there is data loss, in order to perform retransmission, by defining an SDU type as in 2j-10, a fifth PDCP SDU may be newly defined and used, or a new 1-bit P field may be defined to the fifth PDCP SDU. Alternatively, a new 1-bit P field may be defined to the PDCP SDU including data as in 2k-05. The newly defined fifth PDCP SDU or the newly defined 1-bit P field is transmitted from the transmitter, and the transmitter may request information on whether the received data has been successfully received to the receiver. In order to enhance security, the fifth PDCP SDU may perform ciphering or integrity protection. Further, a security identifier value may be omitted in the fifth PDCP SDU.

Receiver: When the receiver receives a request on whether data received through the fifth PDCP SDU or a newly defined 1-bit P field has been successfully received, the receiver may define a 6th PDCP SDU as in 2k-10, sort PDCP sequence numbers or COUNT values of data received so far in the receiver in ascending order, identify the smallest PDCP sequence number or COUNT value among lost data or first lost data, include the PDCP sequence number or COUNT value in a new FMS (first missing SN or first missing COUNT) field in the sixth PDCP SDU, and configure and include a bitmap that may indicate successful reception with a 1-bit indicator in ascending order for PDCP sequence numbers or COUNT values greater than the FMS field value. As another method, the receiver may define a 7th PDCP SDU as in 2k-15, sort PDCP sequence numbers or COUNT values of data received so far in the receiver in ascending order, identify the smallest PDCP sequence number or COUNT value among lost data or first lost data, include the PDCP sequence number or COUNT value in a new FMS (first missing SN or first missing COUNT) field in the seventh PDCP SDU, and include a largest PDCP sequence number or COUNT value among data received so far in a new HRS (highest received SN or highest received COUNT) field in the 7th PDCP SDU. The receiver may include the number of data that have not been successfully received among data corresponding to the PDCP sequence number or COUNT value between an FMS field value indicating the smallest PDCP sequence number or COUNT value received so far and an HRS field value indicating the largest PDCP sequence number or COUNT value received so far in a new NMS (number of missing SN or number of missing COUNT) field in the seventh PDCP SDU. As described above, the receiver may configure a seventh PDCP SDU and transmit the seventh PDCP SDU to the transmitter to respond. In the above description, the security identifier value may be omitted in the sixth PDCP SDU or the seventh PDCP SDU. As another method, the receiver may define an eighth PDCP SDU to report only the number of lost data or the degree of data loss (e.g., loss rate, loss probability, or loss statistics).

When the transmitter receives the sixth PDCP SDU or the seventh PDCP SDU from the receiver, the transmitter may identify whether the transmitted data has been successfully received and retransmit lost data. Further, when the 7th PDCP SDU is received, the number of lost data compared to the number of transmitted data may be identified; thus, the 7th PDCP SDU may be used for calculating a data transfer rate or a data loss rate of a current radio link, or a radio link quality.

Embodiment 1-1, embodiment 1-2, embodiment 2-1, embodiment 2-2, or embodiment 3 of the disclosure may be defined and extended or applied in the SDAP layer device.

UDC described in the disclosure may be extended and applied in a sidelink bearer, and when UDC is applied to a data PDCP SDU such as 2j-20, the uplink data compression procedure is not applied to first 6 bytes (i.e., SDU header) of data, but is applied only to a rear part (i.e., upper layer data) thereof, and a UDC header is generated and concatenated and the data may be configured and transmitted in order of the SDU header, UDC header, and compressed data. As another method, when the uplink data compression procedure is applied to a data PDCP SDU such as 2j-20, the uplink data compression procedure is applied to both first 6 bytes (i.e., SDU header) and the rear part (higher layer data) of the data, and a UDC header is generated and concatenated; thus, data may be configured and transmitted in order of UDC header and compressed data. The receiver may perform data decompression in the reverse of the above procedure.

Figure 2L:
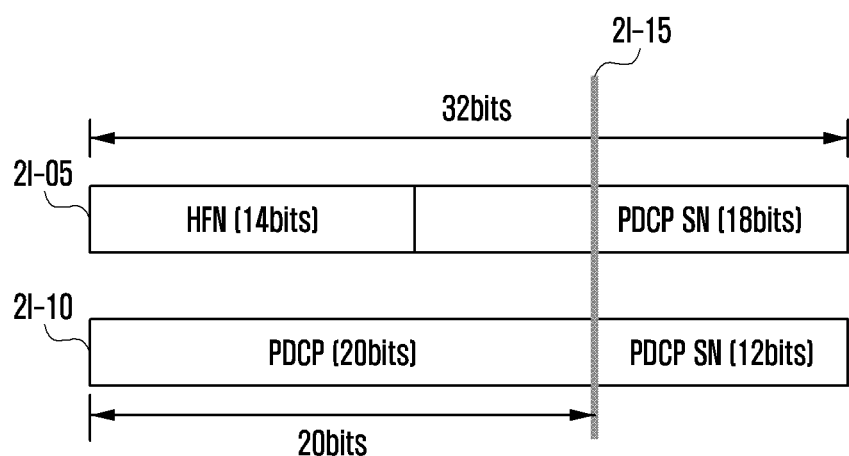
FIG. 2L illustrates a method of reducing a bit size of the COUNT value indicated by a transmitter or a receiver in a first embodiment or a second embodiment of a security check procedure proposed in the disclosure.

FIG. 2L illustrates a method of reducing a bit size of a COUNT value indicated by a transmitter or a receiver in the first embodiment or the second embodiment of a security check procedure proposed in the disclosure.

The security check procedure proposed in the disclosure is for identifying an HFN value of a COUNT value for each bearer. Accordingly, a size of an upper bit of a COUNT value indicated by the transmitter may be reduced according to a length of the PDCP sequence number that may be set. In a next-generation mobile communication system, a size of the bit that may be reduced may be determined according to a type of a length of the supported PDCP sequence number. For example, when a length of the PDCP sequence number is 12 bits, as in 2l-10 and 2l-15, if HFN values are compared with respect to the bearer, upper 20 bits are sufficient, as illustrated in FIG. 2L-15. Therefore, when the upper 20 bits are used for each bearer in the security check procedure proposed above, an overhead may be reduced by 5 bits×the number of bearers. Further, when the number of upper bits is set to 32 bits-length of the PDCP sequence number of each bearer, an overhead may be reduced.

Because the RLC layer device supports a 6-bit RLC sequence number, in order to reduce a header overhead in the PDCP layer device, when 6 bits are introduced in a new PDCP sequence number length, the 6 bits may be used as upper 26 bits of the COUNT value for accurate comparison of HFNs in the security check procedure.

In one-to-one communication or one-to-many communication, or specifically, when data transmission and reception is performed between a UE and a base station, the following description of the disclosure proposes a data processing method at the receiver to prevent a hacker attack that causes data loss by exploiting an integrity protection and verification procedure and a data duplication detection method.

The hacker attack that causes the data loss described above may be performed by exploiting a reception operation of the PDCP layer device.

A first embodiment of an operation of the receiving PDCP layer device that may be exploited by a hacker is as follows.

When processing received data, the receiving PDCP layer device maintains and manages three COUNT variables. When processing the received data, the receiving PDCP layer device uses a second COUNT variable that maintains the COUNT value of data (e.g., PDCP SDU) expected to be received next, and the second COUNT variable may be referred to as RX_NEXT. When processing the received data, the receiving PDCP layer device uses a third COUNT variable that maintains a COUNT value of first data (e.g., PDCP SDU) that has not been transferred to the upper layer, and the third COUNT variable may be referred to as RX_DELIV. When processing the received data, the receiving PDCP layer device uses a fourth COUNT variable that maintains the COUNT value of data (e.g., PDCP SDU) that has triggered a PDCP t-Reordering timer, and the fourth COUNT variable may be referred to as RX_REORD. When processing the received data, the receiving PDCP layer device uses the fifth COUNT variable that maintains a COUNT value of the currently received data (e.g., PDCP SDU), and the fifth COUNT variable may be referred to as RCVD_COUNT. The PDCP reordering timer uses a timer value or interval set based on an RRC message in an upper layer (RRC layer), as illustrated in FIG. 1E, and the timer is used for detecting a lost PDCP PDU, and only one timer is driven at a time.

Further, the UE may define and use the following variables in the operation of the receiving PDCP layer device.
   HFN: Represents a hyper frame number (HFN) part of a window state variable.
   SN: Represents a sequence number (SN) part of the window state variable.
   RCVD_SN: PDCP sequence number included in a header of the received PDCP PDU
   RCVD_HFN: HFN value of the received PDCP PDU calculated by the receiving PDCP layer device An operation of the receiving PDCP layer device of the UE or the base station proposed in the disclosure is as follows.

When receiving a PDCP PDU from a lower layer, the receiving PDCP layer device determines a COUNT value of the received PDCP PDU as follows.
   If the received RCVD_SN is RCVD_SN<=SN(RX_DELIV)−Window_Size,
   Set RCVD_HFN=HFN(RX_DELIV)+1.
   Else if RCVD_SN is RCVD_SN>SN(RX_DELIV)+Window_Size,
   Set RCVD_HFN=HFN(RX_DELIV)−1.
   Else,
   Set RCVD_HFN=HFN(RX_DELIV).
   RCVD_COUNT is determined as RCVD_COUNT=[RCVD_HFN, RCVD_SN].

After determining the COUNT value of the received PDCP PDU, the receiving PDCP layer device updates the window state variables and processes the PDCP PDU as follows.
   Deciphering is performed on the PDCP PDU using the RCVD_COUNT value, and integrity verification is performed.
   When integrity verification fails,
   Indicate an integrity verification fail to the higher layer and discard the received PDCP Data PDU (data part of the PDCP PDU).
   If RCVD_COUNT<RX_DELIV or when PDCP PDU with a value of RCVD_COUNT has been previously received (expired, out-of-window packet, or duplicate packet)
   The received PDCP Data PDU (data part of the PDCP PDU) is discarded.
   When the received PDCP PDU is not discarded, the receiving PDCP layer device operates as follows.
   The PDCP SDU processed above is stored in the receive buffer.
   If RCVD_COUNT>=RX_NEXT,
   Set RX_NEXT to RCVD_COUNT+1.
   When outOfOrderDelivery is set (when out of order delivery operation is indicated),
   The PDCP SDU is delivered to an upper layer.
   If RCVD_COUNT is equal to RX_DELIV,
   The above data are delivered to the upper layer in order of COUNT values.
   All consecutive PDCP SDUs starting from a value of COUNT=RX_DELIV are delivered to the upper layer.
   The RX_DELIV value is a COUNT value greater than or equal to the current RX_DELIV and is updated to a COUNT value of a first PDCP SDU that has not been transferred to the upper layer.
   If the t-Reordering timer is running and the RX_DELIV value is greater than or equal to RX_REORD,
   Stop and reset the t-Reordering timer.
   If the t-Reordering timer is not running (including when it is stopped under the above condition) and RX_DELIV is smaller than RX_NEXT,
   Set RX_REORD value to RX_NEXT.
   Start the t-Reordering timer.

When the PDCP t-Reordering timer expires, the receiving PDCP layer device operates as follows.
   When the header decompression procedure has not been applied previously (i.e., when data has not been processed for the upper layer header), the header decompression procedure is performed for the stored data, and the data are delivered to the upper layer in order of the COUNT value.
   All PDCP SDUs with COUNT values smaller than the RX_REORD value are delivered.
   All PDCP SDUs with consecutive COUNT values starting from the RX_REORD value are delivered.
   The RX_DELIV value is a COUNT value greater than or equal to RX_REORD and is updated to a COUNT value of a first PDCP SDU that has not been delivered to the upper layer.
   If the value of RX_DELIV is smaller than the value of RX_NEXT,
   Set the RX_REORD value to the RX_NEXT value.
   Start the t-Reordering timer.

In a first embodiment of an operation of the receiving PDCP layer device, the integrity protection and verification procedure may be set to a signaling radio bearer (SRB) or a data radio bearer (DRB). When integrity protection and verification procedures are set to the SRB, and an integrity verification failure occurs for the received data, the integrity verification failure is reported to the upper layer device (e.g., RRC layer device), and the upper layer device may trigger an RRC connection re-establishment procedure. That is, because the connection of the UE is reset, the bearer may be released and reset. As described above, because the SRB exchanges important messages such as RRC messages that transmit and receive setup between the UE and the base station, when an integrity failure occurs, it is regarded as a hacker attack and a new RRC connection is set so that a hacker attack may be avoided.

However, when the integrity protection and verification procedure is set for the DRB, if the integrity verification procedure for the received data fails, the receiving PDCP layer device reports the integrity verification failure to the upper layer device and discards data in which the integrity verification failure occurs, but continues data transmission and reception. It should be noted here that a duplicate detection procedure is performed after the integrity verification procedure. In the first embodiment of the operation of the receiving PDCP layer device of the disclosure, when the receiving PDCP layer device receives data corresponding to a predetermined COUNT value, the receiving PDCP layer device performs an integrity verification procedure with the COUNT value and discards the failed data, and in the duplicate detection procedure, when a COUNT value corresponding to the currently received data has been previously received, that is, when data corresponding to the COUNT value has been previously received, the receiving PDCP layer device discards the data.

Accordingly, by exploiting the first embodiment of the operation of the receiving PDCP layer device or by using a weak point thereof, a hacker may transmit a large amount of data having different COUNT values to the receiving PDCP layer device. Therefore, when the integrity protection and verification procedure is set, the receiving PDCP layer device may identify an integrity verification failure of data transmitted by the hacker and discard data corresponding to the attack. However, the problem is that the receiving PDCP layer device regards that a COUNT value corresponding to data by the attack has been received. Therefore, even if normal data transmitted by the transmitter, not data by the attack, are received, when a COUNT value corresponding to the normal data is the same COUNT value as the data by the attack, the receiving PDCP layer device regards that the normal data have been repeatedly received by a duplicate detection procedure and discards the data. Therefore, because of a hacker attack, the receiving PDCP layer device discards normal data by a duplicate detection procedure, resulting in data loss.

Accordingly, the disclosure proposes a second embodiment of a receiving PDCP layer device for preventing an attack that causes data loss by exploiting the integrity protection and verification procedure and the duplicate detection procedure by a hacker as follows. Specifically, when the receiving PDCP layer device has previously received the COUNT value corresponding to the currently received data in the duplication detection procedure, and has successfully received the data corresponding to the COUNT value, rather than simply receiving the data previously, the receiving PDCP layer device determines that duplicate detection has occurred and enables to discard the received data, thereby improving the duplicate detection procedure to prevent hacker attacks. When the data corresponding to the COUNT value has been processed and stored in a buffer, or has been received and processed and transmitted to an upper layer device, or when data has been transmitted to an upper layer device and discarded by an upper layer device, or when an integrity protection and verification procedure is set, it may be indicated that integrity verification has been successfully performed on data corresponding to the COUNT value. That is, because it may be determined that when integrity verification of the data received by the hacker attack has failed, the data has not been successfully received, normal data may not be discarded in the duplicate detection procedure. A detailed procedure of the second embodiment of the receiving PDCP layer device proposed in the disclosure is as follows.

When receiving a PDCP PDU from a lower layer, the receiving PDCP layer device determines the COUNT value of the received PDCP PDU as follows.
  If the received RCVD_SN is RCVD_SN<=SN(RX_DELIV)−Window_Size,
  Set RCVD_HFN=HFN(RX_DELIV)+1.
  Else if RCVD_SN is RCVD_SN>SN(RX_DELIV)+Window_Size,
  Set RCVD_HFN=HFN(RX_DELIV)−1.
  Else,
  Set RCVD_HFN=HFN(RX_DELIV).
  RCVD_COUNT is determined as RCVD_COUNT=[RCVD_HFN, RCVD_SN].

After determining the COUNT value of the received PDCP PDU, the receiving PDCP layer device updates window state variables and processes the PDCP PDU as follows.
  Deciphering on the PDCP PDU is performed using the RCVD_COUNT value, and integrity verification is performed.
  When integrity verification fails,
  Indicate an integrity verification fail to the higher layer and discard the received PDCP Data PDU (data part of the PDCP PDU).
  When RCVD_COUNT<RX_DELIV,
  Or, when a PDCP PDU with a value of RCVD_COUNT has been successfully received,
  The received PDCP data PDU (data part of the PDCP PDU) is discarded.
  When the received PDCP PDU is not discarded, the receiving PDCP layer device operates as follows.
  The processed PDCP SDU is stored in the receiving buffer.
  If RCVD_COUNT>=RX_NEXT,
  Set RX_NEXT to RCVD_COUNT+1.
  When outOfOrderDelivery is set (when out of order delivery operation is indicated),
  The PDCP SDU is delivered to an upper layer.
  When RCVD_COUNT is equal to RX_DELIV,
  The above data are delivered to the upper layer in order of COUNT values.
  All consecutive PDCP SDUs starting from a value of COUNT=RX_DELIV are delivered to the upper layer.
  The RX_DELIV value is a COUNT value greater than or equal to a current RX_DELIV and is updated to a COUNT value of a first PDCP SDU that has not been transferred to the upper layer.
  If a t-Reordering timer is running and the RX_DELIV value is greater than or equal to RX_REORD,
  Stop and reset the t-Reordering timer.
  If the t-Reordering timer is not running (including when it is stopped under the above condition) and when RX_DELIV is smaller than RX_NEXT,
  Set RX_REORD value to RX_NEXT.
  Start the t-Reordering timer.

When the PDCP t-Reordering expires, the receiving PDCP layer device operates as follows.
  When a header decompression procedure has not previously been applied (i.e., when data has not been processed for the upper layer header), the header decompression procedure is performed for the stored data, and the data are delivered to the upper layer in order of the COUNT value.
  All PDCP SDUs with COUNT values smaller than the RX_REORD value are delivered.
  All PDCP SDUs with consecutive COUNT values starting from the RX_REORD value are delivered.
  The RX_DELIV value is a COUNT value greater than or equal to RX_REORD and is updated to a COUNT value of a first PDCP SDU that has not been delivered to the upper layer.
  If the value of RX_DELIV is smaller than a value of RX_NEXT,
  Set the RX_REORD value to the RX_NEXT value.
  Start the t-Reordering timer.

Further, the disclosure proposes a third embodiment of a receiving PDCP layer device for preventing an attack that causes data loss by exploiting an integrity protection and verification procedure and a duplicate detection procedure by a hacker as follows. Specifically, when the receiving PDCP layer device has previously received a COUNT value corresponding to the currently received data in the duplication detection procedure, and has previously successfully received data corresponding to the COUNT value (when the integrity protection and verification procedure is set, if data corresponding to the COUNT value has been previously received and the integrity verification procedure has been successfully performed), the receiving PDCP layer device determines that duplicate detection has occurred and enables to discard the received data to enhance the duplicate detection procedure, thereby preventing hacker attacks. When data corresponding to the COUNT value has been processed and stored in a buffer, or has been received and delivered to an upper layer device, when data has been delivered to an upper layer device and discarded, or when an integrity protection and verification procedure is set, it may be indicated that integrity verification has been successfully performed on data corresponding to the COUNT value. That is, when integrity verification of data received by an attack of a hacker has failed, it may be determined that the data has not been successfully received; thus, normal data may not be discarded in the duplicate detection procedure. A detailed procedure of the second embodiment of the receiving PDCP layer device proposed in the disclosure is as follows.

When receiving a PDCP PDU from a lower layer, the receiving PDCP layer device determines the COUNT value of the received PDCP PDU as follows.

If the received RCVD_SN is RCVD_SN<=SN(RX_DELIV)-Window_Size,
Set RCVD_HFN=HFN(RX_DELIV)+1.
Else if RCVD_SN is RCVD_SN>SN(RX_DELIV)+Window_Size,
Set RCVD_HFN=HFN(RX_DELIV)−1.
Else,
Set RCVD_HFN=HFN(RX_DELIV).
RCVD_COUNT is determined as RCVD_COUNT=[RCVD_HFN, RCVD_SN].

After determining the COUNT value of the received PDCP PDU, the receiving PDCP layer device updates the window state variables and processes the PDCP PDU as follows.

Deciphering on the PDCP PDU is performed using the RCVD_COUNT value, and integrity verification is performed.
When integrity verification fails,
Indicate an integrity verification fail to the higher layer and discard the received PDCP Data PDU (data part of the PDCP PDU).
If RCVD_COUNT<RX_DELIV,
Or, when a PDCP PDU with the value of RCVD_COUNT has been successfully received, and when the integrity protection and verification procedure is set, if the integrity verification procedure for the PDCP PDU corresponding to the RCVD_COUNT value has been previously performed,
The received PDCP Data PDU (data part of the PDCP PDU) is discarded.
When the received PDCP PDU is not discarded, the receiving PDCP layer device operates as follows.
The processed PDCP SDU is stored in the receive buffer.
If RCVD_COUNT>=RX_NEXT,
Set RX_NEXT to RCVD_COUNT+1.
If outOfOrderDelivery is set (when an out of order delivery operation is indicated),
The PDCP SDU is delivered to an upper layer.
If RCVD_COUNT is equal to RX_DELIV,
The above data are delivered to the upper layer in order of COUNT values.
All consecutive PDCP SDUs starting from a value of COUNT=RX_DELIV are delivered to the upper layer.
The RX_DELIV value is a COUNT value greater than or equal to the current RX_DELIV and is updated to a COUNT value of a first PDCP SDU that has not been transferred to the upper layer.
If the t-Reordering timer is running and the RX_DELIV value is greater than or equal to RX_REORD,
Stop and reset the t-Reordering timer.
If the t-Reordering timer is not running (including when it is stopped under the above condition) and RX_DELIV is smaller than RX_NEXT,
Set RX_REORD value to RX_NEXT.
Start the t-Reordering timer.
When the PDCP t-Reordering expires, the receiving PDCP layer device operates as follows.
When the header decompression procedure has not previously been applied (i.e., when data has not been processed for the upper layer header), the header decompression procedure is performed for the stored data, and the data are delivered to the upper layer in order of the COUNT value.
All PDCP SDUs with COUNT values smaller than the RX_REORD value are delivered.
All PDCP SDUs with consecutive COUNT values starting from the RX_REORD value are delivered.
The RX_DELIV value is a COUNT value greater than or equal to RX_REORD and is updated to a COUNT value of a first PDCP SDU that has not been delivered to the upper layer.
If the value of RX_DELIV is smaller than the value of RX_NEXT,
Set the RX_REORD value to the RX_NEXT value.
Start the t-Reordering timer.

Accordingly, the disclosure proposes a fourth embodiment of a receiving PDCP layer device for preventing an attack that causes data loss by exploiting the integrity protection and verification procedure and the duplicate detection procedure by a hacker as follows. Specifically, when the receiving PDCP layer device has previously received the COUNT value corresponding to the currently received data in the duplication detection procedure, and has successfully received the data corresponding to the COUNT value, rather than simply receiving the data previously and has never been discarded, the receiving PDCP layer device determines that duplicate detection has occurred and enables to discard the received data, thereby improving the duplicate detection procedure to prevent hacker attacks. When data corresponding to the COUNT value has been processed and stored in a buffer, or has been received and transmitted to an upper layer device, when data has been transmitted to an upper layer device and discarded, or when an integrity protection and verification procedure is set, it may be indicated that integrity verification has been successfully performed on data corresponding to the COUNT value. That is, when data received by an attack of a hacker fails to verify integrity, the receiving PDCP layer device may determine that the data has not been successfully received, and because normal data having the same COUNT value as that of data discarded because of integrity verification failure is not considered as duplicate data, normal data may not be discarded in the duplicate detection procedure. A detailed procedure of the fourth embodiment of the receiving PDCP layer device proposed in the disclosure is as follows.

When receiving a PDCP PDU from a lower layer, the receiving PDCP layer device determines the COUNT value of the received PDCP PDU as follows.

If the received RCVD_SN is RCVD_SN<=SN(RX_DELIV)-Window_Size,
  Set RCVD_HFN=HFN(RX_DELIV)+1.
Else if RCVD_SN is RCVD_SN>SN(RX_DELIV)+Window_Size,
  Set RCVD_HFN=HFN(RX_DELIV)-1.
Else,
  Set RCVD_HFN=HFN(RX_DELIV).
RCVD_COUNT is determined as RCVD_COUNT=[RCVD_HFN, RCVD_SN].

After determining the COUNT value of the received PDCP PDU, the receiving PDCP layer device updates the window state variables and processes the PDCP PDU as follows.

Deciphering on the PDCP PDU is performed using the RCVD_COUNT value, and integrity verification is performed.

When integrity verification fails,
Indicate an integrity verification fail to the higher layer and discard the received PDCP Data PDU (data part of the PDCP PDU).

If RCVD_COUNT<RX_DELIV,
Or, when a PDCP PDU with a value of RCVD_COUNT has been successfully received and has not been discarded,
The received PDCP Data PDU (data part of the PDCP PDU) is discarded.

When the received PDCP PDU is not discarded, the receiving PDCP layer device operates as follows.
The processed PDCP SDU is stored in the receive buffer.
If RCVD_COUNT>=RX_NEXT,
Set RX_NEXT to RCVD_COUNT+1.
When outOfOrderDelivery is set (when an out of order delivery operation is indicated),
The PDCP SDU is delivered to an upper layer.
When RCVD_COUNT is equal to RX_DELIV,
The above data are delivered to the upper layer in order of COUNT values.
All consecutive PDCP SDUs starting from the value of COUNT=RX_DELIV are delivered to the upper layer.
The RX_DELIV value is a COUNT value greater than or equal to the current RX_DELIV and is updated to a COUNT value of a first PDCP SDU that has not been transferred to the upper layer.
When the t-Reordering timer is running and the RX_DELIV value is greater than or equal to RX_REORD,
Stop and reset the t-Reordering timer.
If the t-Reordering timer is not running (including when it is stopped under the above condition) and RX_DELIV is smaller than RX_NEXT,
Set RX_REORD value to RX_NEXT.
Start the t-Reordering timer.
When the PDCP t-Reordering timer expires, the receiving PDCP layer device operates as follows.
When the header decompression procedure has not been applied previously (i.e., when data has not been processed for the upper layer header), the header decompression procedure is performed for the stored data, and data are delivered to the upper layer in order of the COUNT value.
All PDCP SDUs with COUNT values smaller than the RX_REORD value are delivered.
All PDCP SDUs with consecutive COUNT values starting from the RX_REORD value are delivered.

The RX_DELIV value is a COUNT value greater than or equal to RX_REORD and is updated to a COUNT value of a first PDCP SDU that has not been delivered to the upper layer.
If the value of RX_DELIV is smaller than the value of RX_NEXT,
Set the RX_REORD value to the RX_NEXT value.
Start the t-Reordering timer.

In the above procedure, for example, the first PDCP PDU has been successfully received, and may be delivered to an upper layer device and then be discarded. In this case, when a duplicated packet identical to that of the first PDCP PDU is received later, the duplicated packet identical to that of the first PDCP PDU is not discarded by a duplicate detection procedure, but is regarded as out-of-window data and discarded because it is outside the PDCP reception window. This is because when the first PDCP PDU is successfully received, and delivered to an upper layer device, the PDCP reception window moves in a direction in which the COUNT value increases.

Figure 2M:
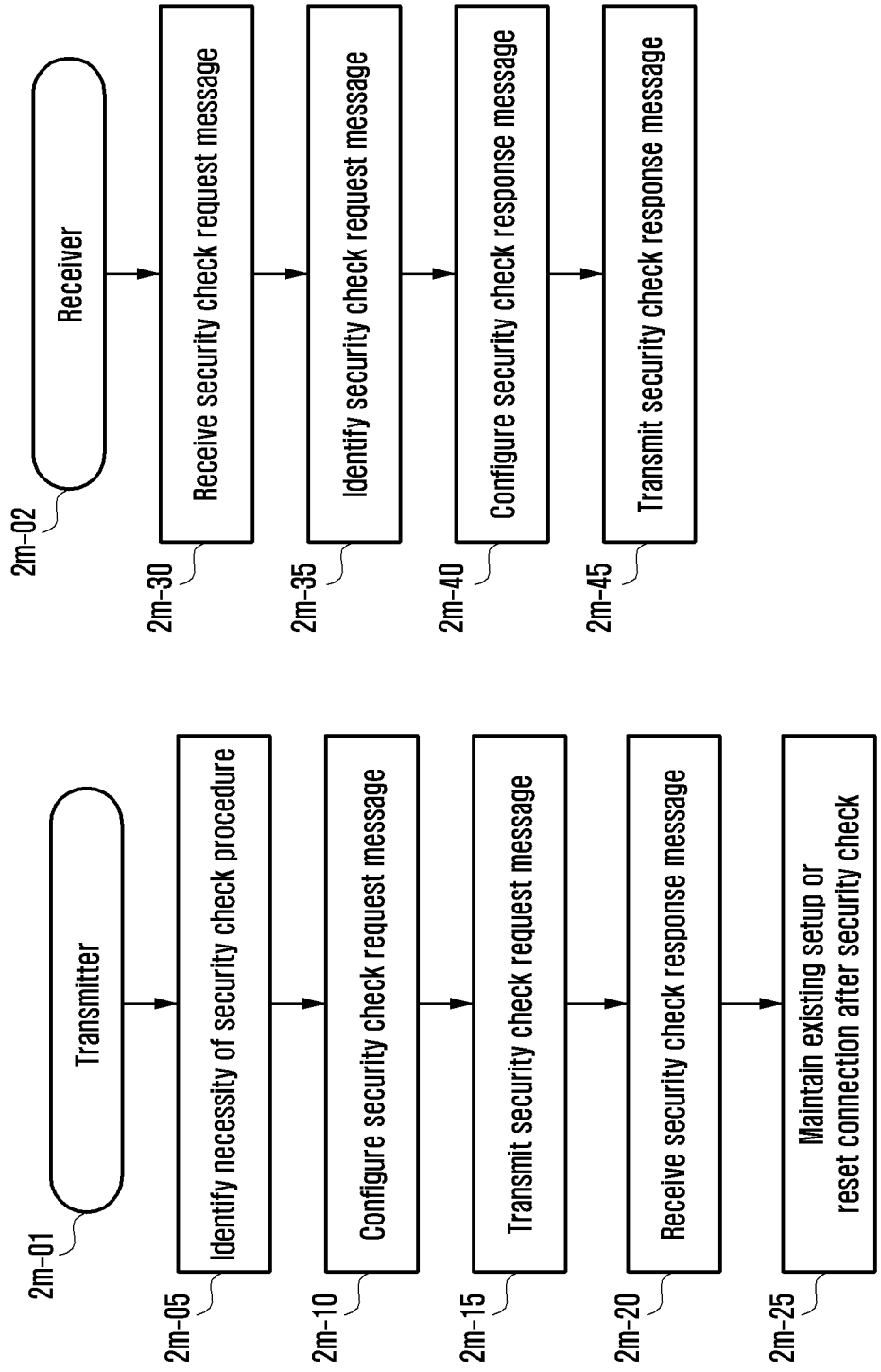
FIG. 2M is a flowchart illustrating operations of a transmitter and a receiver for performing a security check procedure according to various embodiments of the disclosure.

FIG. 2M is a diagram illustrating operations of the transmitter and the receiver for performing a security check procedure according to various embodiments of the disclosure.

First, a transmitter $2m$-01 and a receiver $2m$-02 may set a one-to-one or one-to-many wireless connection. If necessary, for example, when an integrity verification failure or a deciphering failure occurs, when an HFN asynchronous problem is suspected, or when a hacker intrusion is suspected ($2m$-05), in order to identify whether security key values (e.g., COUNT value) of a transmitting PDCP layer device and a receiving PDCP layer device are well synchronized, the transmitter may transmit a security check request message to the receiver to request a security check and report for each bearer to the receiver according to the 1-1 embodiment, the 1-2 embodiment, the 2-1 embodiment, or the 2-2 embodiment proposed in the disclosure ($2m$-10, $2m$-15).

After receiving the security check request message ($2m$-30), the receiver may identify security key values (e.g., COUNT) for each bearer thereof ($2m$-35) and configure a security check response message to transmit the message to the transmitter according to the 1-1 embodiment, the 1-2 embodiment, the 2-1 embodiment, or the 2-2 embodiment proposed in the disclosure ($2m$-40, $2m$-45). After receiving the security check request message, when an HFN asynchronous problem is identified or when a hacker intrusion is identified, the receiver may disconnect the connection or may reset the connection.

Upon receiving the security check response message, the transmitter may identify security key values for each bearer and when an HFN asynchronous problem is identified or when a hacker intrusion is identified, the transmitter may disconnect the connection or may reset the connection ($2m$-25).

Figure 2N:
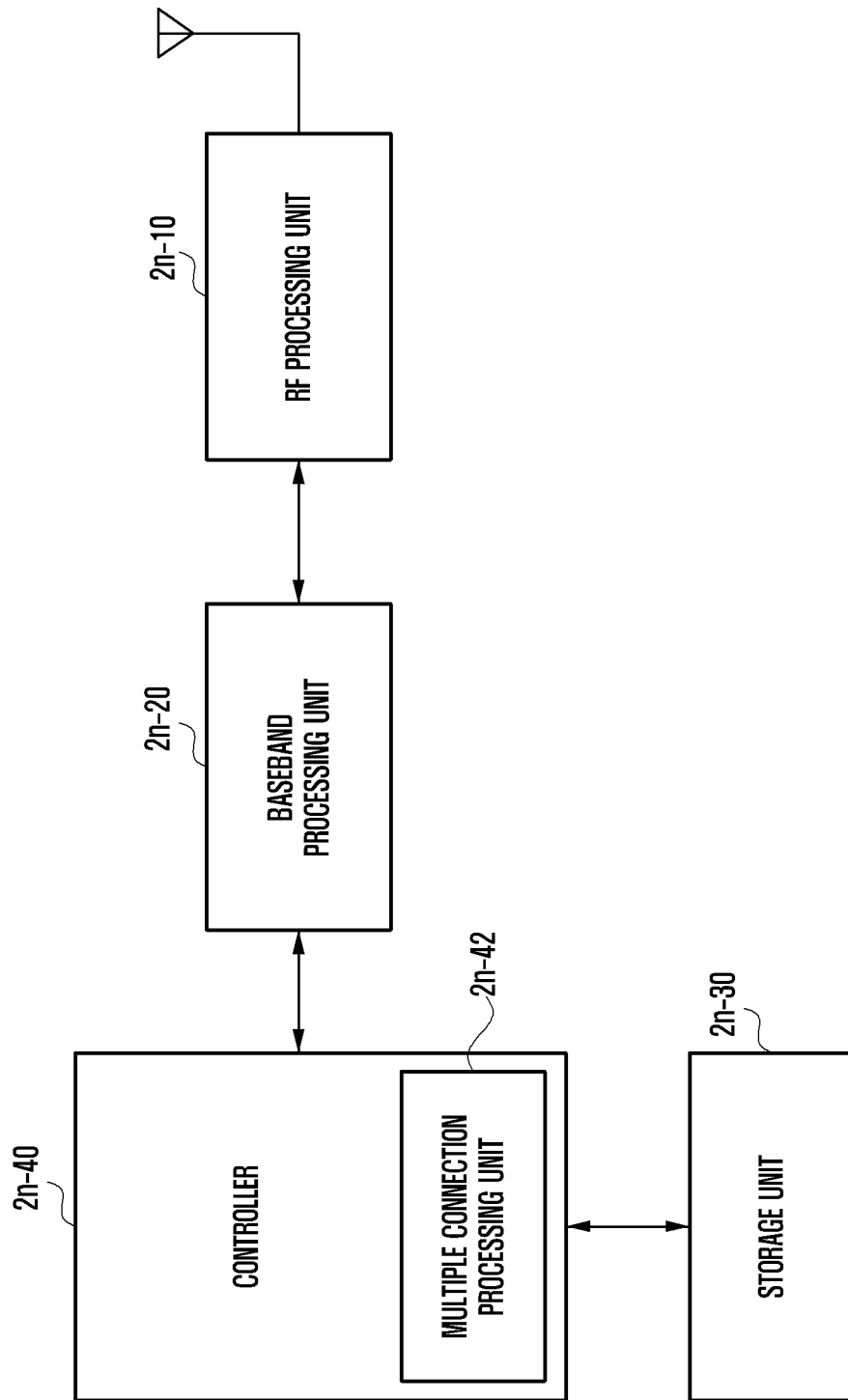
FIG. 2N illustrates a structure of a UE or a wireless node to which an embodiment of the disclosure may be applied.
Figure 20:
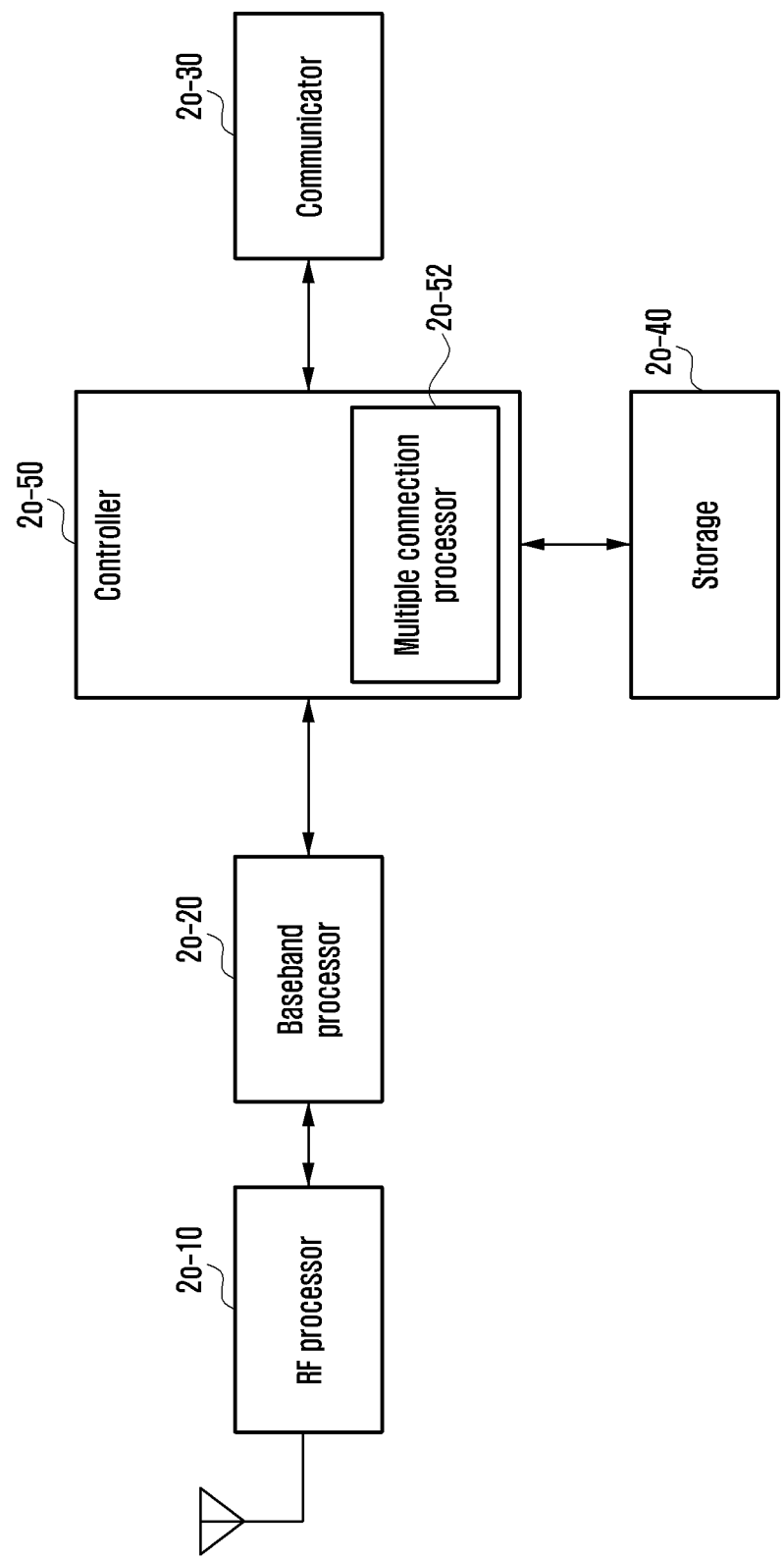

FIG. 2N illustrates a structure of a UE or a wireless node to which an embodiment of the disclosure may be applied.

With reference to FIG. 2N, the UE includes a radio frequency (RF) processor $2n$-10, a baseband processor $2n$-20, a storage $2n$-30, and a controller $2n$-40.

The RF processor $2n$-10 performs a function of transmitting and receiving a signal through a wireless channel such as band conversion and amplification of a signal. That is, the RF processor $2n$-10 up-converts a baseband signal provided from the baseband processor $2n$-20 to an RF band signal and transmits the signal through an antenna, and down-converts the RF band signal received through the antenna to a baseband signal. For example, the RF processor 2n-10 may include a transmission filter, a reception filter, an amplifier, a mixer, an oscillator, a digital to analog convertor (DAC), an analog to digital convertor (ADC), and the like. In the drawing, only one antenna is illustrated, but the UE may include a plurality of antennas. Further, the RF processor 2n-10 may include a plurality of RF chains. Furthermore, the RF processor 2n-10 may perform beamforming. For the beamforming, the RF processor 2n-10 may adjust a phase and magnitude of each of signals transmitted and received through a plurality of antennas or antenna elements. Further, the RF processor may perform MIMO, and receive multiple layers when performing the MIMO operation. The RF processor 2n-10 may perform reception beam sweeping by appropriately setting a plurality of antennas or antenna elements under control of the controller or adjust a direction and beam width of the reception beam so that the reception beam cooperates with the transmission beam.

The baseband processor 2n-20 performs a function of converting a baseband signal and a bit string according to a physical layer standard of a system. For example, when transmitting data, the baseband processor 2n-20 encodes and modulates a transmission bit string to generate complex symbols. Further, when receiving data, the baseband processor 2n-20 restores a received bit string through demodulation and deciphering of the baseband signal provided from the RF processor 2n-10. For example, in the case of an orthogonal frequency division multiplexing (OFDM) method, when transmitting data, the baseband processor 2n-20 encodes and modulates a transmission bit string to generate complex symbols, maps complex symbols to subcarriers, and then configures OFDM symbols through an inverse fast Fourier transform (IFFT) operation and cyclic prefix (CP) insertion. Further, when receiving data, the baseband processor 2n-20 divides the baseband signal provided from the RF processor 2n-10 in units of OFDM symbols, restores signals mapped to subcarriers through a fast Fourier transform (FFT) operation, and restores the received bit string through demodulation and deciphering.

The baseband processor 2n-20 and the RF processor 2n-10 transmit and receive signals, as described above. Accordingly, the baseband processor 2n-20 and the RF processor 2n-10 may be referred to as a transmission unit, a reception unit, a transceiver, or a communicator. Furthermore, in order to support a plurality of different wireless access technologies, at least one of the baseband processor 2n-20 and the RF processor 2n-10 may include a plurality of communication modules. Further, in order to process signals of different frequency bands, at least one of the baseband processor 2n-20 and the RF processor 2n-10 may include different communication modules. For example, the different radio access technologies may include an LTE network, an NR network, and the like. Further, the different frequency bands may include a super high frequency (SHF) (e.g., 2.2 GHz, 2 GHz) band, and a millimeter wave (e.g., 60 GHz) band.

The storage 2n-30 stores data such as a basic program, an application program, and setup information for an operation of the UE. The storage 2n-30 provides stored data according to a request of the controller 2n-40.

The controller 2n-40 controls overall operations of the UE. For example, the controller 2n-40 transmits and receives signals through the baseband processor 2n-20 and the RF processor 2n-10. Further, the controller 2n-40 writes and reads data in the storage 2n-40. To this end, the controller 2n-40 may include at least one processor. For example, the controller 2n-40 may include a communication processor (CP) that controls communication and an application processor (AP) that controls an upper layer such as an application program.

FIG. 2O is a block diagram illustrating a TRP (base station) or a wireless node in a wireless communication system to which an embodiment of the disclosure may be applied.

With reference to FIG. 2O, the base station includes an RF processor 2o-10, a baseband processor 2o-20, a backhaul communicator 2o-30, a storage 2o-40, and a controller 2o-50.

The RF processor 2o-10 performs a function of transmitting and receiving a signal through a wireless channel such as band conversion and amplification of a signal. That is, the RF processor 2o-10 up-converts a baseband signal provided from the baseband processor 2o-20 into an RF band signal, then transmits the signal through an antenna, and down-converts an RF band signal received through the antenna to a baseband signal. For example, the RF processor 2o-10 may include a transmission filter, a reception filter, an amplifier, a mixer, an oscillator, a DAC, an ADC, and the like. In the drawing, only one antenna is illustrated, but a first access node may include a plurality of antennas. Further, the RF processor 2o-10 may include a plurality of RF chains. Furthermore, the RF processor 2o-10 may perform beamforming. For the beamforming, the RF processor 2o-10 may adjust a phase and magnitude of each of signals transmitted and received through a plurality of antennas or antenna elements. The RF processor may perform a downlink MIMO operation by transmitting one or more layers.

The baseband processor 2o-20 performs a function of converting a baseband signal and a bit string according to a physical layer standard of first wireless access technology. For example, when transmitting data, the baseband processor 2o-20 encodes and modulates a transmission bit string to generate complex symbols. Further, when receiving data, the baseband processor 2o-20 restores a received bit string through demodulation and deciphering of a baseband signal provided from the RF processor 2o-10. For example, in the case of the OFDM scheme, when transmitting data, the baseband processor 2o-20 encodes and modulates a transmission bit string to generate complex symbols, maps the complex symbols to subcarriers, and then configures OFDM symbols through an IFFT operation and CP insertion. Further, when receiving data, the baseband processor 2o-20 divides a baseband signal provided from the RF processor 2o-10 in units of OFDM symbols, restores signals mapped to subcarriers through an FFT operation, and then restores the received bit string through demodulation and deciphering. The baseband processor 2o-20 and the RF processor 2o-10 transmit and receive signals, as described above. Accordingly, the baseband processor 2o-20 and the RF processor 2o-10 may be referred to as a transmission unit, a reception unit, a transceiver, a communicator, or a wireless communicator.

The communicator 2o-30 provides an interface for performing communication with other nodes in the network.

The storage 2o-40 stores data such as a basic program, an application program, and setup information for an operation of a main base station. In particular, the storage 2o-40 may store information on bearers allocated to an accessed UE and measurement results reported from the accessed UE. Further, the storage 2o-40 may store information to be a criterion for determining whether to provide or stop multiple connections to the UE. The storage 2o-40 provides stored data according to a request of the controller 2o-50.

The controller 2o-50 controls overall operations of the main base station. For example, the controller 2o-50 transmits and receives a signal through the baseband processor 2o-20 and the RF processor 2o-10 or through the backhaul communicator 2o-30. Further, the controller 2o-50 writes and reads data in the storage 2o-40. To this end, the controller 2o-50 may include at least one processor.

Methods according to embodiments described in claims and/or a specification of the disclosure may be implemented in a form of hardware, software, or a combination of hardware and software.

When implemented with software, a computer readable storage medium that stores at least one program (software module) may be provided. At least one program stored at the computer readable storage medium may be configured for execution by at least one processor within the electronic device. At least one program may include instructions that enable the electronic device to execute methods according to embodiments described in claims and/or a specification of the disclosure.

Such a program (software module, software) may be stored at a non-volatile memory including a random access memory (RAM) and a flash memory, a read-only memory (ROM), an electrically erasable and programmable ROM (EEPROM), a magnetic disk storage device, a compact disk ROM (CD-ROM), a digital versatile disk (DVD), an optical storage device of other form, and a magnetic cassette. Alternatively, the program may be stored at a memory formed with a combination of a part or the entire thereof. Further, each constituent memory may be included in plural.

Further, the program may be stored at an attachable storage device that may access through a communication network such as Internet, Intranet, a local area network (LAN), a wide LAN (WLAN), or a storage area network (SAN), or a communication network formed with a combination thereof. Such a storage device may access to a device that performs an embodiment of the disclosure through an external port. Further, a separate storage device on the communication network may access a device that performs an embodiment of the disclosure.

In the above-described specific embodiments of the disclosure, components included in the disclosure were expressed in the singular or plural according to the proposed specific embodiments. However, the singular or plural expression is selected appropriately for a situation proposed for convenience of description, and the disclosure is not limited to the singular or plural components, and a component expressed in plural may be configured with the singular or a component expressed in the singular may be configured with the plural.

In the detailed description of the disclosure, a specific embodiment has been described, but several changes may be performed within the scope without deviating from the scope of the disclosure. Therefore, the scope of the disclosure is not limited to the described embodiments, and it should be determined by the appended claims and their equivalents.

The invention claimed is:

1. A method performed by a transmitter, the method comprising:
    receiving a packet data convergence protocol (PDCP) service data unit (SDU) from an upper layer;
    in case that a service data adaptation protocol (SDAP) control protocol data unit (PDU) is included in the PDCP SDU, determining, by a PDCP layer, to not perform uplink data compression (UDC) and not perform ciphering on the SDAP control PDU;
    in case that a SDAP data PDU is included in the PDCP SDU, performing, by the PDCP layer, UDC on the data of the PDCP SDU to generate a UDC block and a UDC header for the UDC block;
    performing ciphering on the UDC header and the UDC block;
    generating a PDCP header; and
    submitting, to a lower layer, a PDCP protocol data unit (PDU) including the PDCP header, a SDAP header, and the ciphered UDC header and UDC block, based on the SDAP data PDU being included in the PDCP SDU,
    wherein the SDAP header is positioned after the PDCP header, and
    wherein the ciphered UDC header and UDC block are positioned after the SDAP header.

2. The method of claim 1, further comprising:
    submitting, to the lower layer, the PDCP PDU based on the SDAP control PDU being included in the PDCP SDU.

3. The method of claim 1, wherein the UDC is not performed on the SDAP header received from the upper layer.

4. The method of claim 1, wherein the SDAP control PDU is identified based on a 1 bit indicator in a D/C field.

5. The method of claim 4, wherein the SDAP control PDU is identified in case that the 1 bit indicator is "0", and
    wherein the SDAP data PDU is identified in case that the 1 bit indicator is "1".

6. The method of claim 1, further comprising receiving a configuration message including SDAP configuration information and UDC configuration information.

7. The method of claim 1, wherein the data includes an internet protocol (IP) header and an IP packet.

8. A transmitter, comprising:
    a transceiver; and
    a controller configured to:
        control the transceiver to receive a packet data convergence protocol (PDCP) service data unit (SDU) from an upper layer,
        in case that a service data adaptation protocol (SDAP) control protocol data unit (PDU) is included in the PDCP SDU, determine, by a PDCP layer, to not perform uplink data compression (UDC) and not perform ciphering on the SDAP control PDU,
        in case that a SDAP data PDU is included in the PDCP SDU, perform, by the PDCP layer, UDC on the data of the PDCP SDU to generate a UDC block and a UDC header for the UDC block,
        cipher the UDC header and the UDC block,
        generate a PDCP header, and
        submit, to a lower layer, a PDCP protocol data unit (PDU) including the PDCP header, a SDAP header, and the ciphered UDC header and UDC block, based on the SDAP data PDU being included in the PDCP SDU,
    wherein the SDAP header is positioned after the PDCP header, and
    wherein the ciphered UDC header and UDC block are positioned after the SDAP header.

9. The transmitter of claim 8, wherein the controller is further configured to submit, to the lower layer, the PDCP PDU based on the SDAP control PDU being included in the PDCP SDU.

10. The transmitter of claim 8, wherein the UDC is not performed for the SDAP header received from the upper layer.

11. The transmitter of claim 8, wherein the SDAP control PDU is identified based on a 1 bit indicator in a D/C field.

12. The transmitter of claim 11, wherein the SDAP control PDU is identified in case that the 1 bit indicator is "0", and wherein the SDAP data PDU is identified in case that the 1 bit indicator is "1".

13. The transmitter of claim 8, wherein the controller is further configured to receive a configuration message including SDAP configuration information and UDC configuration information.

14. The transmitter of claim 8, wherein the data includes an internet protocol (IP) header and an IP packet.

* * * * *